US006626442B2

(12) United States Patent
Pahis

(10) Patent No.: US 6,626,442 B2
(45) Date of Patent: Sep. 30, 2003

(54) ROLLING FOOT APPARATUS WITH MOTION-CONVERSION MECHANISM

(76) Inventor: Nikolaos S. Pahis, 8 Alpert Dr., Vernon, CT (US) 06066

( * ) Notice: Subject to any disclaimer, the term of this patent is extended or adjusted under 35 U.S.C. 154(b) by 0 days.

(21) Appl. No.: 09/738,205

(22) Filed: Dec. 15, 2000

(65) Prior Publication Data

US 2003/0047893 A1 Mar. 13, 2003

Related U.S. Application Data

(63) Continuation of application No. 09/045,077, filed on Mar. 20, 1998, now abandoned.

(51) Int. Cl.[7] ............................................... B62M 1/04
(52) U.S. Cl. .................... 280/11.115; 280/221; 280/258
(58) Field of Search ........................ 280/11.115, 11.221, 280/11.19, 220, 221, 252, 254, 258, 87.041, 87.042

(56) References Cited

U.S. PATENT DOCUMENTS

| | | | | |
|---|---|---|---|---|
| 936,173 A | * | 10/1909 | Schoenberg | 280/11.115 |
| 1,208,173 A | * | 12/1916 | Lenhardt | 280/11.115 |
| 1,652,284 A | * | 12/1927 | Madsen | 280/252 |
| 2,707,112 A | * | 4/1955 | Ludwigson et al. | 280/221 |
| 4,181,319 A | * | 1/1980 | Hirbod | 280/221 |
| 4,411,442 A | * | 10/1983 | Rills | 280/221 |
| 5,280,935 A | * | 1/1994 | Sobocan | 280/221 |
| 5,294,140 A | * | 3/1994 | Rinkewich | 280/221 |
| 5,368,321 A | * | 11/1994 | Berman et al. | 280/221 |
| 5,716,069 A | * | 2/1998 | Bezerra et al. | 280/254 |
| 5,839,737 A | * | 11/1998 | Kruczek | 280/11.115 |

* cited by examiner

Primary Examiner—David R. Dunn

(57) ABSTRACT

A rolling foot-powered apparatus mounted for movement on rotatable rollers and including at least one upper movable assembly, a lower stationary assembly, and at least one motion-conversion mechanism or an alternatively retractable motion-conversion mechanism. The movable assembly, which is provided with mounted means for movement therewith, and the lower stationary assembly, are cooperatively associated one with another and with the assistance of the motion conversion mechanism or alternatively retractable motion-conversion mechanism are operative such that an oscillating motion of the movable assembly or alternatively a linear motion of the movable assembly is converted either to a continuous circular motion of the rotatable shaft or alternatively to the rotatable rollers for the purpose of imparting a continuous linear motion of the rolling foot-powered apparatus. Motion is imparted to the movable assembly by virtue of the forces produced either by a human body through gravity or alternatively by the dynamic thrust that is applied to the movable assembly by a human foot which is either rigidly or flexibly restrained or by means of simple contact therewith. The linear motion or alternatively oscillating motion of the movable assembly is converted by the motion conversion mechanism or alternatively by the retractable motion-conversion mechanism into a continuous circular motion for the rotatable rollers of the rolling foot-powered apparatus. The outer cylindrical surface of the rotating rollers of the rolling foot-powered apparatus are in constant contact with the adjacent ground surface such as to thereby generate frictional forces, which urge the rolling foot-powered apparatus to move forward with a linear motion.

10 Claims, 42 Drawing Sheets

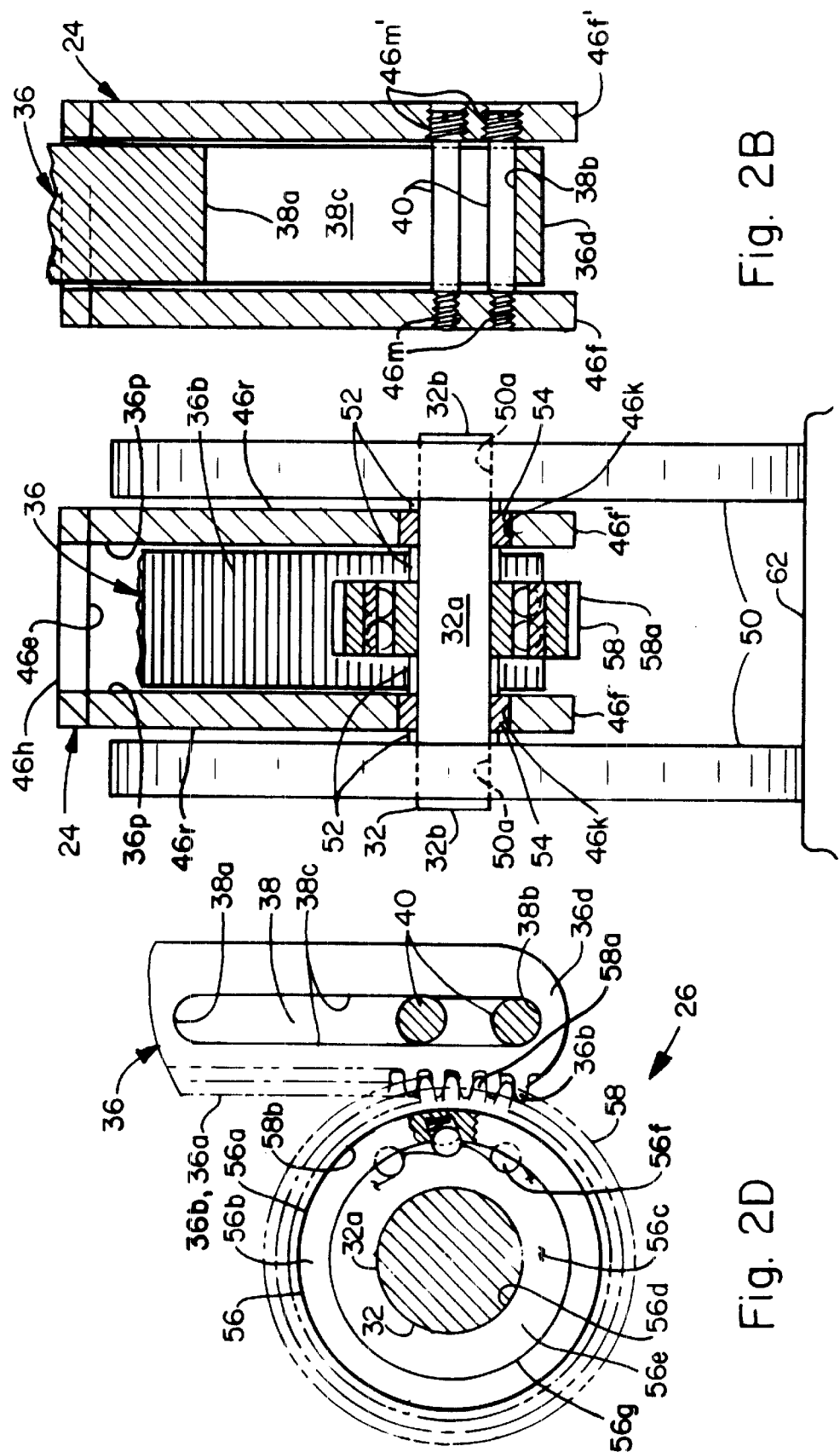

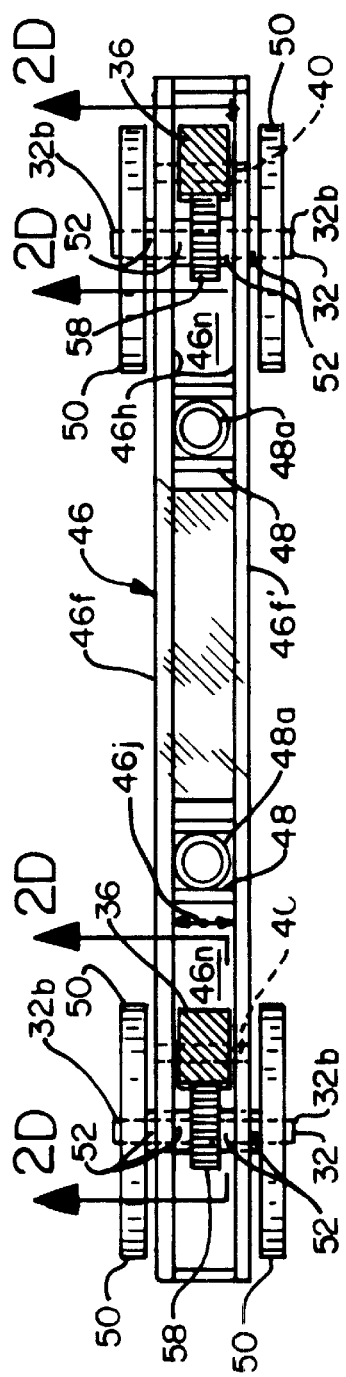
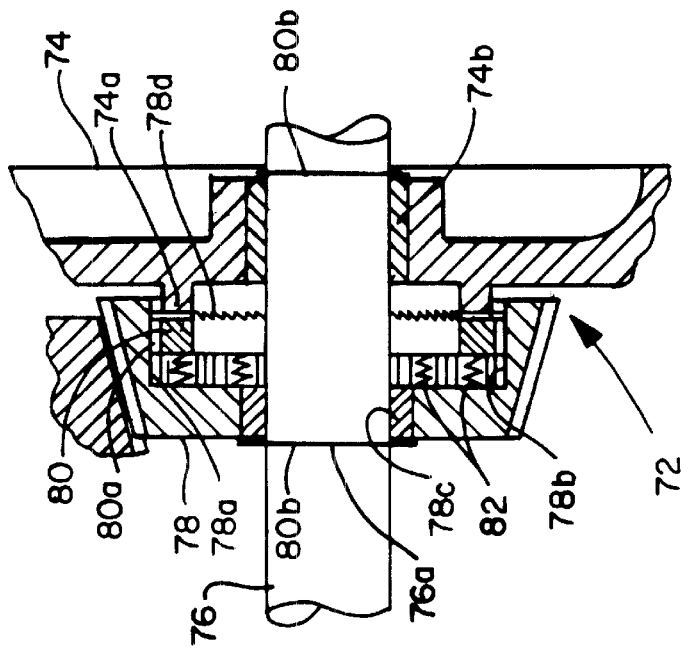
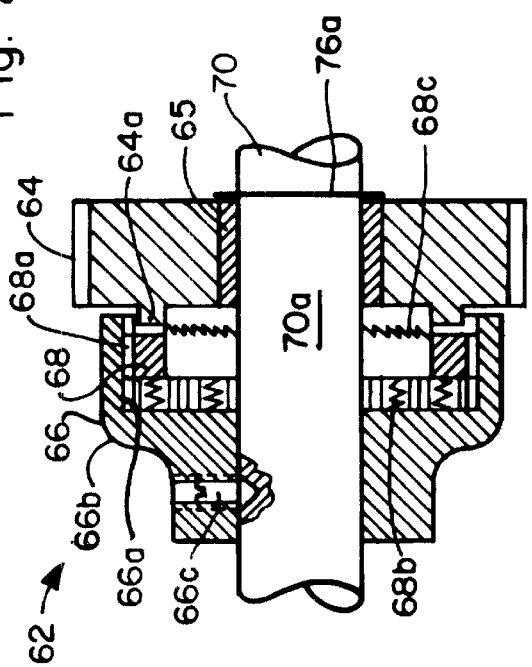
Fig. 2C
Fig. 2E
Fig. 2F

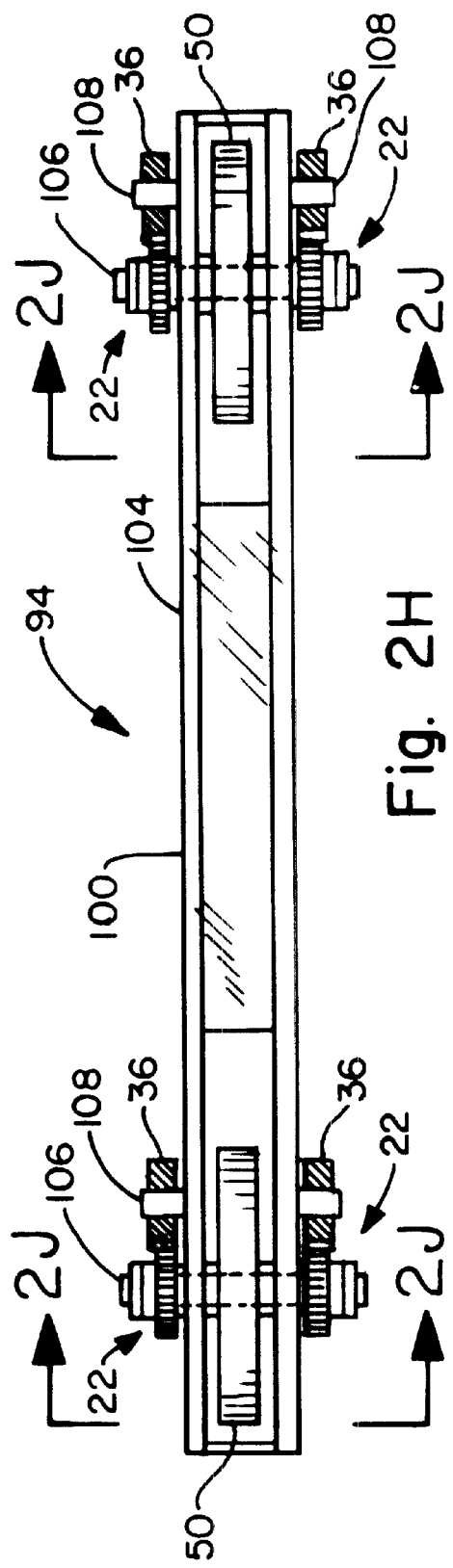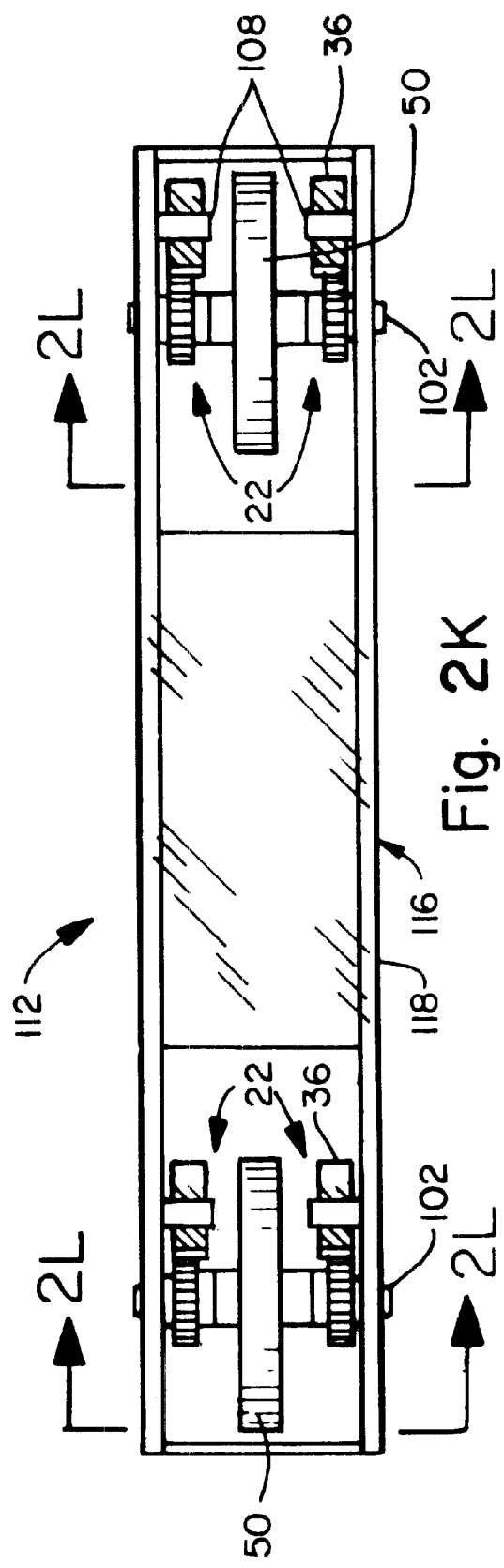

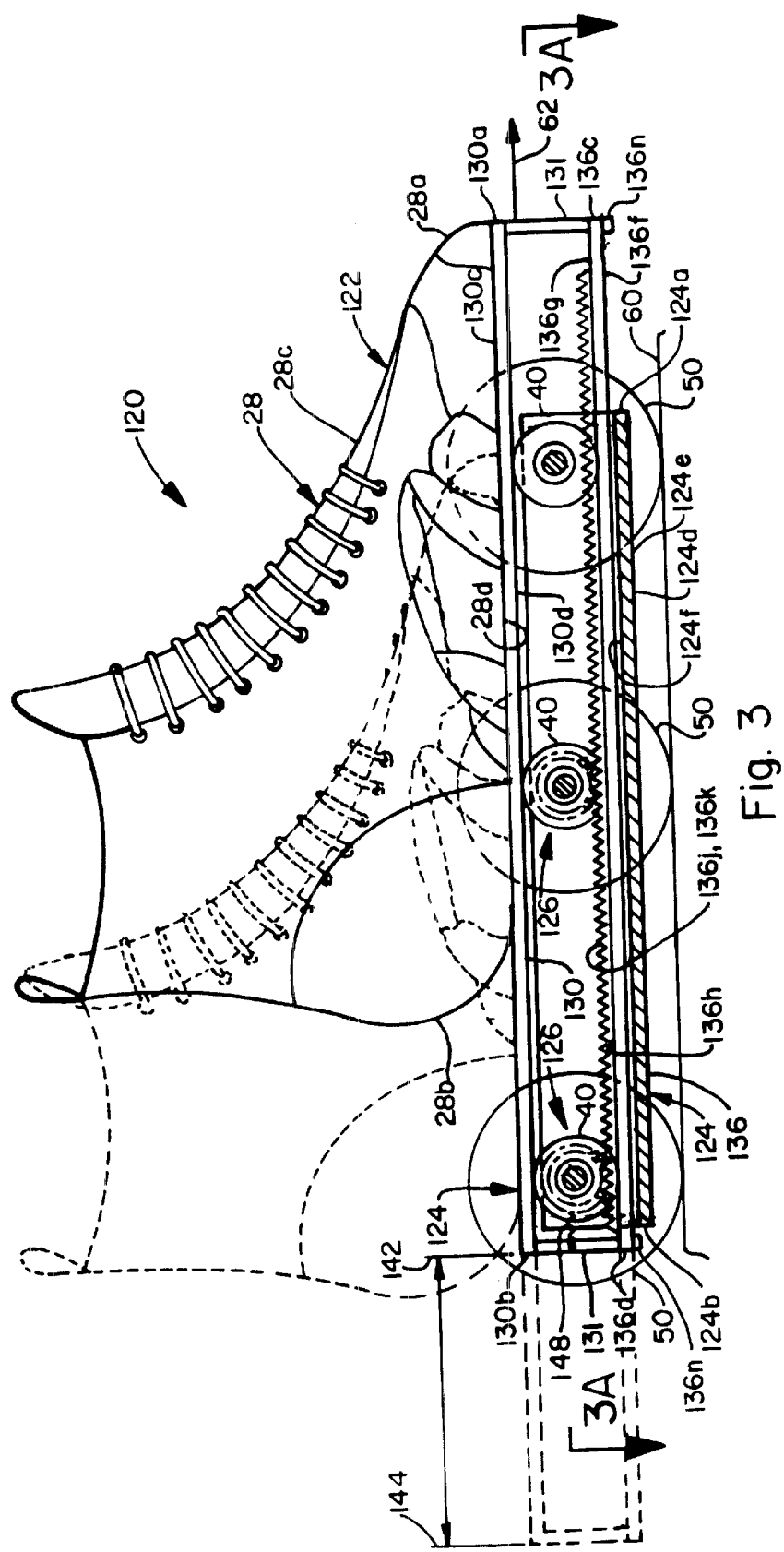

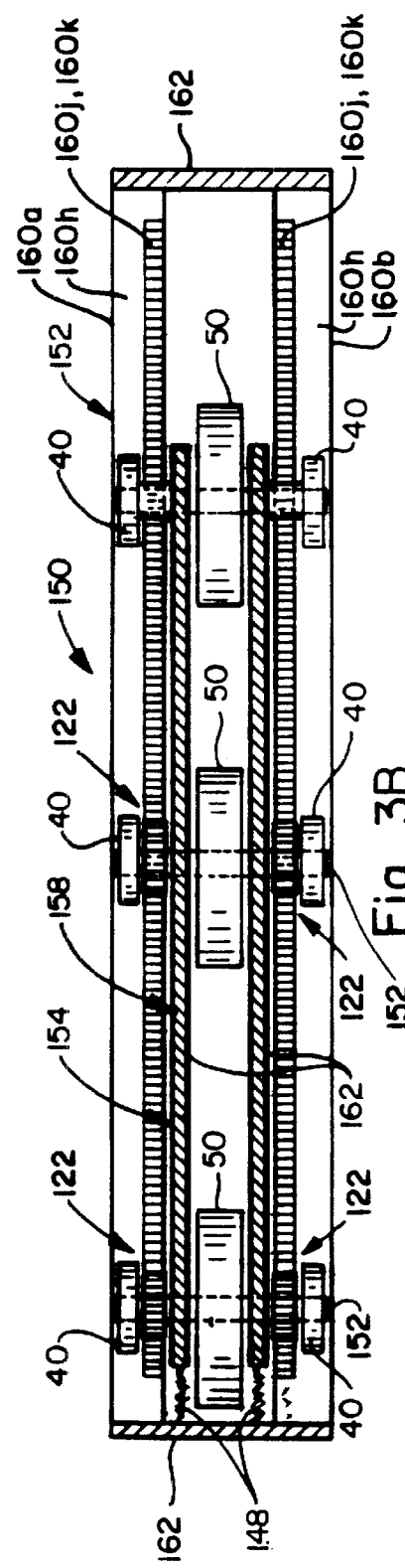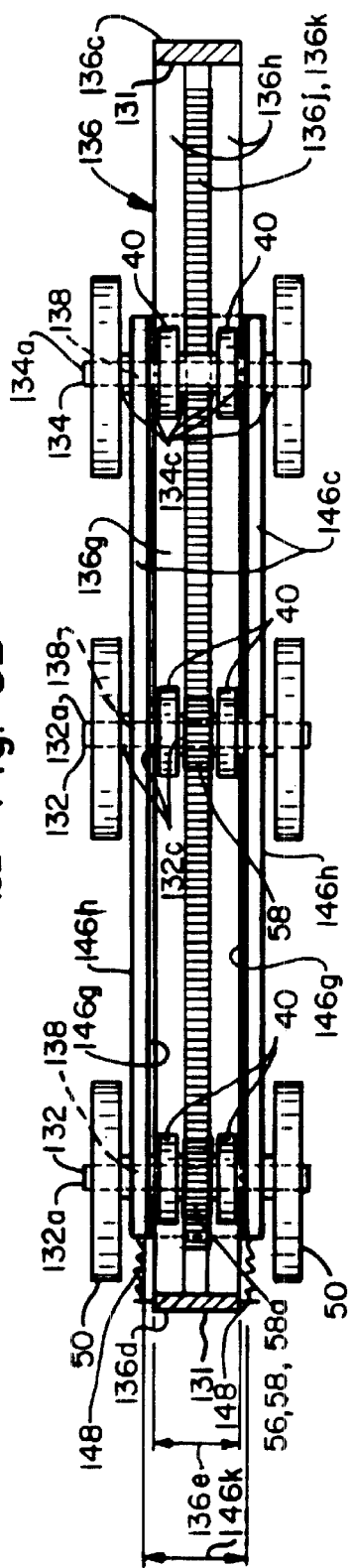

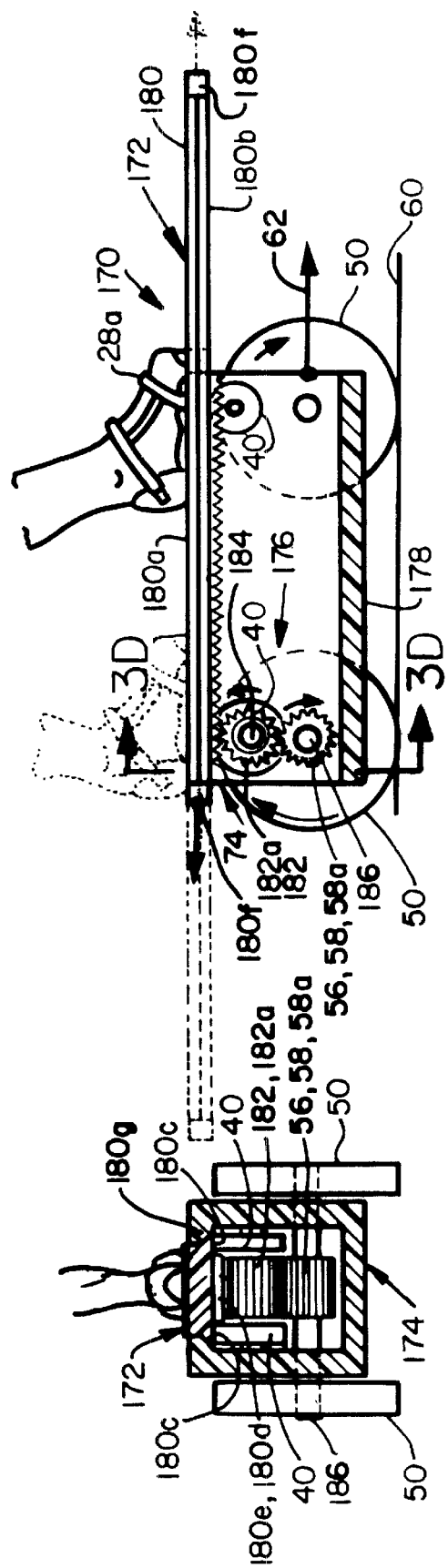

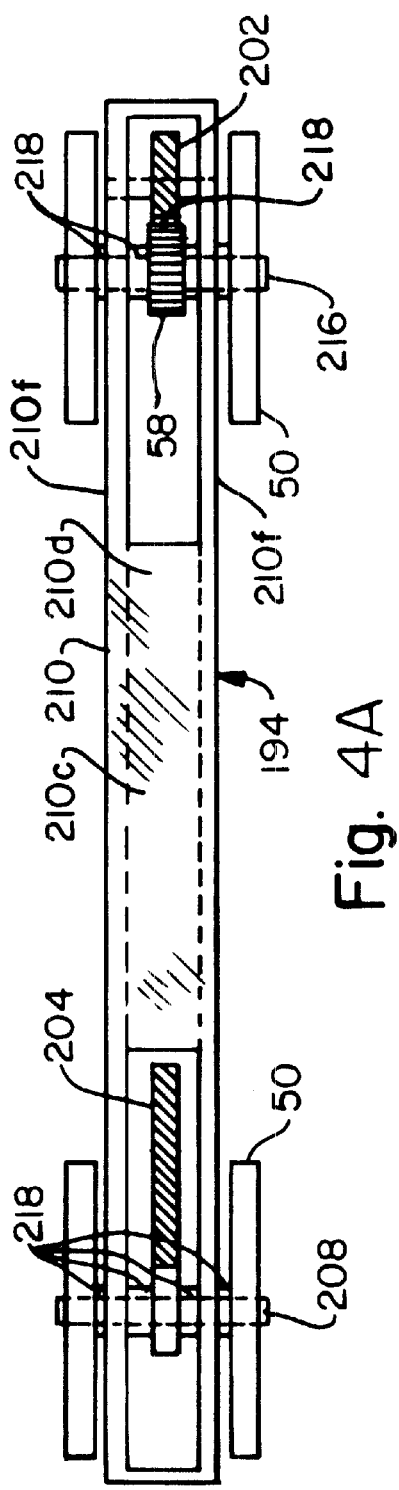
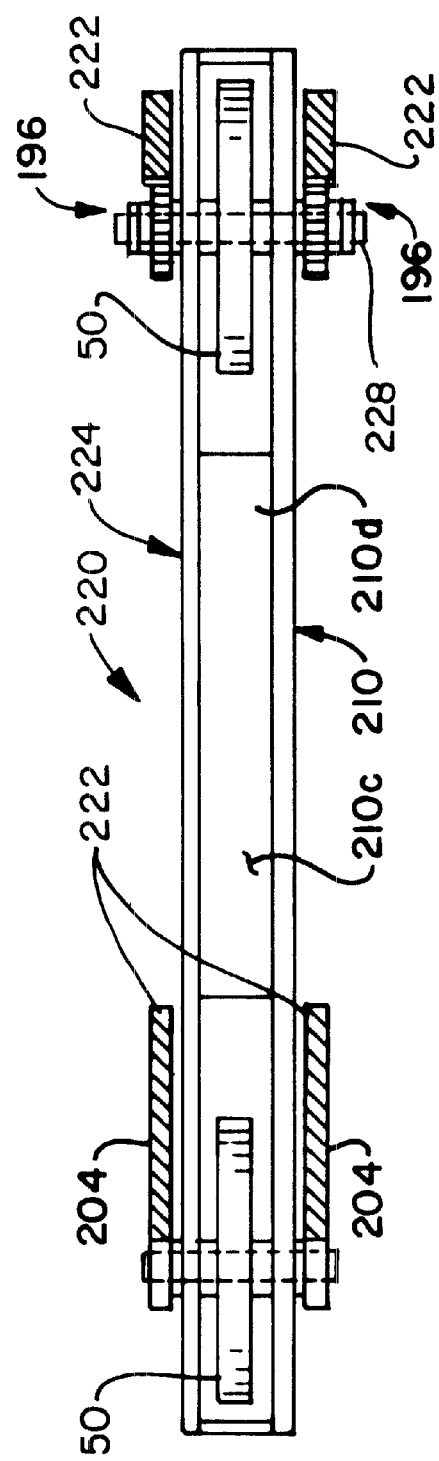
Fig. 4A
Fig. 4B

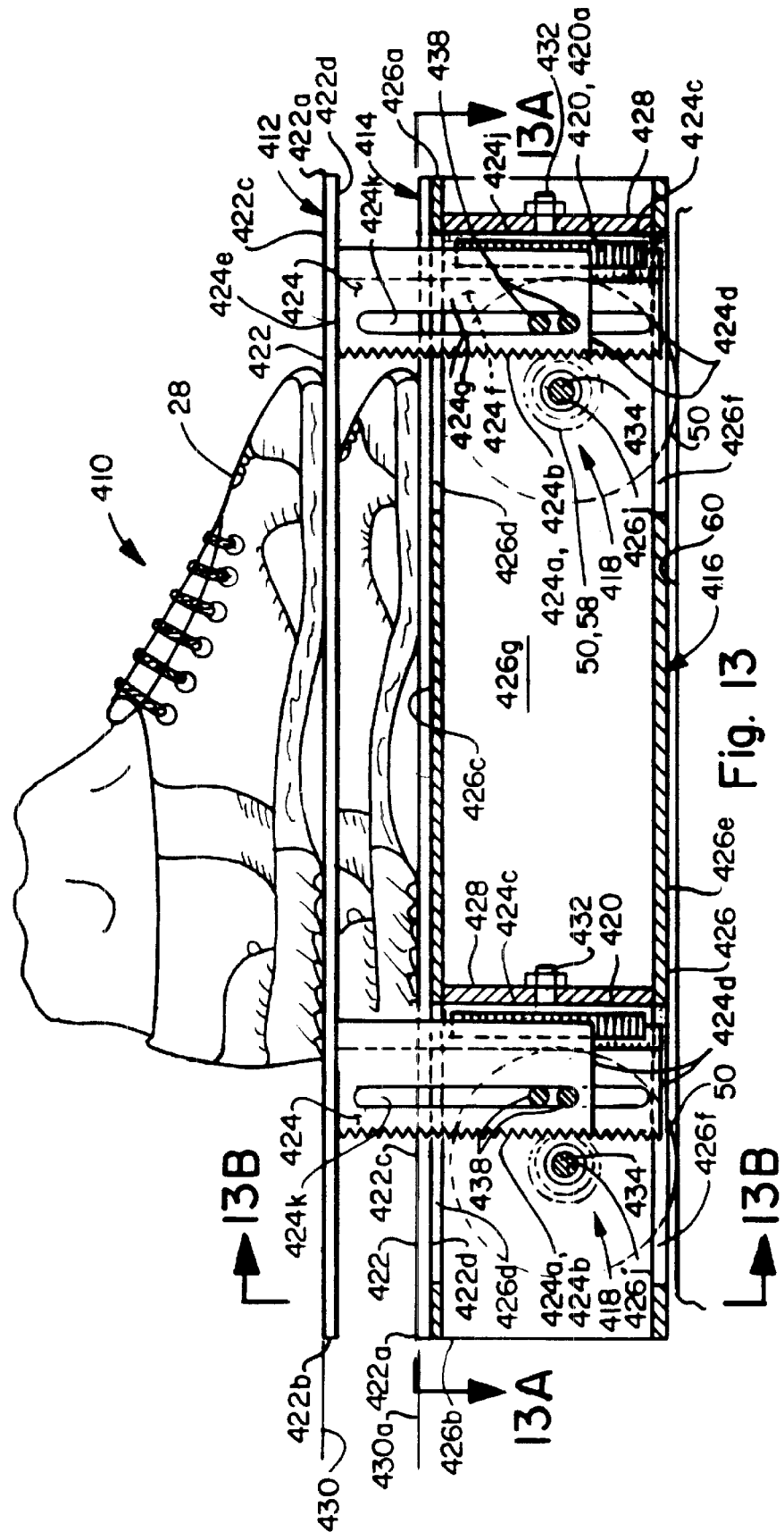

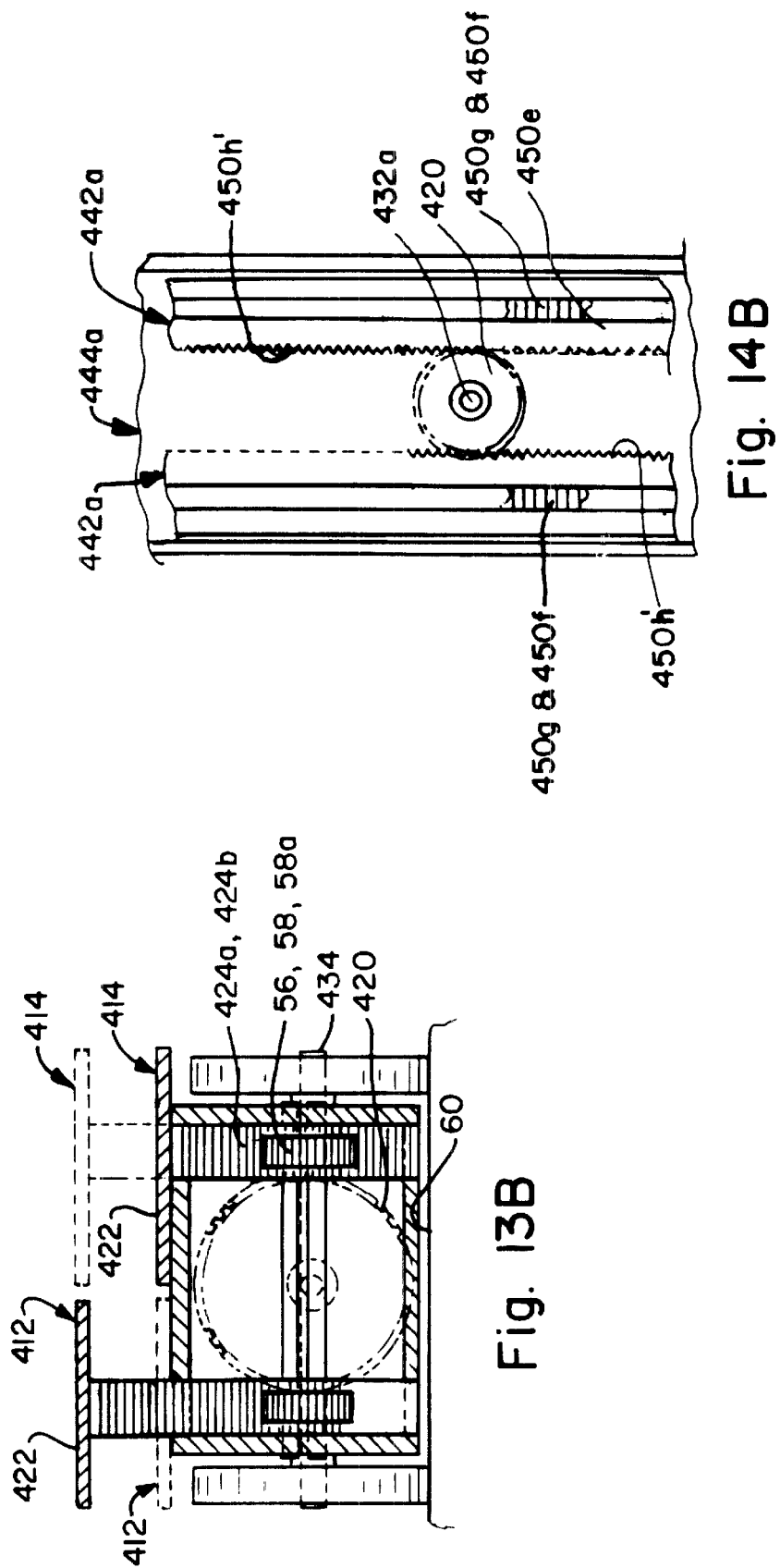

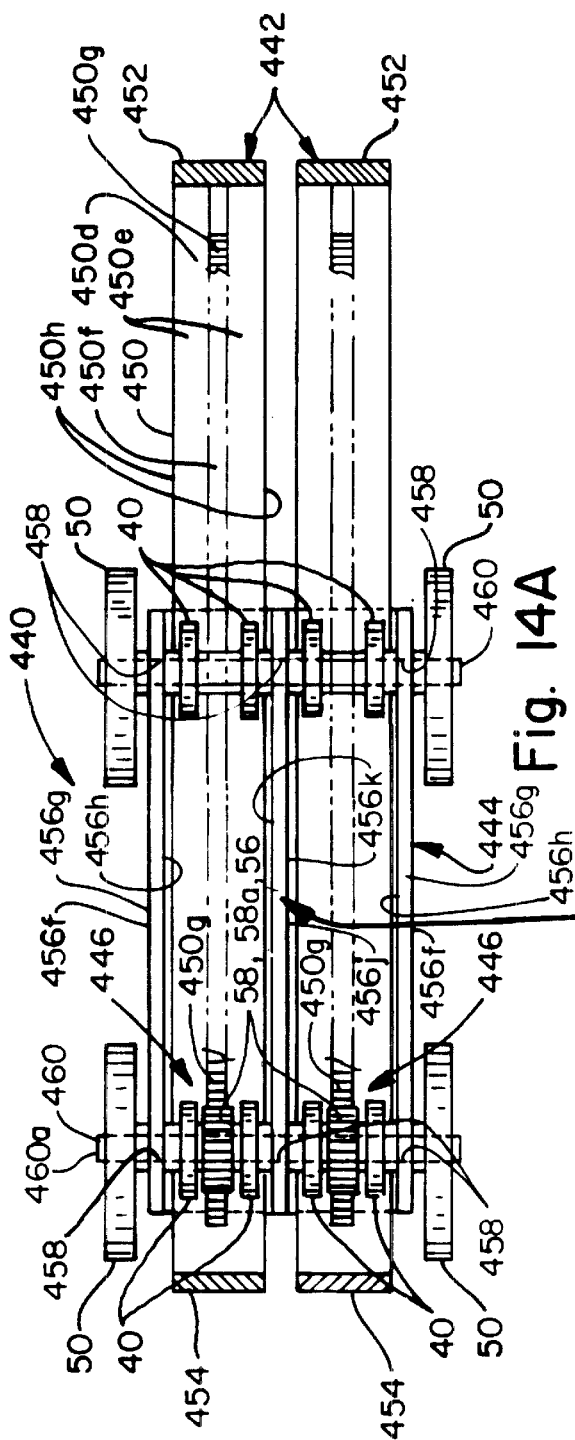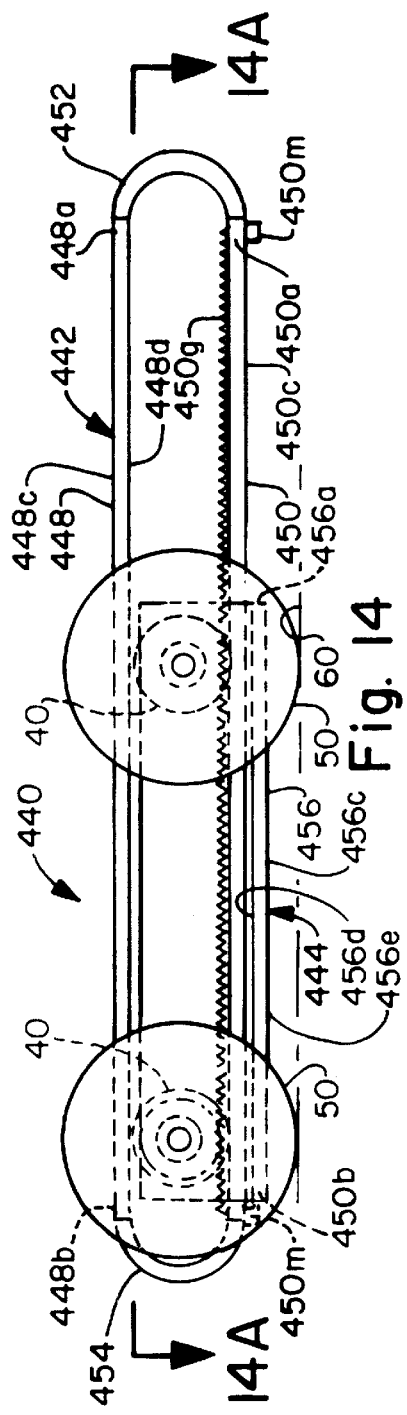

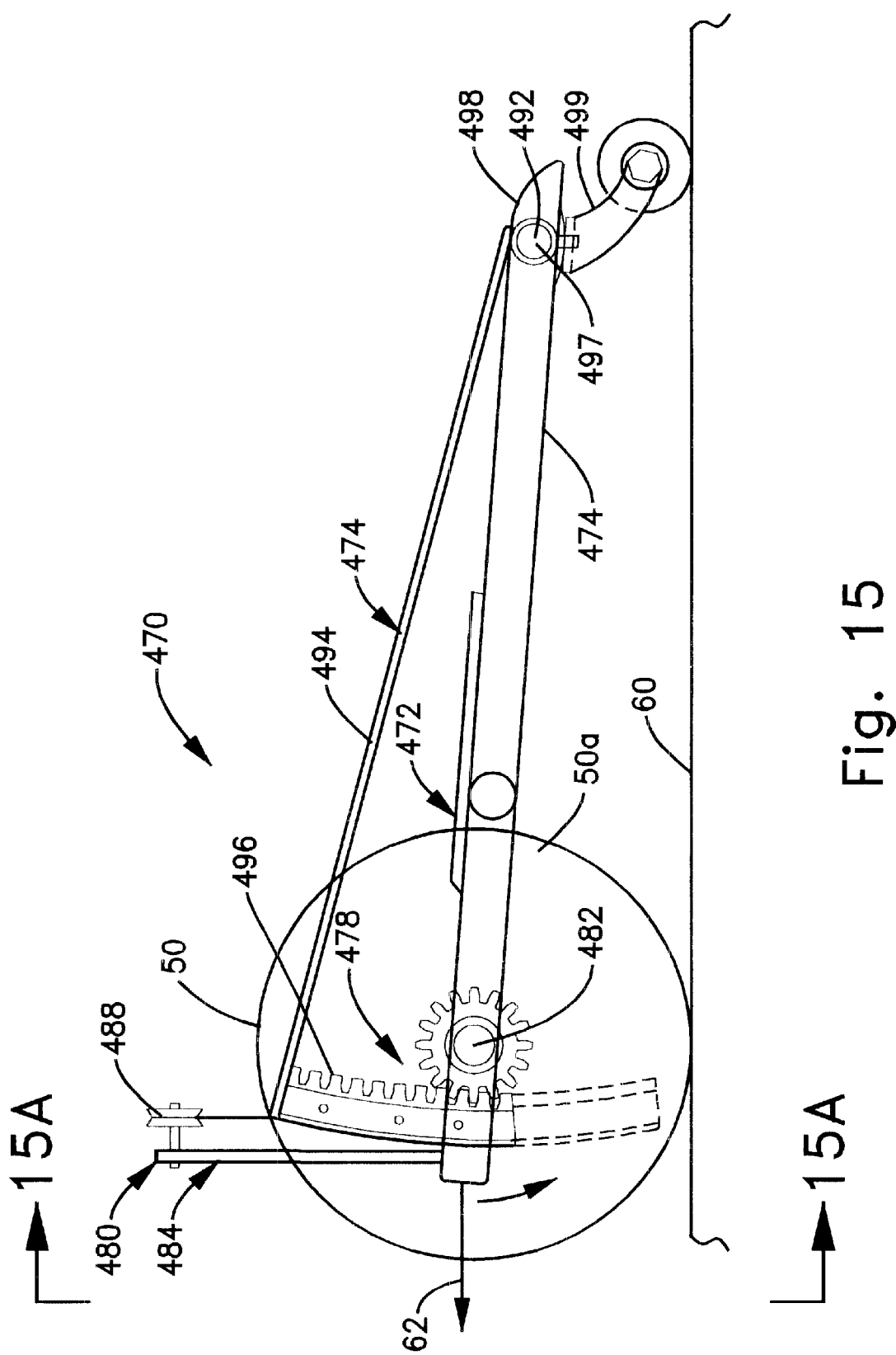

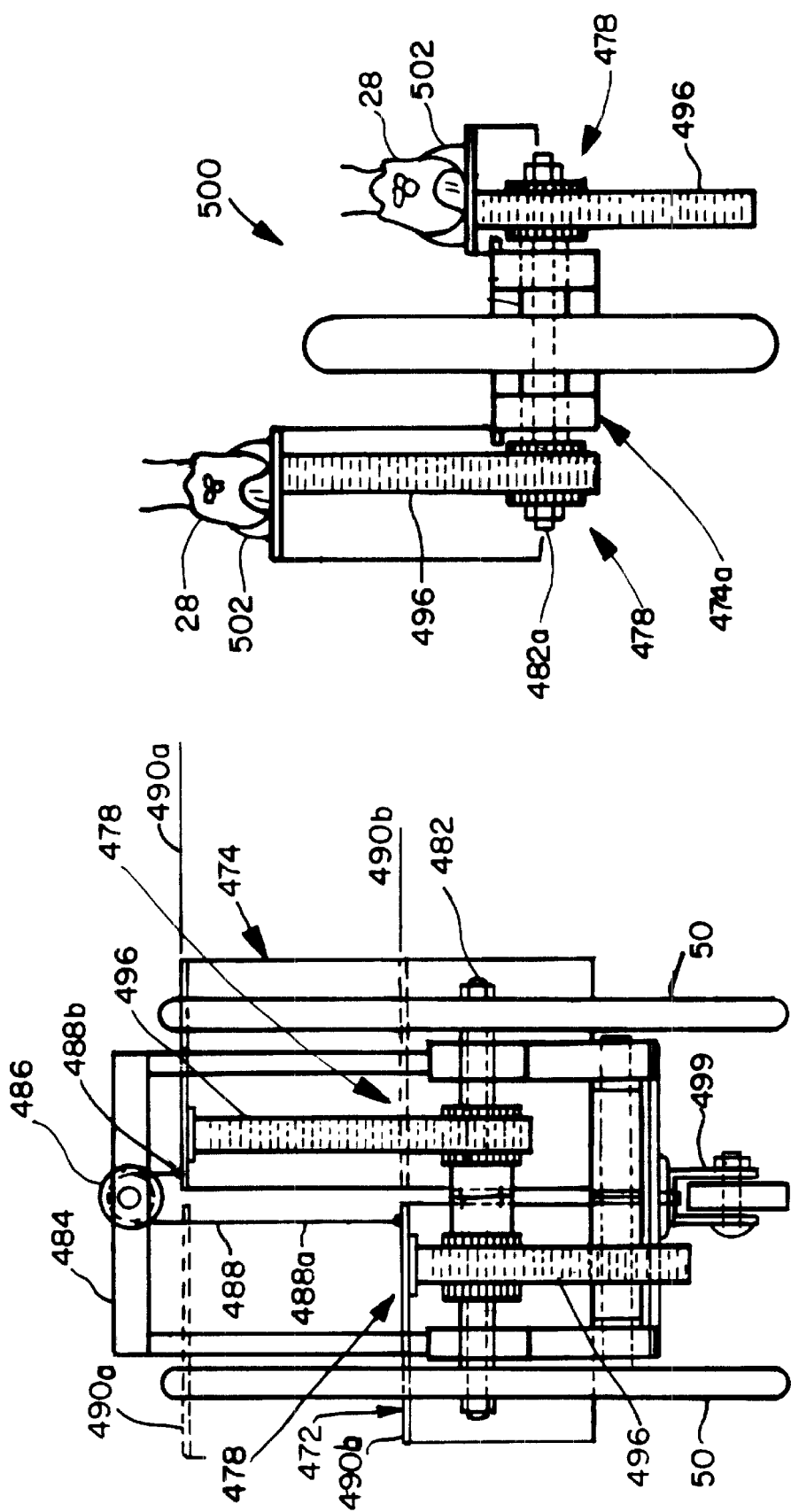

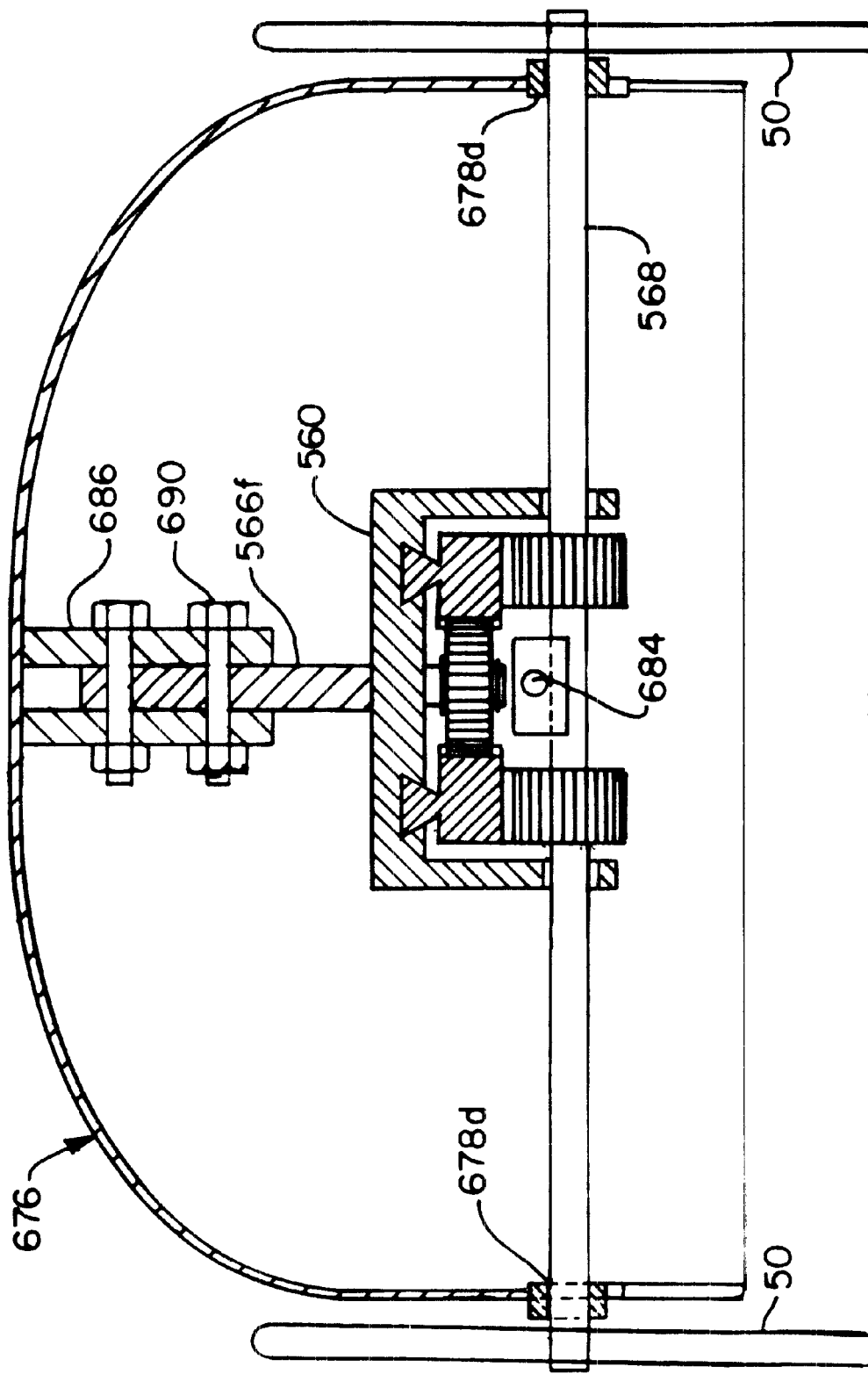

ROLLING FOOT APPARATUS WITH MOTION-CONVERSION MECHANISM

This is a Continuation of application Ser. No. 09/045,077 filed on Mar. 20, 1998 now abandoned.

BACKGROUND OF THE INVENTION

This invention relates to a rolling foot-powered apparatus which is mounted for movement on conventional rollers and more specifically, to a rolling foot-powered apparatus comprising at least a movable assembly that is supported on a stationary assembly, which in turn is provided with means for supporting the rollers of the rolling foot-powered apparatus, and at least a motion-conversion mechanism or alternatively a retractable motion-conversion mechanism. Namely, there is provided a rolling foot-powered apparatus, which includes a motion-conversion mechanism that is designed so as to be operative to convert the linear motion of a movable assembly or alternatively the oscillating motion of a movable assembly into the continuous circular motion of a rotatable shaft. This continuous circular motion in turn is transferred to the rotating roller, or alternatively is transferred into a continuous circular motion directly to the rotating rollers. The rotating motion of the rotatable rollers is operative for purposes of imparting a continuous linear motion to the rolling foot-powered apparatus. Motion is imparted to the movable assembly of the rolling foot-powered apparatus by gravitational force that is generated by a human body, or alternatively by dynamic thrust force that it generated by means of the human foot, and which is applied to the movable assembly of the rolling foot-powered apparatus.

It has long been known in the prior art to provide rolling foot-powered apparatus embodying different types of construction such as, for example, a rolling blade, a rolling skate, rolling scooter, rolling toy vehicle and rolling boards, that employ the dynamic thrust of one human foot against the ground while the other foot rides on the rolling foot-powered apparatus, such apparatus being capable of providing different kinds of performance. It is also known in the prior art to provide in such rolling foot-powered motion-conversion mechanisms embodying different types of construction that are capable of providing different kinds of performance. A prior art form of a rolling foot-apparatus embodying such a motion-conversion mechanism suitable for use in a variety of different type of applications is that illustrated in U.S. Pat. No. 4,667,975, which issued on May 26, 1987. U.S. Pat. No. 4,667,975 is directed to a hand-powered toy vehicle, which embodies a motion-conversion mechanism that is designed to convert the oscillating motion of a hand-operated lever into a continuous circular motion, which in turn is suitable for use for purposes of imparting rotation to a power output wheel assembly. In accordance with the teachings of U.S. Pat. No. 4,667,975, the motion-conversion mechanism thereof is characterized in that two externally-toothed gears, a drive gear and a driven gear are provided, with the driven gear being mounted permanently to the axis of a wheel assembly and with the drive gear being rotatably mounted on the axis of the same aforementioned wheel assembly. These two gears i.e., the drive gear and the driven gear, mesh with one another with the assistance of a spring. The hand-powered toy vehicle to which U.S. Pat. No. 4,6677,975 is defected is operable by means of a hand lever that is cooperatively associated with ratchet means in order so as to thereby engage the drive gear, which in turn engages the driven gear when the lever is moved in a forward direction.

Another prior art form of rolling foot-powered apparatus suitable for use in a variety of different types of applications is that illustrated in U.S. Pat. No. 4,657,265, which issued on Apr. 14, 1987. U.S. Pat. No. 4,657,265 is directed to a convertible skate, comprising a shoe assembly under which there is attached a rear two wheel truck assembly with steering capabilities a and front single wheel truck assembly that is pivotally mounted for movement about a vertical axis. This convertible skate is designed to be powered by means of the thrust force of a human foot.

Although rolling foot-powered apparatus embodying motion conversion mechanisms, which have been constructed in accordance with the teachings of the prior art such as those set forth, for example, in of the aforementioned patents, are capable of providing adequate performance in converting a linear motion, or alternatively oscillating motion produced by the dynamic output of a human foot, into continuous circular motion, a need has nevertheless been evidenced for improvements to be made thereto.

One such improvement which is deemed to be needed with regard thereto, resides in the desire to be able to provide a rolling foot-powered apparatus with a motion-conversion mechanism, which is operative for the purpose of maximizing the speed that is capable of being provided by a human being.

Another such improvement, which is deemed to be needed with regard thereto, resides in the desire to be able to utilize the weight of a human body to impart continuous linear motion to a rolling foot-powered apparatus.

Still a further such improvement, which is deemed to be needed with regard thereto, resides in the desire to be able to utilize the dynamic thrust of a human foot used to impart continuous linear motion to a rolling foot-powered.

Another such improvement, which is deemed to be needed with regard thereto, resides in the desire need to be able to utilize the linear vertical motion of a human foot to impart continuous linear motion to a rolling foot-powered apparatus.

Still another such improvement, which is deemed to be needed with regard thereto, resides in the desire to be able to utilize relatively linear horizontal motion of a human foot to impart continuous linear motion to a rolling foot-powered apparatus.

Another such improvement, which is deemed to be needed with regard thereto, resides in the desire to be able to utilize the forward oscillating motion of a human foot to impart continuous linear motion to a rolling foot-powered apparatus.

Still one more such improvement, which is deemed to be needed with regard thereto, resides in the desire to be able to utilize the backwards oscillating motion of a human foot to impart continuous linear motion to a rolling foot-powered apparatus.

It is, therefore, an object of the present invention to provide a new and improved motion-conversion mechanism for use in a rolling foot-powered apparatus suitable for purposes of maximizing that is capable of being produced by a human being.

It is a further object of the present invention to provide a new and improved motion-conversion mechanism which is particularly suited for use in a rolling foot-powered apparatus that is characterized in that it is possible therewith to convert the gravitational forces of the human body into linear motion.

It is another object of the present invention to provide a new improved rolling foot-powered apparatus wherein the motion-conversion mechanism thereof converts vertical linear motion into a continuous circular motion, which is suited to impart continuous linear motion to the rolling foot-powered apparatus.

Another object of the present invention is to provide a new improved rolling foot-powered apparatus wherein the motion-conversion mechanism thereof converts dynamic linear relatively horizontal motion into continuous circular motion, which is suited to impart continuous linear motion to the rolling foot-powered apparatus.

A further object of the present invention is to provide a new improved rolling foot-powered apparatus wherein the motion-conversion mechanism thereof converts a backwards oscillating motion of a human foot into continuous circular motion suited to impart continuous linear motion to the rolling foot-powered apparatus.

A further object of the present invention is to provide a new improved rolling foot-powered apparatus wherein the motion-conversion mechanism thereof converts the forward oscillating motion of a human foot into continuous circular motion suited to impart continuous linear motion to the rolling foot-powered apparatus.

A further object of the present invention to provide a new improved rolling foot apparatus wherein the motion-conversion mechanism converts a angular forward oscillating motion of a human foot into continues circular motion suited to thrust the rolling apparatus into continues linear motion.

A further object of the present invention is to provide a new improved rolling foot-powered apparatus wherein the motion-conversion mechanism thereof is of the a retractable type, converting linear motion of a human foot into continuous circular motion suited to impart continuous linear motion to the rolling foot-powered apparatus.

A further object of the present invention to provide is a new improved rolling foot-powered apparatus wherein the motion-conversion mechanism thereof converts the angular backwards oscillating motion of a human foot into continuous circular motion suited to impart continuous linear motion of the rolling foot-powered apparatus.

A further object of the present invention is to provide a new improved rolling foot-powered apparatus wherein the motion-conversion mechanism thereof is of the retractable type, converting an oscillating motion of a human foot into continuous circular motion suited to impart continuous linear motion to the rolling foot-powered apparatus.

A further object of the present invention is to provide a new improved rolling foot-powered apparatus wherein the motion-conversion mechanism thereof and the retraction mechanism are independent of each other, converting a linear motion of a human foot into continuous circular motion suited to impart continuous linear motion to the rolling foot-powered apparatus.

A further object of the present invention is to provide a new improved rolling foot-powered apparatus wherein the motion-conversion mechanism thereof and the retraction mechanism are independent of each other, converting an oscillating motion of a human foot into continuous circular motion suited to impart continuous linear motion to the rolling foot-powered apparatus.

SUMMARY OF THE INVENTION

In accordance with the present invention, there is provided a motion-conversion mechanism or alternatively a retractable motion-conversion mechanism, which is particularly suited for use with rolling foot-powered apparatus of the type that includes at least a movable assembly and a stationary assembly the letter being supported for movement on rotating rollers, and when so employed is operative to convert the linear motion of the movable assembly or alternatively oscillating motion of the movable assembly into continuous circular motion which is suitable for use for the purposes of imparting rotation to the rollers of the rolling foot-powered apparatus. More specifically, the rolling foot-powered apparatus with which the subject motion-conversion mechanism or alternatively the retractable motion-conversion mechanism is particularly suited for use, embodies at least a linearly moving assembly or alternatively an oscillating movable assembly, and a stationary assembly that is supported for movement on rotatable rollers. Moreover, the linear moving assembly or alternatively the oscillating movable assembly and the stationary assembly of the rolling foot-powered apparatus, which is supported on rollers for movement are cooperatively associated one with another such that the linear moving assembly or alternatively the oscillating movable assembly is capable of being made to undergo vertical or horizontal linear motion about a predefinable point or alternatively an oscillating motion about a predefinable pivot point in a semicircular path about the stationary assembly. Motion is imparted to the linearly moving assembly or alternatively the oscillating movable assemblies by virtue of the forces produced either by the gravitational forces of the human body or alternatively by the dynamic thrust of a human foot. The subject motion-conversion mechanism or alternatively the retractable motion-conversion mechanism includes one or more circular either externally or alternatively internally teethed segments, one or more rack-like straight teethed segments which are part of the movable assembly, one or more rotatable shafts or alternatively fixedly mounted shafts, one or more circular rotatable teethed gears, and one or more free-wheel or alternatively ratchet mechanisms, with the free-wheel or ratchet mechanisms being partially mounted on the rotatable shafts and partially on the circular gears, or alternatively partially mounted on the circular gears and partially on the rotating rollers that are part of the stationary assembly, and on which the rolling foot-powered apparatus is supported for movement. As such, the subject motion-conversion mechanism or alternatively the retractable motion-conversion mechanism is operative to convert the linear motion of the movable assembly or alternatively the oscillating motion of the movable assembly into continuous circular motion of the rotatable rollers through a the rotatable shaft or alternatively the rotatable rollers, with rotation of the rollers being employed for purposes of imparting continuous linear motion to the rolling foot-powered apparatus.

BRIEF DESCRIPTION OF THE DRAWINGS

FIG. 2A is a cross-sectional view of the rolling foot-powered apparatus, depicted in FIG. 2 taken substantially along the line 2A—2A in FIG. 2, constructed in accordance with the present invention;

FIG. 2B is a cross-sectional view of the rolling foot-powered apparatus, depicted in FIG. 2 taken substantially along the line 2B—2B in FIG. 2, constructed in accordance with the present invention;

FIG. 2C is a plan cross-sectional view of the rolling foot-powered apparatus, depicted in FIG. 2 taken substantially along the line 2C—2C in FIG. 2, constructed in accordance with the present invention;

FIG. 2D is a partial-sectional view of the rolling foot-powered apparatus, depicted in FIG. 2C taken substantially along the line 2D—2D in FIG. 2C, constructed in accordance with the present invention;

FIG. 2E is cross-sectional view of a free-wheel integrated with a circular externally teethed gear employed in the first embodiment of a motion-conversion mechanism of a rolling foot-powered apparatus constructed in accordance with the present invention;

FIG. 2F is cross-sectional view of a free-wheel integrated with a beveled circular externally teethed gear and beveled teethed rack employed in the second embodiment of a motion-conversion mechanism of a rolling foot-powered apparatus constructed in accordance with the present invention;

FIG. 2H is a plan cross-sectional view of a second embodiment of a rolling foot-powered apparatus, which embodies a movable assembly supported for linear vertical movement on a stator assembly and a motion-conversion mechanism, constructed in accordance with the present invention;

FIG. 2K is a plan cross-sectional view of a third embodiment of a rolling foot-powered apparatus, which embodies a movable assembly supported for linear vertical movement on a stator assembly and a motion-conversion mechanism, constructed in accordance with the present invention;

FIG. 3 is a side elevation view of a fourth embodiment of a rolling foot-powered apparatus depicted in a first position, and which embodies a movable assembly supported for linear horizontal movement on a stator assembly and a motion-conversion mechanism, constructed in accordance with the present invention;

FIG. 3A is a plan-sectional view of the fourth embodiment of the rolling foot-powered apparatus depicted in FIG. 3, taken substantially along the line 3A—3A in FIG. 3, constructed in accordance with the present invention;

FIG. 3B is a plan cross-sectional view of a fifth embodiment of a rolling foot-powered apparatus, which embodies a movable assembly supported for linear horizontal movement on a stator and a motion-conversion mechanism, constructed in accordance with the present invention;

FIG. 3C is a side-elevation view of a sixth embodiment of a rolling foot-powered apparatus, which embodies a movable assembly supported for linear horizontal movement on a stator and a forth embodiment of a motion-conversion mechanism, constructed in accordance with the present invention;

FIG. 3D is a cross-sectional view of the sixth embodiment of the rolling foot-powered apparatus, depicted in FIG. 3C, taken substantially along the line 3D—3D in FIG. 3C, constructed in accordance with the present invention;

FIG. 4A is a plan-sectional view of the seventh embodiment of the rolling foot-powered apparatus depicted in FIG. 4, taken substantially along the line 4A—4A in FIG. 4, constructed in accordance with the present invention;

FIG. 4B is a plan cross-sectional view of an eighth embodiment of a rolling foot-powered apparatus, which embodies a movable assembly supported for oscillating movement on a stator depicted and a motion-conversion mechanism, constructed in accordance with the present invention;

FIG. 13 is a side elevational view of a eighteenth embodiment of a rolling foot-powered apparatus depicted in a first position, which embodies two movable assemblies supported for linear vertical movement on a stationary assembly and a first embodiment of a linearly retractable motion-conversion mechanism, constructed in accordance with the present invention;

FIG. 13B is a rear-sectional view of the eighteenth embodiment of the rolling foot-powered apparatus depicted in FIG. 13, taken substantially along the line 13B—13B in FIG. 13, constructed in accordance with the present invention;

FIG. 14 is a side elevation view of a nineteenth embodiment of a rolling foot-powered apparatus depicted in a first position, which embodies two movable assemblies supported for linear horizontal movement on a stationary assembly a motion-conversion mechanism and a second embodiment of a retractable mechanism, constructed in accordance with the present invention;

FIG. 14A is a plan-sectional view of the nineteenth embodiment of the rolling foot-powered apparatus depicted in FIG. 14, taken substantially along the line 14A—14A in FIG. 14, constructed in accordance with the present invention;

FIG. 14B is a plan-sectional view of the second embodiment retraction mechanism of the rolling foot-powered apparatus depicted in FIG. 14, constructed in accordance with the present invention;

FIG. 15 is a side elevation view of a twentieth embodiment of a rolling foot-powered apparatus depicted in a first position, which embodies two movable assemblies supported for oscillatable movement on a stationary assembly, a motion-conversion mechanism and a third retractable mechanism, constructed in accordance with the present invention;

FIG. 15A is a rear-elevational view of the twentieth embodiment of the rolling foot-powered apparatus depicted in FIG. 15, taken substantially along the line 15A—15A in FIG. 15, constructed in accordance with the present invention;

FIG. 16 is a rear-elevational view of the twenty-first rolling foot-powered apparatus depicted employing means attached to the human feet, which is operative for effecting retraction of the oscillatable movable assembly, constructed in accordance with the present invention;

FIG. 26A is a elevational-sectional view of the twenty-fifth embodiment of the rolling foot-powered apparatus depicted in FIG. 26, taken substantially along the line 26A, 26A in FIG. 26, constructed in accordance with the present invention;

DESCRIPTION OF THE PREFERRED EMBODIMENTS

Figure 1:
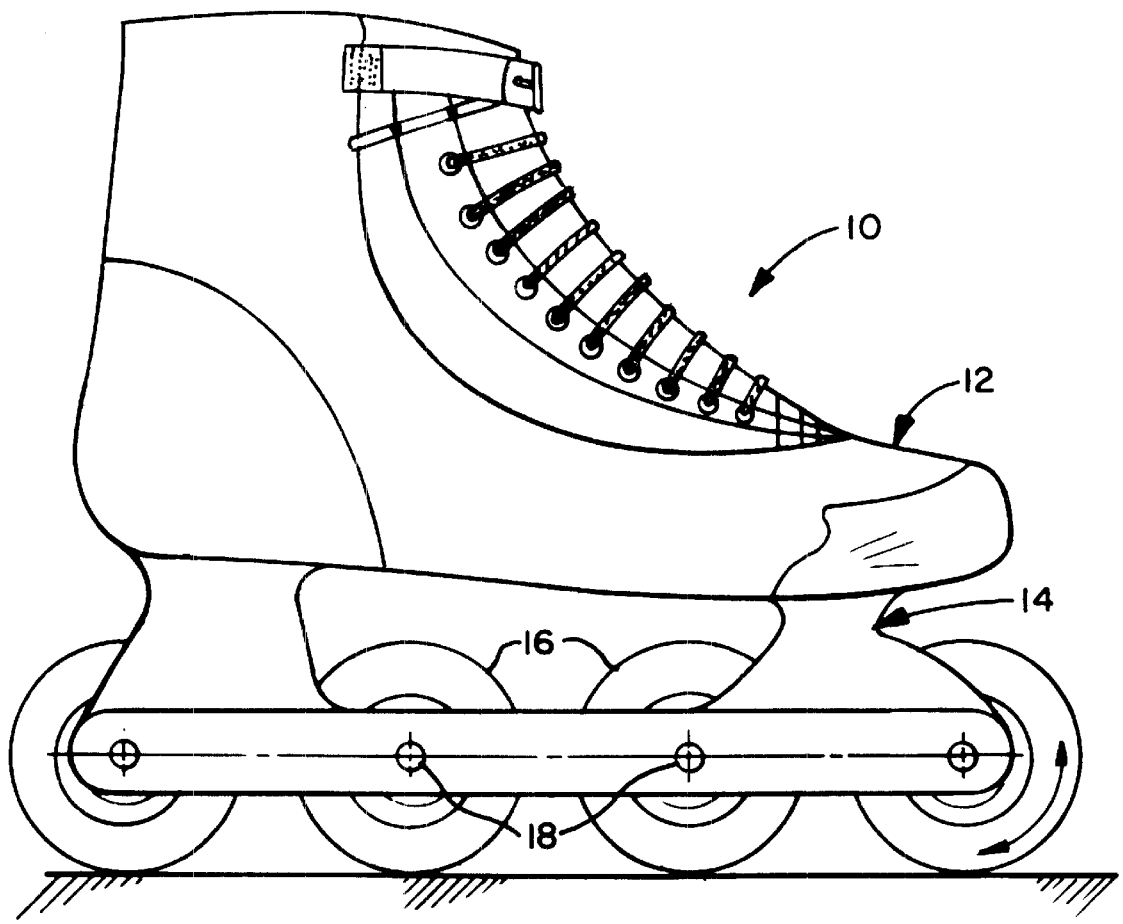
FIG. 1 is a side elevation view of a conventional roller skate, which is supported for movement on rotatable rollers and which is constructed in accordance with the teaching of the prior art.

Referring to FIG. 1 of the drawing, there is depicted therein a prior art form of a rolling blade type foot apparatus, generally designated therein by the numeral 10, which embodies a conventional type footwear 12 that is a part of a stationary assembly 14, which is supported for movement with shafts 18 on freely rotating rollers 16. The rolling blade type foot apparatus 10 employs the dynamic thrust of a human foot for effecting movement thereof.

Referring now to the drawing and more particularly to FIGS. 2, 2A, 2B, 2C and 2D thereof, there is depicted therein a rolling foot-powered apparatus, generally designated by the numeral 20, which embodies a movable assembly, generally designated by the numeral 22; a stationary assembly, generally designated by the numeral 24; and two motion-conversion mechanisms generally designated by the numeral 26, constructed in accordance with the present invention. Each of the motion-conversion mechanisms 26 comprises a portion of the movable assembly 22, and a portion of the stationary assembly 24.

The movable assembly 22 comprises a conventional footwear 28, which is defined by a front end 28a, a rear end 28b, an upper side 28c and a lower side 28d, and with a surface 28e that is mounted by means of suitably conventional mounting means on member 30, on which are attached the teethed segments 36 of the motion-conversion mechanism 26. The member 30, which is defined by a front end 30a, a rear end 30b, an upper horizontal surface 30c that is used for purposes of mounting by means of suitable conventional mounting means on the surface 28e of the conventional footwear 28, a lower horizontal surface 30d, a far side vertical surface 30e and a near side vertical surface 30f and teethed segments 36 that are mounted by means of suitable conventional mounting means on the member 30.

Continuing, with reference to the drawing and more particularly to FIGS. 3 and 3A thereof, there is depicted therein a fourth embodiment rolling foot-powered apparatus, generally designated by the numeral 120, which embodies a movable assembly, generally designated by the numeral 122, a stationary assembly, generally designated by the numeral 124, and two motion-conversion mechanisms, each generally designated by the numeral 126, constructed in accordance with the present invention. Each of the motion-conversion mechanisms 126, comprises a portion of the movable assembly 122 and a portion of the stationary assembly 124.

Continuing with reference to FIGS. 2, 2A, 2B, 2C and 2D of the drawing, as illustrated therein the stationary assembly 24 embodies a variable depth inverted U-shape configuration member, generally designated with the numeral 46, that extends horizontally between a front end 46a and a rear end 46b, and which is comprised of a front end interconnecting member 46c, a rear end interconnecting member 46d, an upper flat interconnecting member 46e and two opposing flat vertical side members 46f and 46f', the latter being parallel to each other and perpendicular to the inner horizontal surface 46g and outer horizontal surface 46h of the upper horizontal interconnecting member 46e, and which are mounted at a distance 46j by means of suitable conventional mounting means, such as, for example, welding or any other known conventional mounting means. The U-shape configuration member 46 further includes openings 46k operative for reaching therein the anti-friction means 54 of the rotatable shaft 32, threaded openings 46m and 46m' through which extend both side members 46f and 46f' which are horizontal and parallel to each other and perpendicular to the vertical flat surfaces 46p and 46r for receiving therein the threaded guides 40, openings receiving therein the 46n for teethed members 36 and the springs 48a of spring retainers 48. The spring retainers 48 that cooperatively associated with the springs 48a are of the channel type and are mounted by means of suitable conventional mounting means, such as, for example, welding, extend between the inner flat surfaces 46p and 46r of the side members 46f and 46f', are employed with the movable assembly for purposes of effecting the retraction thereof from the second position 44 to the first position 42. The rotatable shafts 32, which are supported for rotation within the anti-friction means 54, each have an outer surface 32a and two ends 32b that extend to side members 46f and 46f' of the U-shape configuration member 46 end which are operative for fixedly mounting by means of suitable construction mounting means the rollers 50 through the openings 50a.

A description will now be set forth herein of the motion-conversion mechanism 26 of the rolling foot-powered apparatus 20. Each motion-conversion mechanism 26 is comprised of the member 30 the aforementioned driving teethed member or teethed rack 36, which is cooperatively associated with the member 30, the rotatable shafts 32 that are supported for rotation in the anti-friction means 54, the latter being located on the side members 46f and 46f' of the U-configuration member 46, and a circular externally first teethed gear 58 with the teeth 58a thereof being in constant engagement with the teeth 36b of the rack member 36 and the free-wheel 56. The free-wheel 56 is comprising of the engaging means 56f, an outer rotatable ring 56b that has an outer cylindrical surface 56a and an inner surface 56e, the letter being so formed in order to thereby accept the engaging means 56f, and an inner ring 56c that has an inner cylindrical surface 56d and an outer surface 56g formed in order to also accept the engaging means 56f. The circular first gears 58 have an opening 58b formed therein for effecting the fixedly mounting therein by means of mounting means on the outer surface 56a of the outer ring 56b of free-wheel 56. The free-wheel 56 in turn is mounted by suitable conventional means mounting such as fixedly to the inner cylindrical surface 56d of inner ring 56c on the outer cylindrical surface 32a of the rotatable shaft 32. The free-wheel 56 is positioned on the rolling foot-powered apparatus in such a way that when the movable assembly generally designated by the numeral 22, moves from the first position 42 thereof to the second position 44 thereof the first circular gear 58 rotates clockwise and the outer ring 56b engages with the engagement means 56f such that the inner ring 56c consequently applies forces to the rotatable shaft 32 therethrough to the rollers 50. When the movable assembly 22 moves from the second position 44 thereof to the first position 42 thereof the first circular gear 58 with the outer ring 56b of the free-wheel 56 rotates counterclockwise thereby disengaging the inner ring 56 fro the free-wheel 56, thus allowing first circular gear 58 to rotate freely. Spacer 52 are provided in between the free-wheel 56, the rollers 50 and the stationary assembly 24 in order to thereby minimize the friction forces.

By way of illustration, when the weight of a person or a thrust force imparted thereby is applied on the movable assembly 22, the assembly 22 moves linearly and slidably downwards from the upper first position 42 to the lower second position 44. Consequently, since the teeth 38b of member 36 are in constant engagement with the teeth 58a of the first circular gear 58, the outer ring 56b of the free-wheel 56 rotates clockwise so as to thereby engage for rotation the inner ring 56c and with it the rotatable shaft 32 and the rollers 50 supported thereon. When the movable assembly 22 moves upwards with the assistance of spring 58a upon the lifting of the person's foot and thereby moves from the second position 44 to the first position 42, the first circular gear 58 rotates with the outer ring 56b of the free-wheel 56 counterclockwise freely as a result of the disengagement of the inner ring 56c of the outer ring 56b of the free-wheel 56. The repetitive downward linear motion of the movable assembly 22 is translated into a circular continuous motion of the rotatable shafts 32 and of the rollers 50 supported thereof. Since the rollers 50 of the rolling foot-powered apparatus 20 are constantly engaged with the ground surface 60 friction forces are developed therebetween. The frictional forces between the rollers 50 and the ground surface 60 are employed for purposes of effecting the thrusting of the rolling foot-powered apparatus 20 in a forward linear motion designated by the reference 62.

Reference now will be had to FIG. 2E of the drawing. FIG. 2E is a partial sectional view of a second embodiment of a free-wheel of the ratchet type which is generally designated by the numeral 62 and which is rotatably mounted on a rotatable shaft 70. Free-wheel 62 is comprised of a driving gear 64 having engaging means 64a mounted for free rotation on the bearing means 65, and a driven portion 66 having an inner splined cavity 66a with the splines 66b thereof being fixedly mounted by means of the mounting 66c on the outer surface 70a of the rotatable shaft 70. In the splined cavity 66a of the driven portion 66 of the free-wheel 62 is there is slidably mounted an externally splined cylindrical member 68 having the splines 68a thereof constantly engaged with the splines 66b of the free-wheel 62. The slidable member 68, which further includes the engaging means 68c, is kept in constant engagement with the engaging means 64a of rotatable gear 64 by means of one or more spring 68b. The free-wheels 62 are mounted on the rolling foot-powered apparatus in such a way that when the circular gear 64 rotates clockwise the engaging means 64a of the gear 64 engages the engaging means 68c of the splined cylindrical member 68. The rotation of the splined cylindrical member 68 is transferred through the splined member 66 and the rotatable shaft 70 to the rotatable rollers 50. When the circular gear 64 rotates counterclockwise, its engaging means 64a disengages from the engaging means 68a of the splined cylindrical member 68 and thus the circular gear 64 rotates freely. Positioning ring 70b is located on the rotatable gear 64 in a engaging position relative to the free-wheel 62.

Reference now will be had to FIG. 2F of the drawing. FIG. 2F is a partial sectional view of a third embodiment of a ratchet type free-wheel generally designated by the numeral 72, which is mounted on a rotatable shaft 76. Free-wheel 72 is comprised of a roller 74 having engaging means 74a that is rotatably mounted by means of the bearing means 74b on the rotatable shaft 76, a driving bevel gear 78 having an inner cavity 78a splined with splines 78b that is rotatably mounted by means of bearing means 78c on the rotatable shaft 76. In the splined cavity 78a of the bevel gear 78 there is slidably mounted the externally splined cylindrical member 80 of the free-wheel 72 such that the external splines 80a are kept constantly engaged with the splines 78b of the bevel gear 78 and by means of the springs 82 slidably engages the engaging means 78d of the engaging means 74a of the rotatable roller 74. The free-wheel 72 is positioned on the rolling foot-powered apparatus in such a way that when the circular gear 78 rotates clockwise, the engaging means 78d of the cylindrical member 80 engages the engaging means 74a of the rotatable roller 74 thus casing the rotatable roller 74 to rotate clockwise. When the circular bevel gear 74 rotates counterclockwise the engaging means 78d of the cylindrical member 78 disengages from the engaging means 74a of the rotatable roller 74 such that the circular gear thus rotates freely. Lock-type rings 80a are located in the grooves 76a that are suitably formed in the rotatable shaft 76 such as to thereby locate the rotatable roller 76 in a relative engaging position with the bevel gear 78 of the ratchet type free-wheel 72.

Figure 2:
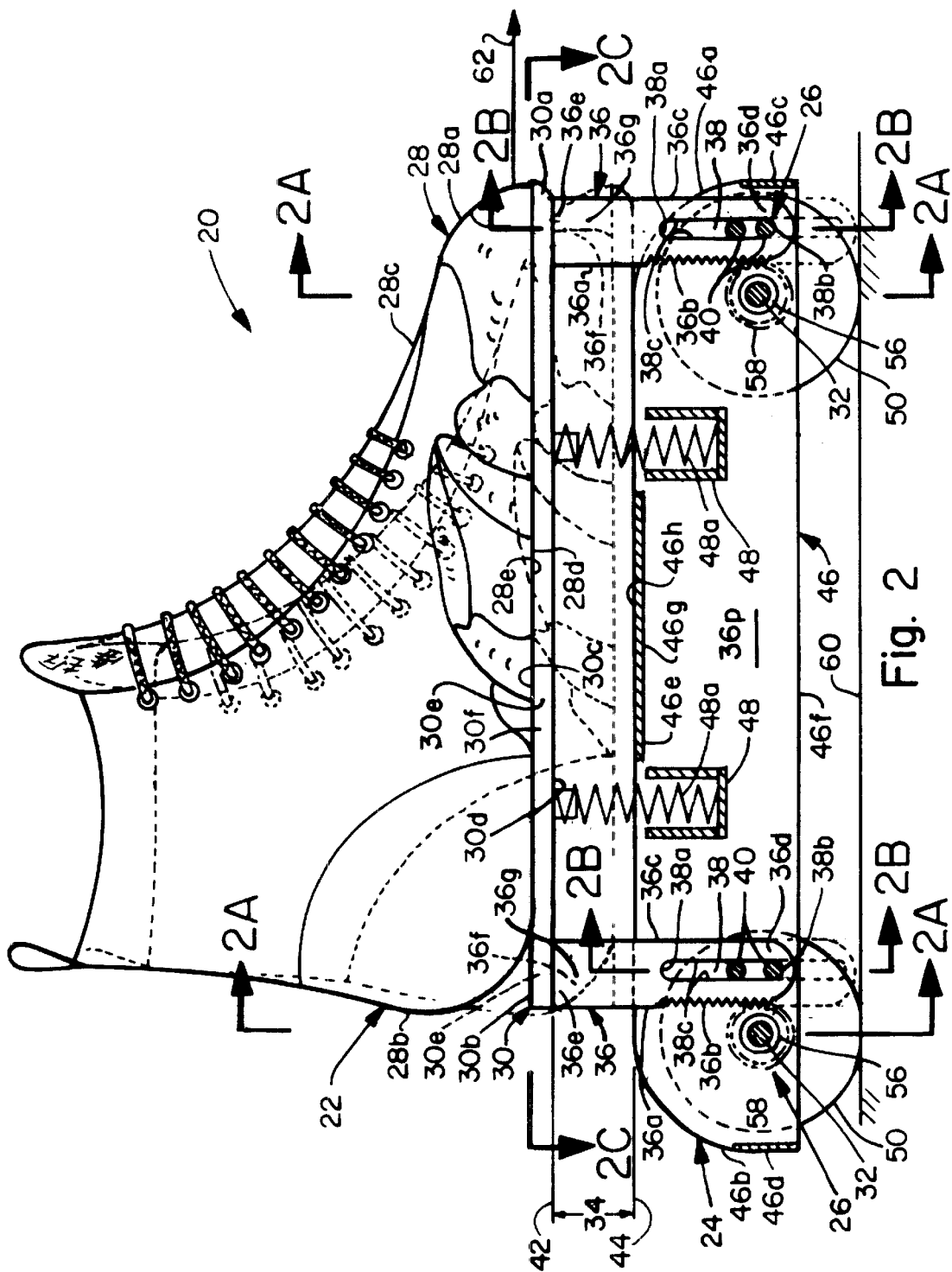
FIG. 2 is a side elevation view of a rolling foot-powered apparatus illustrated in a first position, which embodies a movable assembly that is supported for linear vertical movement therein on a stationary assembly, and which embodies a motion-conversion mechanism, constructed in accordance with the present invention.
Figure 2G:
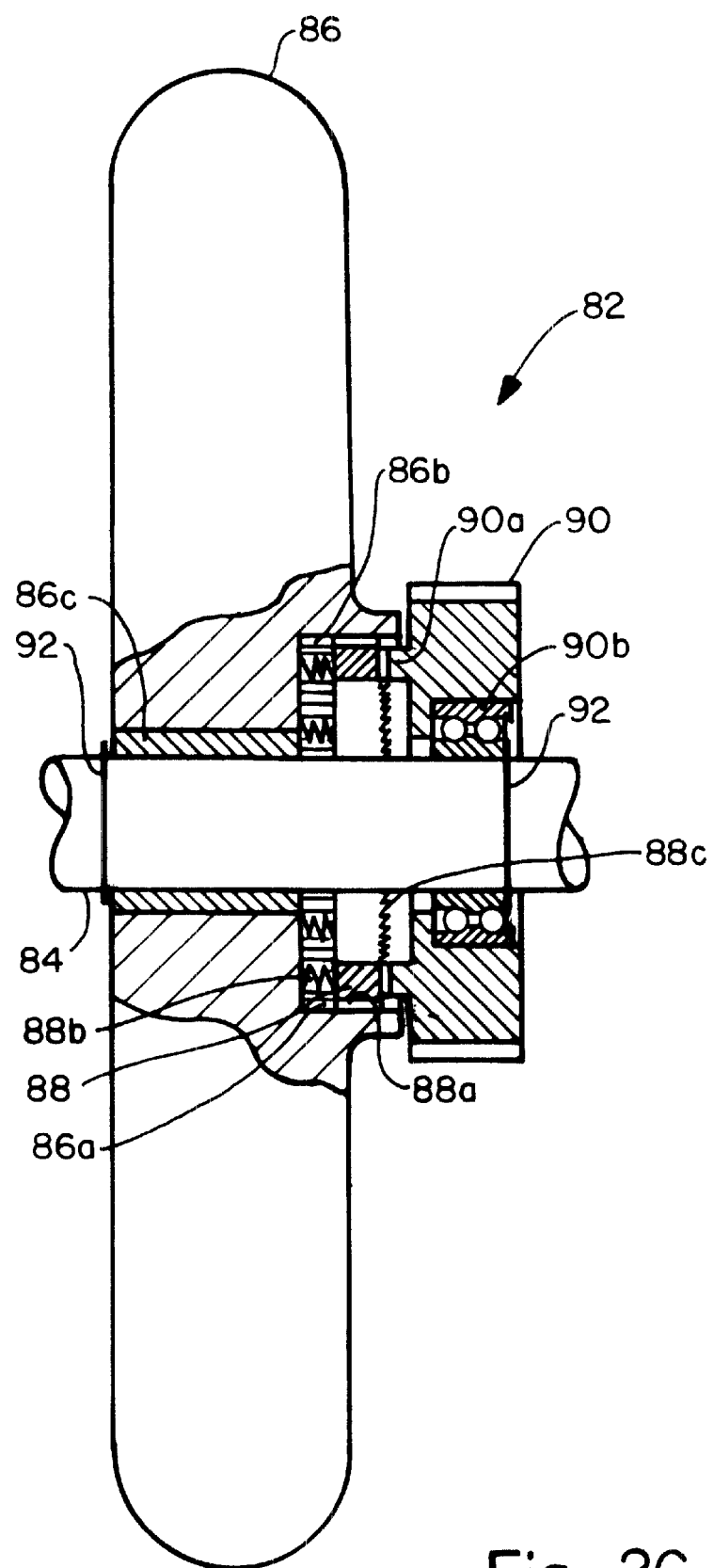
FIG. 2G is cross-sectional view of a free-wheel integrated with a rotatable roller employed in the third embodiment of a motion-conversion mechanisms of a rolling foot-powered apparatus constructed in accordance with the present invention.

Reference now will be had to FIG. 2G of the drawing. FIG. 2G is a partial sectional view of a fourth embodiment of a ratchet type free-wheel, generally designated by the numeral 82, which is rotatably mounted on a rotatable shaft 84. Free-wheel 82 is comprised of a rotatable roller 86 that is freely rotatable by means of the bearing means 86c on the rotatable shaft 84, a driving bevel gear 86 having an inner cavity 86a splined with splines 86b such as to capable of slidably accepting a hollow externally splined cylindrical member 88, the hollow externally splined member 88 includes splines 88a which are constantly engaged with the splines 86b of the rotatable roller 86 by means of the engaging means 88c, spring means 88b operative for effecting the engagement of the member 88 by means of the engaging means 88c with the engaging means 90a of the externally teethed circular gear 90, the externally teethed circular gear 90 mounted for rotation on the bearing means 90b and with the positioning means 92 being positioned in relative engagement with the rotatable rollers 86. Freewheel 82 is operative for effecting therewith a direct drive from the gear 90 to the roller 86 on the rolling foot-powered apparatus in a way such that when the circular gear 90 rotates clockwise, the engaging means 90a engages the means 88c of the externally splined cylindrical member 88 with the assistance of the spring 88b thereby transferring the rotation to the rotating rollers 86. When the circular gear 90 rotates counterclockwise, the engaging means 90a disengages from means 88c of the member 88 and thus the circular gear 90 rotates freely.

Figure 2L:
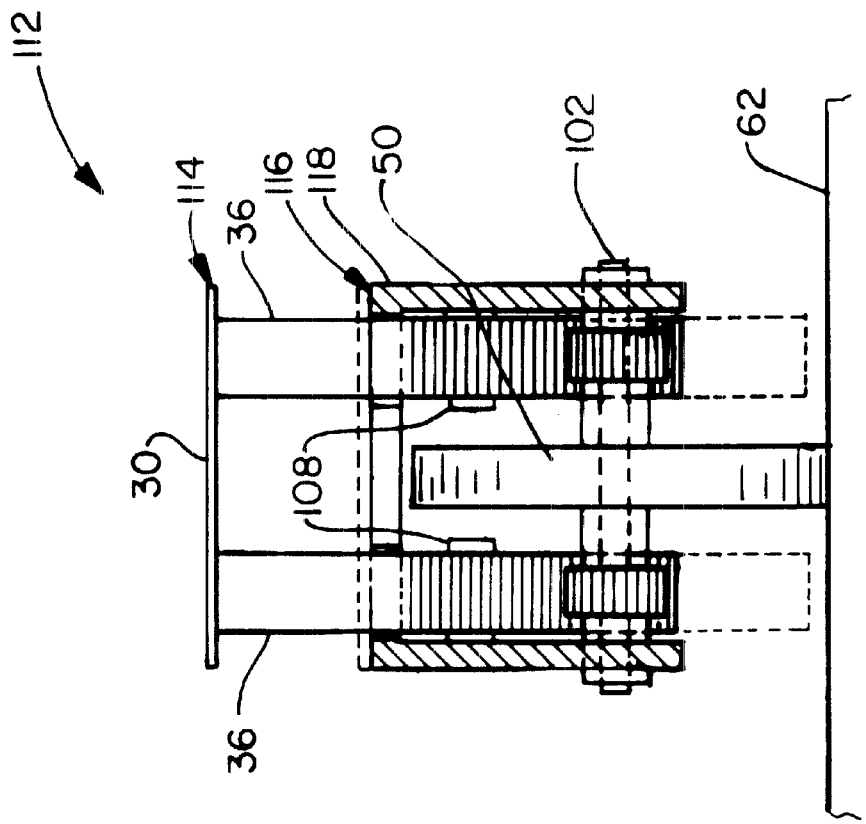
FIG. 2L is a sectional elevation view of the rolling foot-powered apparatus, depicted in FIG. 2H taken substantially along the line 2L—2L in FIG. 2K, constructed in accordance with the present invention.
Figure 2J:
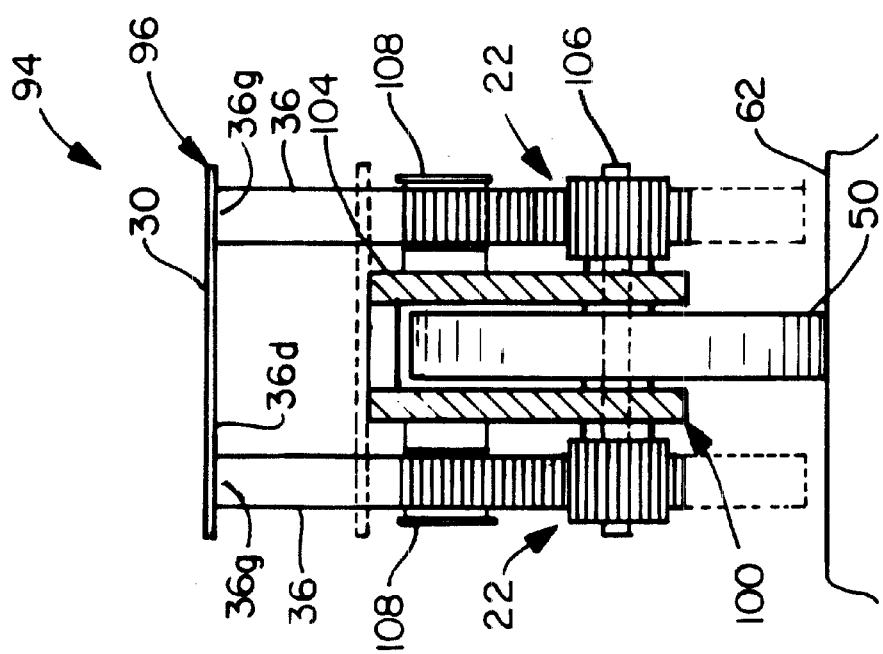
FIG. 2J is an elevational sectional view of the rolling foot-powered apparatus, depicted in FIG. 2H taken substantially along the line 2J—2J in FIG. 2H, constructed in accordance with the present invention.

Referring now to the drawing and more particularly to FIGS. 2H, and 2J thereof, there is depicted therein a second embodiment of a rolling foot-powered apparatus, generally designated by the numeral 94, which embodies a movable assembly, generally designated by the numeral 96, a stationary assembly, generally designated by the numeral 100, and four motion-conversion mechanisms, each generally designated by the same numeral 22, constructed in accordance with the present invention. Unlike the first embodiment of rolling foot-powered apparatus 20 shown in FIGS. 2A, 2B, 2C and 2D of the drawing wherein the two motion-conversion mechanisms 22 are positioned within the U-shape configured member 46 of the stationary assembly 24 and the four rollers 50 are positioned externally of the U-shape configured member 46, the present second embodiment of rolling foot-powered apparatus 94 embodies two rollers 50, which are positioned externally of a U-shape configured member 104 of a stationary assembly 100 and the number of motion-conversion mechanisms 22 are positioned within the U-shape configured member 104. Each of the motion-conversion mechanisms 22 is operable to convert the linear vertical motion of the movable assembly 96 into a continuous circular motion of the rotatable shafts 106 on which are fixedly mounted for rotation the rollers 50. Furthermore the teethed segments 36, which are formed on the member 30 of the movable assembly 96, are mounted in slidable engagement with the guiding means 108 of the stationary assembly 100.

Reference will be now had now to the drawing and more particularly to FIGS. 2K and 2L thereof. There is depicted therein a third embodiment of a rolling foot-powered apparatus, generally designated by the numeral 112, which embodies a movable assembly, generally designated by the numeral 114, a stationary assembly generally designated by the numeral 22 and four motion-conversion mechanisms, each generally designated by the same numeral 116, constructed in accordance with the present invention. Unlike the second embodiment of rolling foot-powered apparatus 94 shown in FIGS. 2H and 2J of the drawing, wherein the four motion-conversion mechanisms 22 are positioned externally of the U-shape configured member 104 of the stationary assembly 100, in the present third embodiment of rolling foot-powered apparatus 112, the four rollers 50 are positioned externally of the U-shape configured member 118 of the stationary assembly 116 and the four motion-conversion mechanisms 22 are positioned within the U-shape configured member 104. The motion-conversion mechanisms 22 are operable to convert the linear vertical motion of the movable assembly 114 into a continuous circular motion of the rotatable shaft 102 on which are fixedly mounted for rotation the rollers 50, and with the teethed segments 36, which are formed on the member 30 of movable assembly 114, being mounted in slidable engagement with the guiding means 108 of the stationary assembly 116.

Continuing, with reference to the drawing and more particularly to FIGS. 3 and 3A thereof, there is depicted therein a fourth embodiment rolling foot-powered apparatus, generally designated by the numeral 120, which embodies a movable assembly, generally designated by the numeral 122, a stationary assembly, generally designated by the numeral 124, and two motion-conversion mechanisms, each generally designated by the numeral 126, constructed in accordance with the present invention. Each of the motion-conversion mechanisms 126, comprises a portion of the movable assembly 122 and a portion of the stationary assembly 124.

The movable assembly 122 is comprised of the conventional footwear 28, the latter having a front end 28a, a rear end 28b, an upper side 28c and a lower side 28d and which is mounted by means of suitable mounting means such as straps or any other suitable conventional means (not shown) operative for effecting therewith mounting on the upper horizontal surface 130c of the member 130 that is employed for attaching therewith to the teethed rack assembly, generally designated with the numeral 136, of the motion-conversion mechanism 126. The member 130 which is has a front end 130a, a rear end 130b, an upper horizontal surface 130c, which is employed for purposes of mounting thereon by means of suitable conventional mounting means the conventional footwear 28, and a lower smooth horizontal surface 130d which is operative as support for the guiding rollers 40, is fixedly mounted by means of suitable mounting means such as by being welded or bolted (not shown) to member 136 by the two portions 131.

Continuing with the description of the movable assembly 122 of the rolling foot-powered apparatus 120, and more specifically, to the driving assembly 136 of the motion-conversion mechanism 126 thereof, member 136 under which guiding rollers 40 are positioned, has a suitable length. The member 136 has a front end 136c to which is attached one of the portions 131, a rear end 136d to which is attached the other of the portion 131, a width 136e, a lower flat surface 136f and an upper horizontal flat surface 136g. Surface 136g of the driving member 136 is divided into two outer section 136h, which are horizontally smooth and which are parallel to each other, and is operative for effecting therewith rolling of the guiding rollers 40, and a center section, which has a teethed configuration 136j formed by the teeth 136k, extending as shown or may be indented relative to the horizontal surface 136g (not shown). The length of portions 131 is equal to the diameter of the rotatable guiding rollers 40 plus a nominal clearance suitable for permitting a slidable repetitive movement of the movable assembly 122 from a first position 142 thereof to a second position 142 thereof and vice versa. Below the member 136 and on the flat surface 136f there are mounted by means of suitable conventional mounting means, at a distance denoted by numeral 136d, two portions or stops 136n. The distance in between the portions 136n is equal to the length of the U-shape configured member 146 of the stationary assembly 124 plus the traveling distance of the movable assembly 122 when traveling from the first position 142 thereof to the second position 144 thereof.

Continuing with reference to FIGS. 3 and 3A of the drawing, as illustrated therein the stationary assembly 124 embodies an inverted U-shape configuration member 146 of variable depth that extends horizontally between a front end 146a, and a rear end 146b and has an upper end 146c, a lower end 146d, a lower outer horizontal surface 146e, a lower inner horizontal surface 146f, two horizontally smooth, surfaces 146g, which are parallel to each other, and two outer side surfaces 146h. The surfaces 146g are perpendicular to the surfaces 146e and 146f and extend therebetween a distance denoted by the numeral 146k. The distance 146k is equal to the width denoted by the numeral 136e of the member 136 plus a clearance suitable to allow for free linear and horizontal movement of the movable assembly 122.

Continuing with reference to the U-shape configuration member 146, three cylindrical openings 138 extend through both sides of the member 146 and perpendicularly to the side surfaces 146g and 146h. The openings 138 are parallel to each other and are located at the same horizontal plane with two of the openings 138 being located near the ends 146a and 146b so as to by capable of being used for purposes of rotatably mounting bearing means on the rotatable shafts 132 and 134.

A description will now be set forth of the remainder of the stationary assembly 124 of the linearly horizontally moving rolling foot-powered apparatus 120. On each end 132a and 134a of the shafts 132 and 134 there is fixedly mounted a rotatable roller 50. In the space extending between the inner surfaces 146g of member 146 there is rotatably mounted on each shaft 134 two rotatable rollers 40, at a distance suitable for effecting rolling on the smooth horizontal surfaces 136h by means of a spacer 134c and the gear 58 insofar as the free roller 56 on shaft 132 concerned and by means of the spacers 134c insofar us shaft 134 is concerned. Additional spacers 134c are provided between the member 146, the rollers 50 and the guiding rollers 40 of the stationary assembly 124. Each externally teethed circular gear 58 is mounted on a free-wheel 56 in the manner described previously with reference to FIGS. 2, 2A, 2B, 2C and 2D of the drawing such that the external teeth 58a of the first gear 58 is in constant engagement with the teeth 136k of the member 136 of the movable assembly 122. Spring means 148 is attached to the rear end 146b of the U-shape configured member 146 as well as to the rear end 136a of the member 136. The spring means 148 is to assist the movable assembly 122 in moving from the second position 144 thereof to the first position 142 thereof.

By way of illustration, when a linear horizontal force, as such one imparted by the human foot is applied towards the rear of the movable assembly 122 the force imparted thereby to cause the movable assembly 122 to move slidably from the first position 142 thereof to the second position 144 thereof. At this occurs, since the teeth 136k of member 136 are in constant engagement with the teeth 58a, the first circular gear 58 is caused to rotate clockwise. As a consequence, the rotatable moment of the gear 58, which is transferred to the rotatable rollers 50 via the rotatable shaft 132 are operative to thrust the rolling foot-powered apparatus 120 such as to cause the rolling foot-powered apparatus 1220 to move with a forward linear motion denoted by the numeral 62. When the movable assembly 122 is caused to move from the second position 144 thereof to the first position 142 thereof the circular gear 58 rotates freely counterclockwise.

Reference will now be had now to the drawing and more particularly to FIG. 3B thereof, wherein there is depicted a fifth embodiment of a rolling foot-powered apparatus, generally designated by the numeral 150. The rolling foot-powered apparatus 150 embodies a movable assembly, generally designated by the numeral 152, a stationary assembly, generally designated by the numeral 154, and four independent motion-conversion mechanisms, each generally designated by the same numeral 122, constructed in accordance with the present invention. Unlike the fourth embodiment of rolling foot-powered apparatus 120 shown in FIGS. 3 and 3A of the drawing, wherein the motion-conversion mechanisms 122 are located internally in the U-shape configured inverted member 146 of the stationary assembly 124 and the rollers 50 are located in two rows externally of the U-shape configured member 146, in the present fifth embodiment of rolling foot-powered apparatus 150 the rollers 50 are located in a single row an upright position in the U-shape configured member 158 of the stationary assembly 154, and the motion-conversion mechanisms 152 are located externally of the U-shape configured member 158. The movable assembly 152, which comprises an upper member that is similar to the member 130 of the rolling foot-powered apparatus 120 (not shown), and on which are fixedly attached to the front and rear members 162 (not shown) with the members 162 being fixedly attached to the horizontal members 160a and 160b. Each of the horizontal members 160a and 160b is provided with a flat horizontal surface 160h, on which the rollers 40 are supported for rolling motion, and a teethed surface 160j formed by the teeth 160k. Horizontal members 160a and 160b are externally positioned along the side members 162 of the U-shape configured member 158 of the stationary assembly 154 that is shown in FIG. 3B. The motion-conversion mechanisms 122 are operable to convert linear horizontal motion of the movable assembly 152 into a continuous circular motion of the rotatable shaft 160 on which the rollers 50 are fixedly mounted for rotation the rollers 50.

Continuing with reference to the drawing and more particularly to FIGS. 3C and 3D thereof, there is depicted therein a sixth embodiment of a rolling foot-powered apparatus, generally designated by the numeral 170, which embodies a movable assembly generally designated by the numeral 172, a stationary assembly generally, designated by the numeral 174, and a motion-conversion mechanism, generally designated by the numeral 176, constructed in accordance with the present invention. The movable assembly 172 is comprised of conventional foot wear 28, which is attached to the upper horizontal surface 180a of the member 180. The lower surface 180b of the member 180 is divided into three sections of surface in a manner similar to that of the surface 136g of the member 136, which is shown in FIG. 3A of the drawing. The two outer surfaces 180c are provided with a smooth surface for slidable movement on the guiding rollers 40. The inner or central surface 180d has a teethed configuration formed by the teeth 180e. The teeth 180e of the member 180 are in constant engagement with the teeth 182a of a secondary gear 182, which is supported for rotation on a shaft 184. The teeth 182a of the gear 182 in turn are in constant engagement with the teeth 58a of the gear 58 which is mounted on the free-wheel 56 in a manner similar to the described previously with reference to FIGS. 2A, 2B, 2C and 2D of the drawing. As the member 180 moves slidably from the front or first position thereof to the rear or second position thereof, the first gear 58 rotates counterclockwise. The upper side of the U-shape configured member 188 and the outer side surfaces of the member 180 of the movable assembly 172 are operative for purposes enabling the member 180 to undergo slidable movement between a first position and second position. The counterclockwise rotating motion of the first gear 58 is converted to a clockwise rotating motion of the circular secondary gear 180 whereby, motion is transferred to the rotatable rollers 50 in order to thus thrust the rolling foot-powered apparatus 170 with a forward linear motion.

Figure 4:
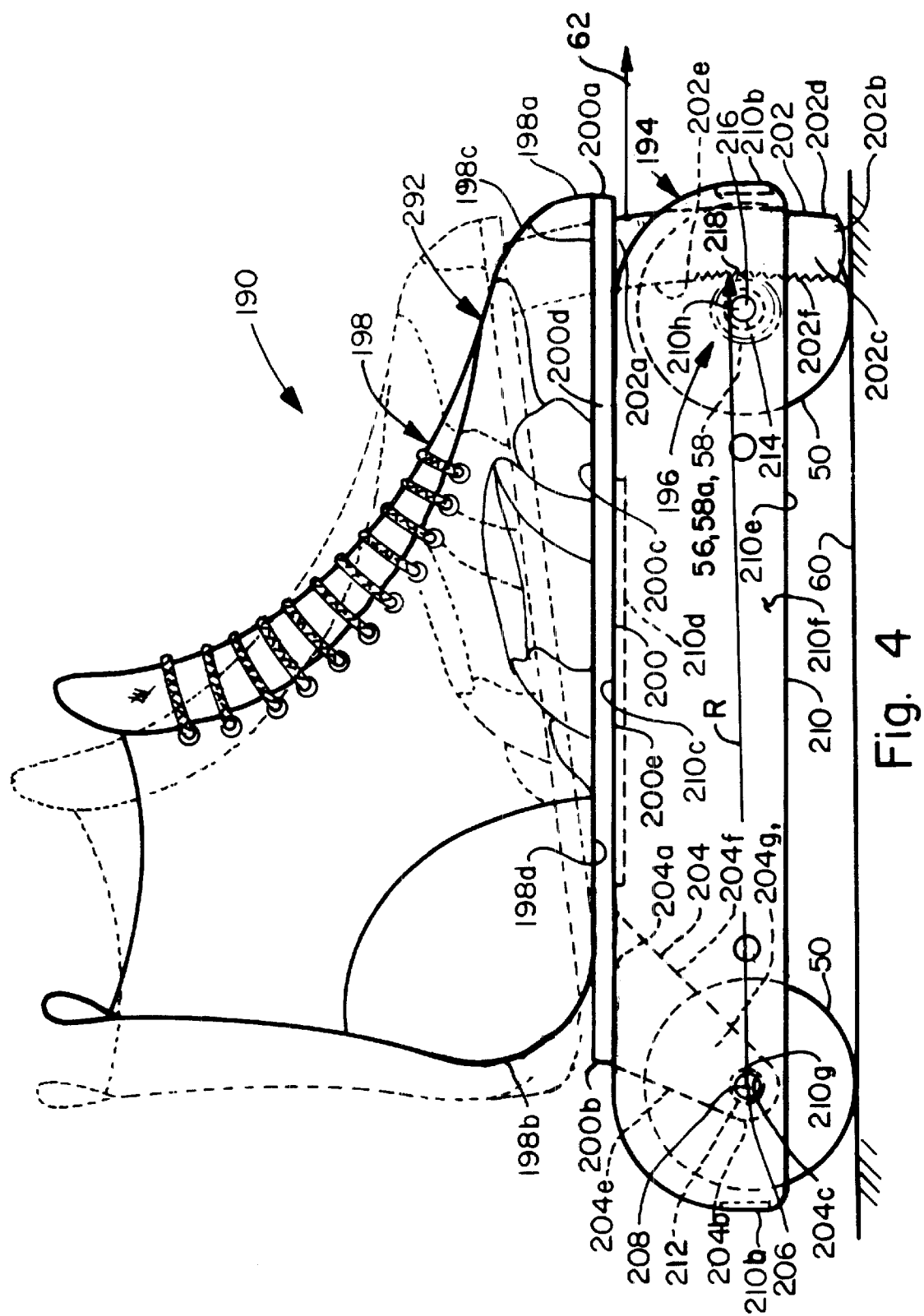
FIG. 4 is a side elevational view of a seventh embodiment of a rolling foot-powered apparatus depicted in a first position, and which embodies a movable assembly supported for oscillating movement on a stationary assembly and a fifth embodiment of a motion-conversion mechanism, constructed in accordance with the present invention.

Reference will now be had now to the drawing and more particularly to FIGS. 4 and 4A thereof, wherein there is depicted therein a seventh embodiment of a rolling foot-powered apparatus, generally designated by the numeral 190, which embodies an oscillating movable assembly, generally designated by the numeral 192, a stationary assembly, generally designated by the numeral 194, and a motion-conversion mechanism, generally designated by the numeral 196, constructed in accordance with the present invention. The motion-conversion mechanism 196 is comprised of a portion of the oscillating movable assembly 192, and portion of the stationary assembly 194.

The oscillating movable assembly 192 is comprised of conventional footwear 198 having a front end 198a, a rear end 198b, an upper side 198c and a lower side 198d that is either fixedly attached or removably attached by means of suitable mounting means, such as straps to the flat surface 200c of the member 200. Member 200 has a front end 200a, a rear end 200b, an upper horizontal surface 200c on which there is mounted by means of suitable mounting means the conventional footwear 198, the two side surfaces 200d, and a lower horizontal surface 200e on which there are mounted perpendicularly thereto by means of mounting means a cylindrical teethed segment 202 and a pivoting arm 204.

Continuing a description will now be had of the movable assembly 192 of the rolling foot-powered apparatus 190, and more specifically, to the teethed cylindrical segment 202, which is the driving member of the motion-conversion mechanism 196, and to the pivoting arm 204 and pivoting point thereof denoted by the numeral 206. The cylindrical segment 202 which extends parallel to the oscillating motion of the movable assembly 192, is defined by the upper end 202a that is attached perpendicularly to the member 200, a lower end 202b, a thickness defined by the two side surfaces 202c, an outer cylindrical surface 202d, and an inner cylindrical surface 202e on which are formed teeth 202f, which are in constant engagement with the teeth 58a of the first externally teethed circular gear 58. The teeth 202f of the cylindrical segments 202 extend perpendicular to the oscillating motion of the movable assembly 196, which is defined by the radius R and which has as the center thereof the pivoting point 206 of the oscillating movable assembly 192. Pivoting arm 204, which extends parallel to the oscillating motion of the movable assembly 192, has an upper end 204a that is attached to member 200, a lower radially formed end 204b in which there is formed an opening 204c for receiving therein the anti-friction means 212 with the center of the pivoting point 206 a and the shaft 208. The lower radially formed end 204b has a width defined by the two surfaces 204e, and a thickness defined by the two surfaces 204g and 204h. The distance between the upper end 204a of the member 204 and the pivoting point 206 is related to the depth of the U-shape configured member 210 of the stationary assembly 194.

Continuing with reference to FIGS. 4 and 4A of the drawing, as illustrated therein the stationary assembly, generally designated by the numeral 194, embodies a variable depth U-shape configured member generally designated by the numeral 210, that extends horizontally between the front end 210a thereof and the rear end 210b thereof, and an upper end 210c of the portion 210d on which there rests the lower surface 200e of member 200 of the oscillating movable assembly 192, a lower end 210e, and two side portions 210f that extend parallel to the oscillating motion of the movable assembly 192. Each portion 210f has an inner flat and an outer flat surface that extend parallel to the oscillating motion of the movable assembly 192. Through side portion 210f of the U-shape configuration member 210 there are formed two openings, i.e., openings 210g and openings 210h that extend perpendicularly to the oscillating motion of the movable assembly 192. The opening 210g serves as center for the pivoting point 206 for the shaft 208 and on which there is oscillatably mounted with anti-friction means the movable assembly 192. The opening 210h is provided with anti-friction means 214 in which the rotatable shaft 216 is received an circular externally teethed circular gear 58 with a free-wheel 56 is mounted on the rotatable shaft 216. The free-wheel 56 is of the type that engages when rotated clockwise and which disengages when rotated counterclockwise. Spacers 218 which are located between the movable and stationary parts, limit the friction, which would otherwise reduce the performance of the rolling foot-powered apparatus 190.

A description will now follow herein of the operation of the rolling foot-powered apparatus 190. Since the engagement point 218 of the teethed cylindrical segment 202 with the first circular gear 58 is to the front of shaft 216, the rotatable rollers 50, which are attached to the rotatable shaft 216 rotate clockwise when the movable assembly 192 oscillates downwards and remain in neutral when the movable assembly 192 oscillates upwards. Oscillating-motion is imparted to the movable assembly by virtue of the forces produced by a human foot or by a thrust force, which is applied to the movable assembly 192 and that is transferred therefrom to the rotating roller 50, which is fixedly mounted on the rotatable shaft 216 and which engages the ground surface 60. The repetitive oscillating motion of the movable assembly 192 thrusts the rolling foot-powered apparatus 190 in a forward direction, as indicated by the arrow 62 into with a continuous linear motion.

Reference will now be had to the drawing and more particularly to FIG. 4B thereof wherein there is depicted an eighth embodiment of a rolling foot-powered apparatus, generally designated by the numeral 220, which embodies an oscillating movable assembly, generally designated by the numeral 222, a stationary assembly, generally designated by the numeral 224, and two motion-conversion mechanisms each generally designated by the same numeral 196, constructed in accordance with the present invention. The rolling foot-powered apparatus 220 is employed to convert an oscillating-motion of the movable assembly 222 into a continuous circular motion of the roller 50, which is fixedly mounted on the rotatable shaft 228 in a manner similar to that of the rolling foot-powered apparatus 190, with the exception that the rolling foot-powered apparatus 220 employs two motion-conversion mechanisms 226 and four rotatable rollers 50.

Figure 5:
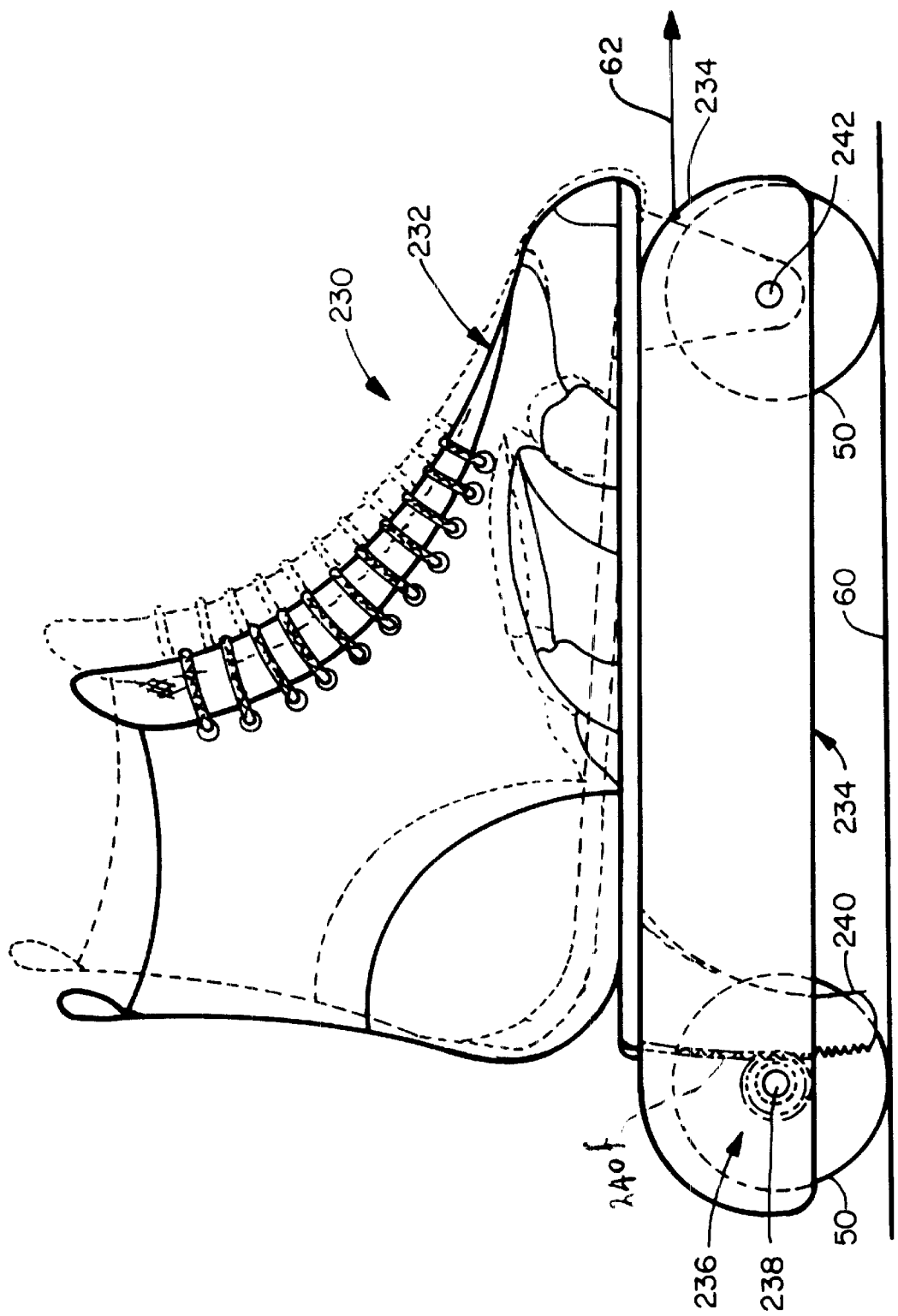
FIG. 5 is a side elevation view of a ninth embodiment of a rolling foot-powered apparatus depicted in a first position, which embodies a movable assembly supported for oscillating movement on a stationary assembly and a motion-conversion mechanism, constructed in accordance with the present invention.

Reference will now be had to the drawing and more particularly to FIG. 5 thereof wherein there is depicted a ninth embodiment of a rolling foot-powered apparatus, generally designated by the numeral 230, which embodies an oscillating movable assembly, generally designated by the numeral 232, a stationary assembly, generally designated by the numeral 234 and a motion-conversion mechanism, generally designated by the numeral 236, constructed in accordance with the present invention. The rolling foot-powered apparatus 230 is employed to convert an oscillating-motion of the movable assembly 232 into a continuous circular motion of the rotating rollers 50, which are fixedly mounted on the shaft 238 in a manner similar to that of the rolling foot-powered apparatus 190, with the exception that the rolling foot-powered apparatus 230 employs a cylindrical teethed segment 240, which is teethed externally, and wherein the pivoting point 242 of the shaft 243 is located to the front of the stationary assembly 234. Oscillating-motion is imparted to the movable assembly by virtue of the forces produced by a human foot, which is applied to the movable assembly 232 and which is transferred to the rotating roller 50, that fixedly mounted on the rotatable shaft 238. The repetitive oscillating motion of the movable assembly 242 about the oscillating center 242 is converted into circular motion of the rotating rollers 50. The rotation of the rollers 50 generates friction with the surface 60 that thrusts the rolling foot-powered apparatus 230 thereby causing the rolling foot-powered apparatus 230 to move forward with a continuous linear motion, as indicated by the arrow 62.

Figure 6:
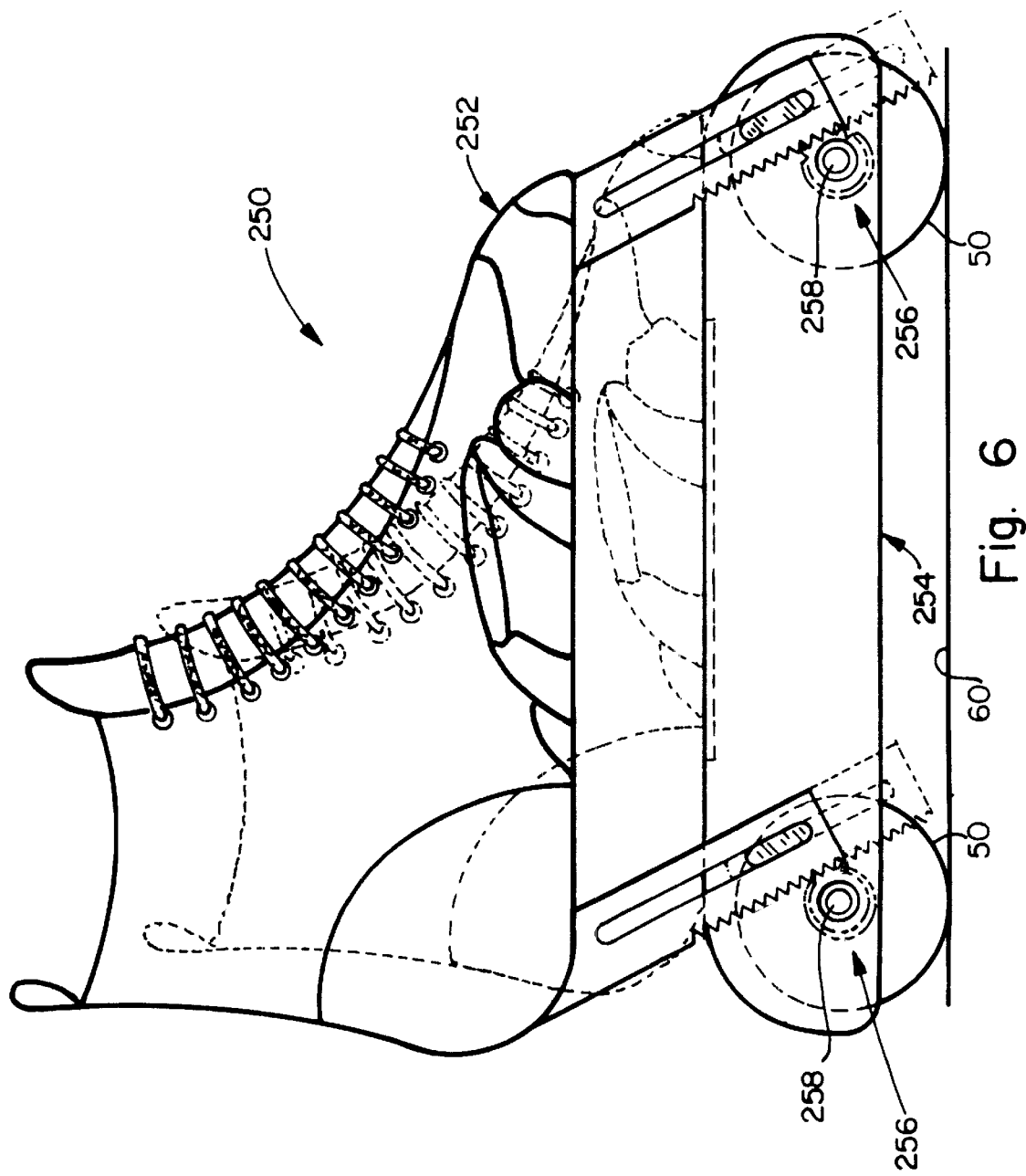
FIG. 6 is a side-elevational view of an tenth embodiment of a rolling foot apparatus, which embodies a movable assembly supported for angular forward linear movement on a stationary assembly and a motion-conversion mechanism, constructed in accordance with the present invention.

Continuing with reference to FIG. 6 of the drawing, there is depicted therein an tenth embodiment of a rolling foot-powered apparatus, generally designated by the numeral 250, which embodies a movable assembly, generally designated by the numeral 252, a stationary assembly, generally designated by the numeral 254, and two motion-conversion mechanisms, generally designated by the numeral 256, constructed in accordance with the present invention. The rolling foot-powered apparatus 250 is employed to convert the linear forward angular motion of the movable assembly 252 into a continuous circular motion of the rollers 50, which are fixedly mounted on the rotatable shaft 258 in a manner similar to that of the rolling foot-powered apparatus 20.

Figure 7:
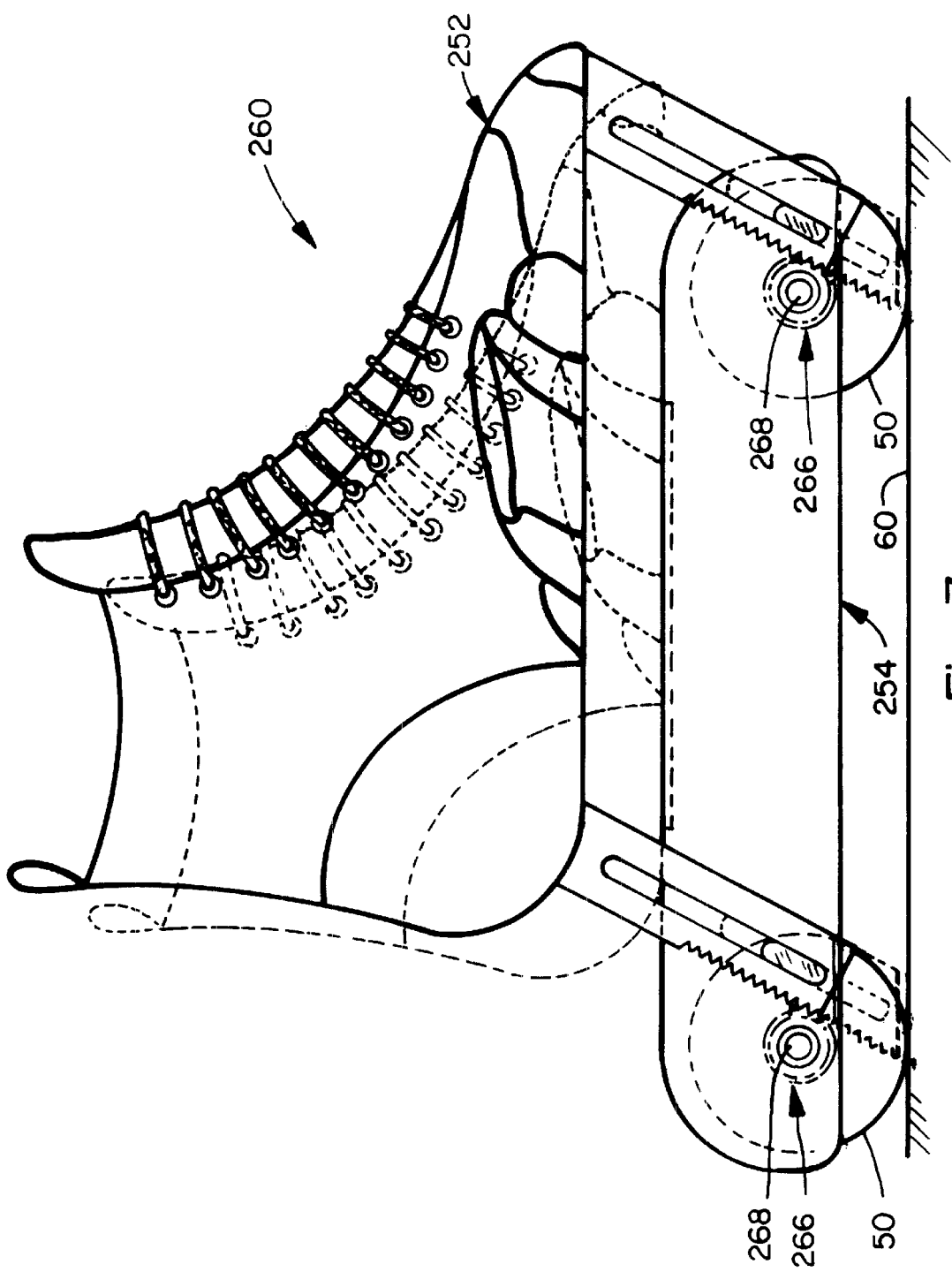
FIG. 7 is a side-elevational view of a eleventh embodiment of a rolling foot-powered apparatus, which embodies a movable assembly supported for angular backward linear movement on a stationary assembly and a motion-conversion mechanism, constructed in accordance with the present invention.

Reference now will be had to FIG. 7 of the drawing. FIG. 7 is an elevational view of a eleventh embodiment of a rolling foot-powered apparatus, generally designated by the numeral 260, which embodies a movable assembly, generally designated by the numeral 262, a stationary assembly, generally designated by the numeral 264, and two motion-conversion mechanisms, generally designated by the numeral 266, constructed in accordance with the present invention. The rolling foot-powered apparatus 260 is employed to convert the linear backwards angular motion of the movable assembly 262 into a Continuous circular motion of the rollers 50, which are fixedly mounted on the rotatable shaft 268 in a manner similar to that of the rolling foot-powered apparatus 250.

Figure 8:
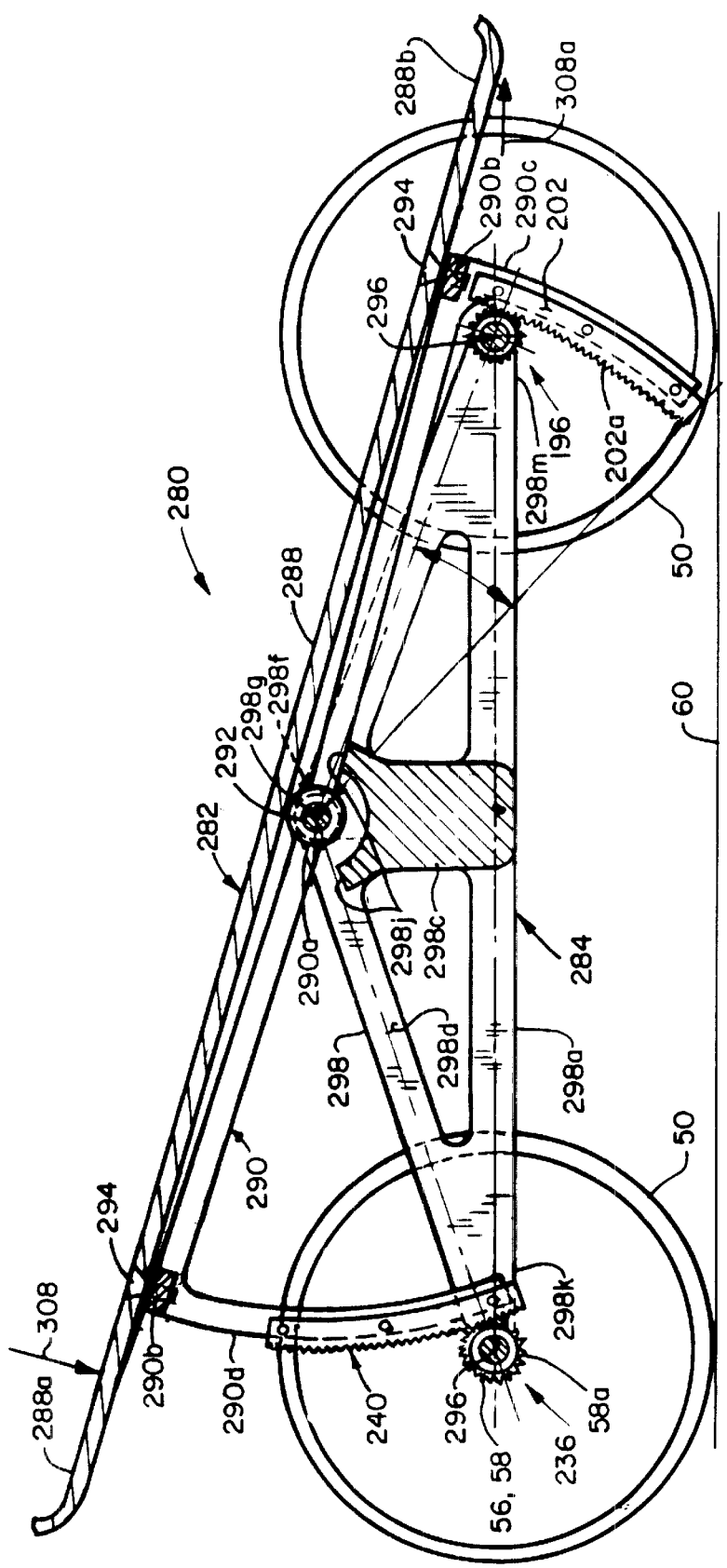
FIG. 8 is a side elevation view of a twelfth embodiment of a rolling foot-powered apparatus depicted in a first position, which embodies a movable assembly supported for oscillating movement on a stationary assembly and a motion-conversion mechanism, constructed in accordance with the present invention.
Figure 8A:
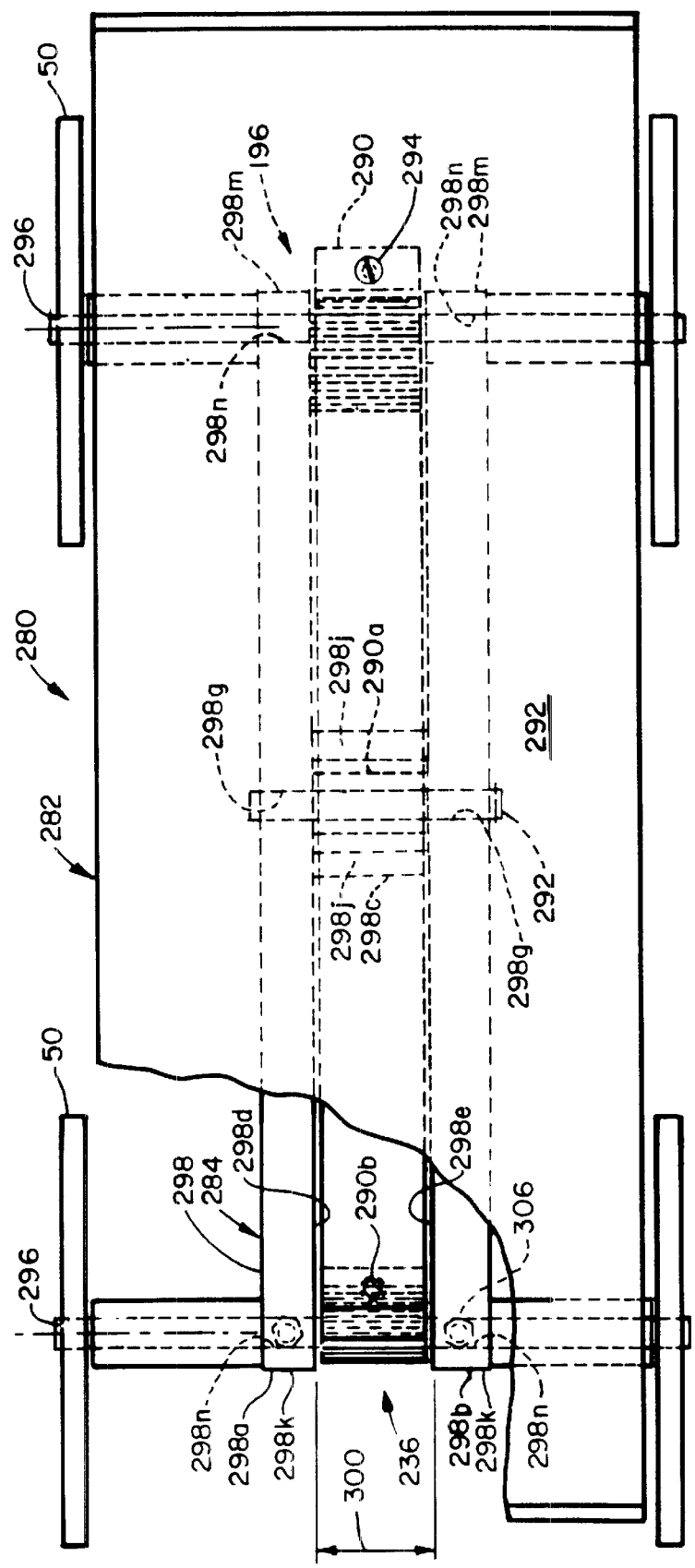
FIG. 8A is a plan-sectional view of the twelfth embodiment of the rolling foot-powered apparatus depicted in FIG. 8, taken substantially along the line 8A—8A in FIG. 8, constructed in accordance with the present invention.

Reference now will be had to FIGS. 8 and 8A, thereof. There is depicted therein a twelfth embodiment of the rolling foot-powered apparatus 280, which embodies an oscillatable moveable assembly 282, a stationary assembly 284 and two motion-conversion mechanisms 196 and 236. Each of the motion conversion mechanisms 196 and 236 comprises a portion of the moveable assembly 282 and a portion of the stationary assembly 284. The oscillatable assembly 282 which is oscillatably mounted in the space 300, which is provided between the A-frames 298a and 298b on the shaft 292, comprises a horizontally extending frame member 290 that is provided with threaded openings 290b for mounting therewith a board member 288 by means of mounted means 294. A hub 290a, which is part of frame 290, is used for mounting the stationary assembly 284 on the shaft 292. To the front and below the frame member 290, a portion 290c extends radially downwards and is used for mounting by means of suitable mounting means the internally teethed cylindrical gear segment 202 of the motion conversion mechanism 196. To the rear and below the frame member 290, a second portion 290d extends radially downwards and is used for mounting by means of mounting means the externally teethed cylindrical gear segment 240 of the motion conversion mechanism 236 such that the hub 290a of the frame member 190 is located at a distance equal to one-half of the distance between the shaft centers 296 of the rolling foot-powered apparatus 280 or at any distance therebetween.

Continuing with reference to FIGS. 8 and 8A of the drawing, as illustrated therein the stationary assembly 284 embodies a double A-frame configuration member 298, comprised of the A-frame 298a the and A-frame 298b, which are fixedly joined together near the center with the portion of 298c that extends perpendicularly to the inner surfaces 298d and 298e of the A-frame members 298a and 298b. A-frame members 298a and 298b extend parallel to each other and perpendicular to the oscillating motion of the moveable assembly 282. The top 298f of the double A-frame configured member 298 which is suitably formed for purposes of accepting the hub 292a of the frame member 290 therewithin, in order that the movable assembly 282 1l oscillatably mounted in a seesaw manner, between the limits set by the two surfaces 298j, with the shaft 292 passing through the openings 298g of both A-frames 298a and 298b. Surfaces 298j are provided with cushioned means to minimize the dumping forces applied thereto during the oscillating movement of the moveable assembly 282. Each of the lower front ends 298m and each of the rear ends 298k of the double A-frame stationary assembly 298 is provided with an opening 298n for rotatably mounting therewithin by means of anti-friction means the shafts 202 of the motion conversion mechanisms 196 and 236. The rotatable shaft 296 extends through the double A-frame 298 of the stationary assembly 284 and has fixedly mounted thereon the rollers 50 of the rolling foot-powered apparatus 280. On each of the rotatable shafts 296 and in the space 300 in between the A-frame members 298a and 298b there is mounted the gear 58 of the free-wheel 56. The free-wheel 56 is of the type that engages when it rotates clockwise and disengages when it rotates counterclockwise with the teeth 58a being constantly engaged with the teeth 202f and the teeth 240f of the cylindrical teeth segment 202 and 240.

The lower ends 298k of the A-frame member 298 are provided with threaded friction generating means 306 of the type, which when turned clockwise retard the rotation of the rotatable shaft 302 thereby allowing an inexperience user to modify the speed of the rolling foot-powered apparatus 280, and when turned counterclockwise liberates the shaft 302 for free uninterrupted movement. The pivoting point can be at any elevation without departing from the essence of the invention.

By way of illustration, when the downward force 308 generated by human weight is applied on the board end 288b of the movable assembly 282, the movable assembly 282 moves in a semi-circular path about the pivoting point 286 until the movable assembly 282 reaches the surface 298j, there the teeth 240f of the circular segment 240 force the circular gear 58 of the motion-conversion mechanism 236 to rotate clockwise and rotatably engage the shaft 296 on which are fixedly mounted the rollers 50 such that the board end 288a moves upwards. With the rotation of the roller 50, a frictional force is generated between the rollers 50 and the ground surface 60, which urges the rolling foot-powered apparatus 280 to move in a linear direction as indicated by the arrow 308a. When the force 308 generated by the human weight shifts to the opposite board end 288a, the teeth 202f of the circular segment 202 forces the circular gear 58 of the motion-conversion mechanism 196 to rotate clockwise and with it the rotatable shaft 296 and the rollers 50 such that again friction is generated between the rollers 50 and the ground surface 60 thereby urging that urge the rolling foot-powered apparatus 280 to move in a linear direction as indicated by the arrow 308a. The repetitive to and fro oscillating motion of the movable assembly 280 provides the rolling foot-powered apparatus 280 with a continuous linear movement as indicated by the arrow 308a in the direction of motion of the movable assembly 282.

Figure 8B:
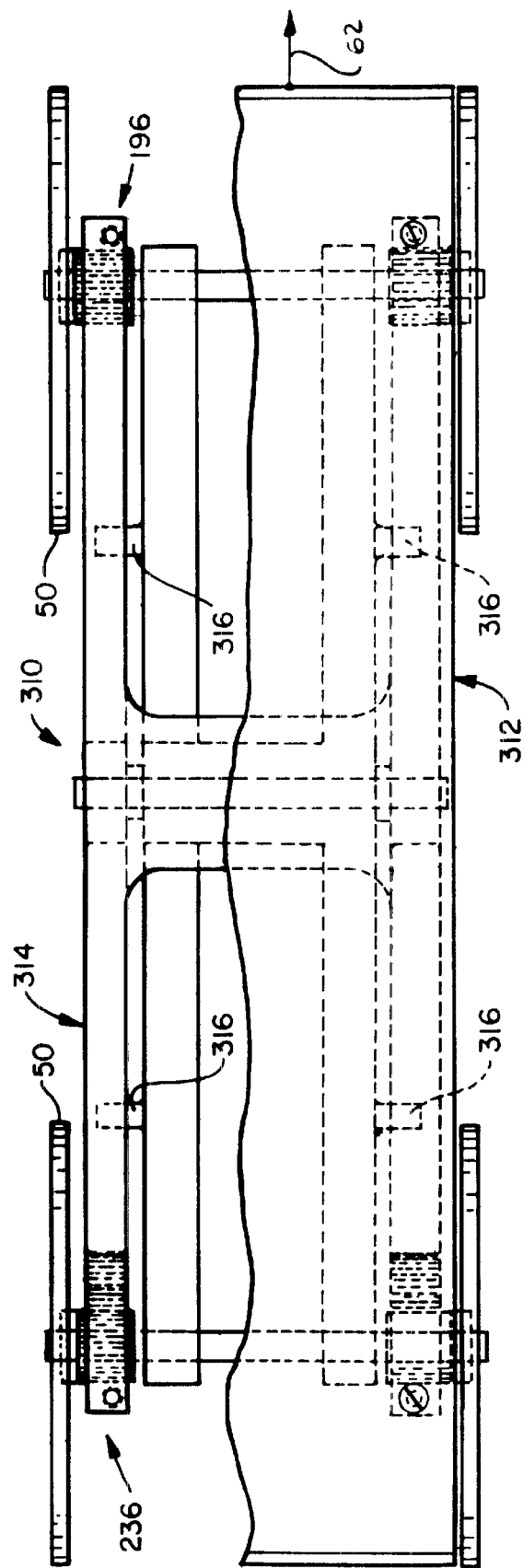
FIG. 8B is a plan-sectional view of the thirteenth embodiment of the rolling foot-powered apparatus, which embodies a movable assembly supported for oscillating movement on a stationary assembly and a motion-conversion mechanism, constructed in accordance with the present invention.

Reference now will be had to FIG. 8B of the drawing for a thirteenth embodiment of the rolling foot-powered apparatus 310. The rolling foot-powered apparatus 310 embodies a movable assembly 312, a stationary assembly 314, two motion-conversion mechanisms 196 and two motion-conversion mechanisms 236. Rolling foot-powered apparatus 310 operates in a manner similar to that of the rolling foot-powered apparatus 280' which is shown in FIGS. 8 and 8A of the drawing. The rolling foot-powered apparatus 310 rolls in the direction indicated by the arrow 62 which is the same as the motion of the movable assembly 312.

Figure 9:
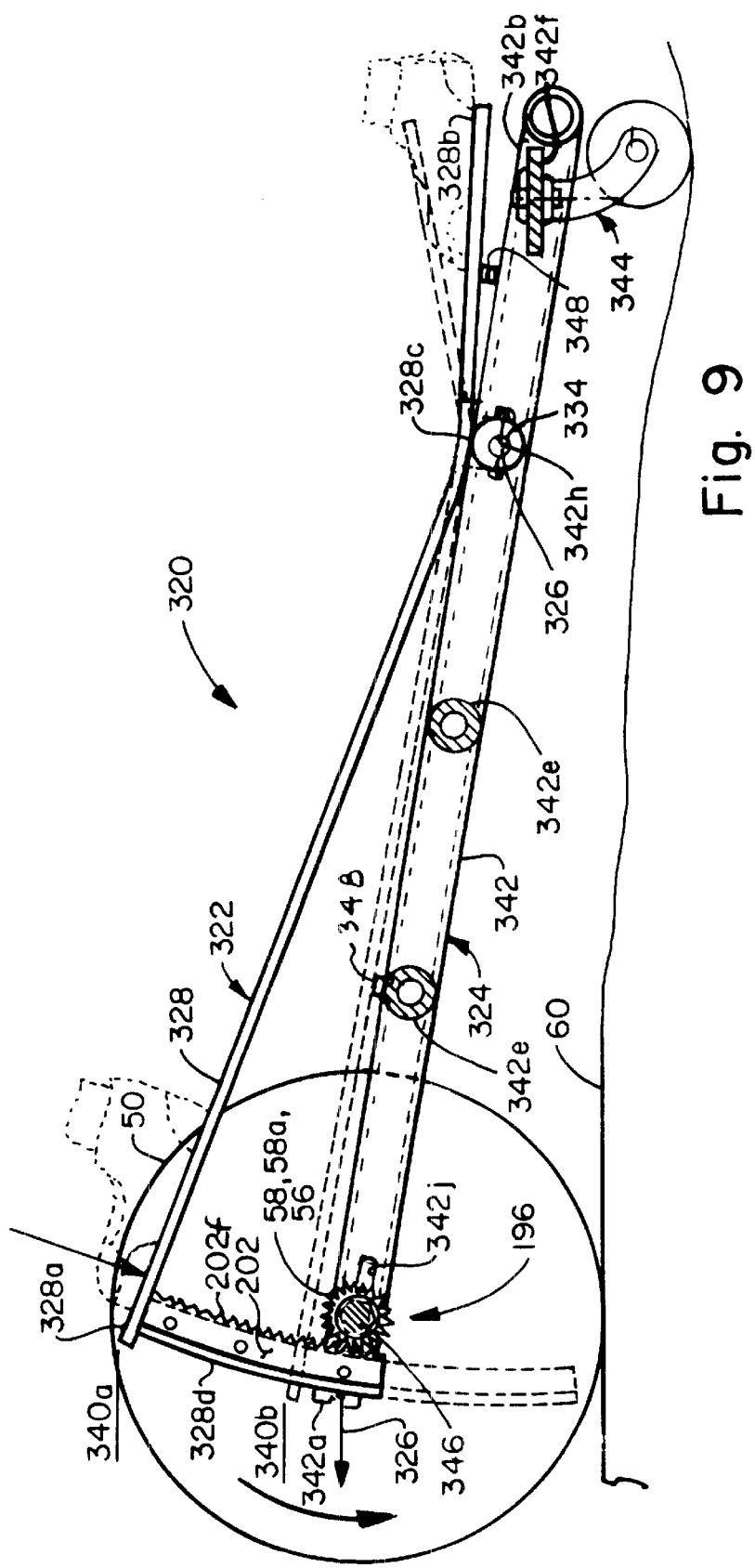
FIG. 9 is a side elevational view of a fourteenth embodiment of a rolling foot-powered apparatus depicted in a first position, which embodies a movable assembly supported for oscillating movement on a stationary assembly and a motion-conversion mechanism, constructed in accordance with the present invention.
Figure 9A:
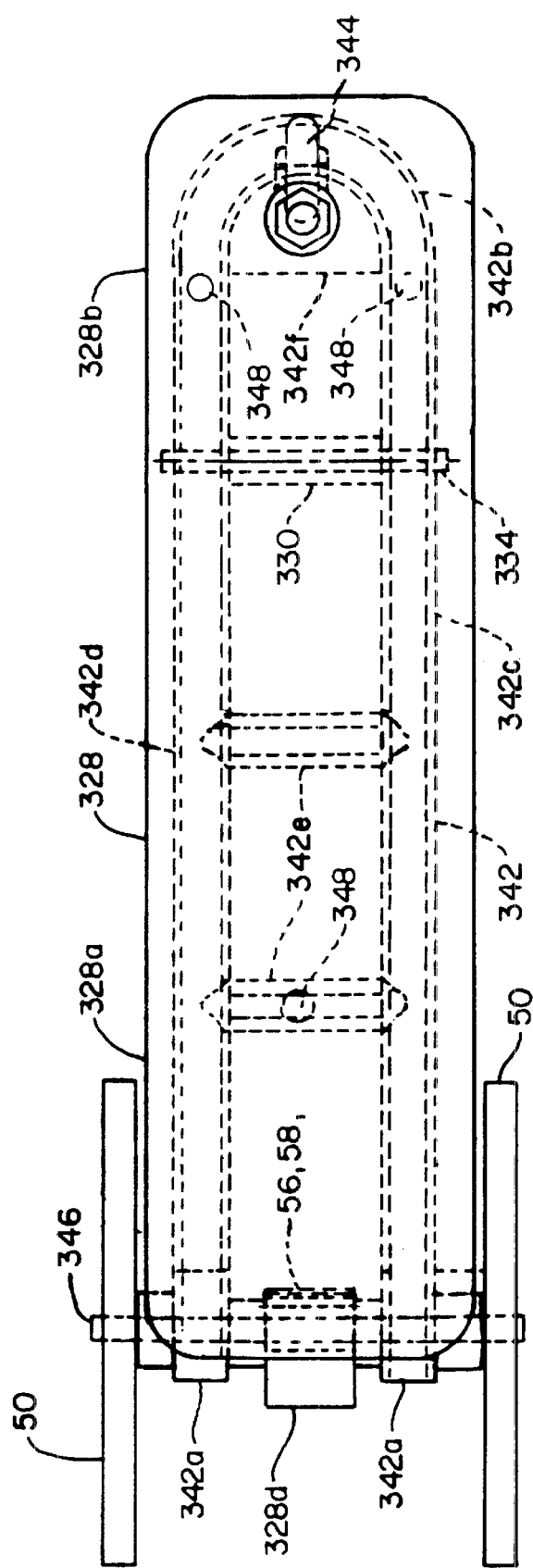
FIG. 9A is a plan view of the fourteenth embodiment of the rolling foot-powered apparatus depicted in FIG. 9, taken substantially along the line 9A—9A in FIG. 9, constructed in accordance with the present invention.

A description will now be set forth herein of a fourteenth embodiment of the rolling foot-powered apparatus 320, and for this purpose reference will be had to FIGS. 9 and 9A of the drawing. The rolling foot-powered apparatus 320 embodies an oscillatable movable assembly 322, a stationary assembly 324 and a motion-conversion mechanism 196, with the motion-conversion mechanism 196 comprising a portion of the movable assembly 322 and a portion of the stationary assembly 324. The oscillatable movable assembly 322, which is oscillatably mounted on a hub member 330 in a seesaw manner about the pivoting point 326 comprises an inverted contoured member 328 that is defined by a front portion 328a and a rear portion 328b that merge at a tension point 328c at which point is fixedly mounted the hub 330. Portions 328a and 328b of the member 328 are located in a angular position that is equal to an angle of less than 180 degrees and so as to be suitable for an effective oscillating movement. Under the member 328 and to the end 328a fixedly mounted so as to extend radially downwards the portion 328d on which there is suitably mounted the internally teethed circular gear segment 202, such that the teeth 202f thereof are continuously engaged with the teeth 58a of the circular gear 58. The rolling foot-powered apparatus 320 operates in a manner similar to that of the rolling foot-powered apparatus 280, with the exception that the rolling foot-powered apparatus 320 employs one motion-conversion mechanism 196 and the oscillatable assembly 322 embodies a contoured member 328 in place of the horizontal member 288.

Continuing with a description of the remainder of the movable assembly 322, the movable assembly 322, which is oscillatably mounted with the hub 330 on the shaft 334 of the stationary assembly 324, effectively urges the rolling foot-powered apparatus 320 in a linear direction as indicated by the arrow 326 at the time when the movable assembly 322 moves from the upper position 340a thereof to the lower position 340b thereof.

A description will now be set forth of the stationary assembly 324, and for this purpose reference will be had again to FIGS. 9 and 9A of the drawing. The stationary assembly 324 includes a U-shape tubular frame, having a front end 342a and a rear end 342b, two legs 342c and 342d that extend horizontally and parallel to each other and which are fixedly joined together with one or more tubular members 342e and a plate member 342f. Each of the legs 342c and 342d near the rear end 342b is provided with an opening 342h that is perpendicular to the axis of the U-shape tubular member 342 and at a suitable location for purposes of oscillatably mounting the movable assembly 322 on the shaft 334. Additional slotted openings 342j are provided for adjustably mounting the shaft 346 of the motion-conversion mechanism 196. Plate member 342f is provided with a perpendicular opening 342g for mounting therewithin a swiveling assembly 344. At top and near the front end 342a and near the rear end 342b and at a suitable location, there are mounted at each location at least one member 348 that is operative to establish the traveling limits of the movable assembly 322.

Figure 10:
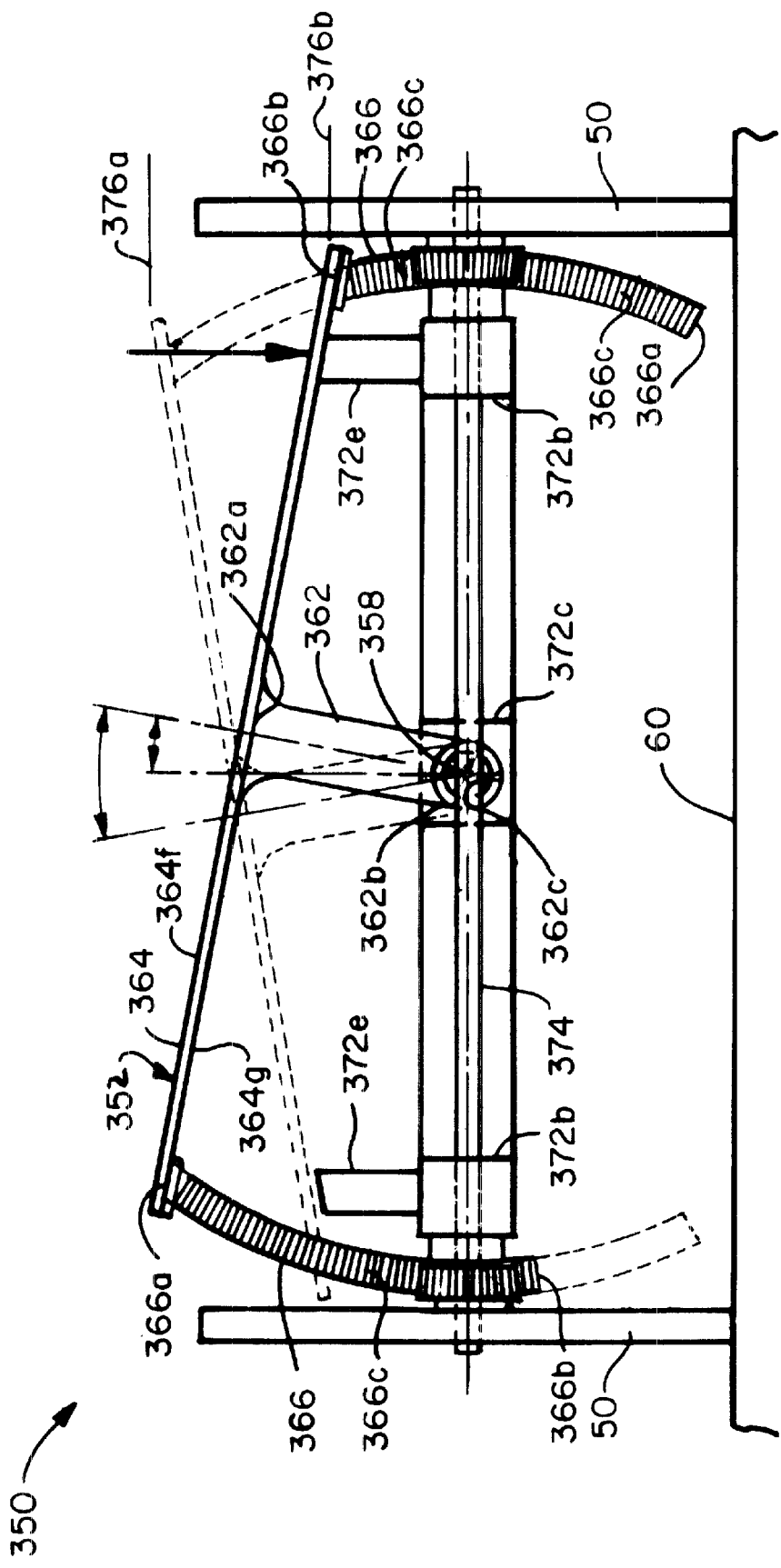
FIG. 10 is a rear elevational view of a fifteenth embodiment of a rolling foot-powered apparatus depicted in a first position, which embodies a movable assembly supported for oscillating movement on a stationary assembly and a sixth embodiment of the motion-conversion mechanism, constructed in accordance with the present invention.
Figure 10A:
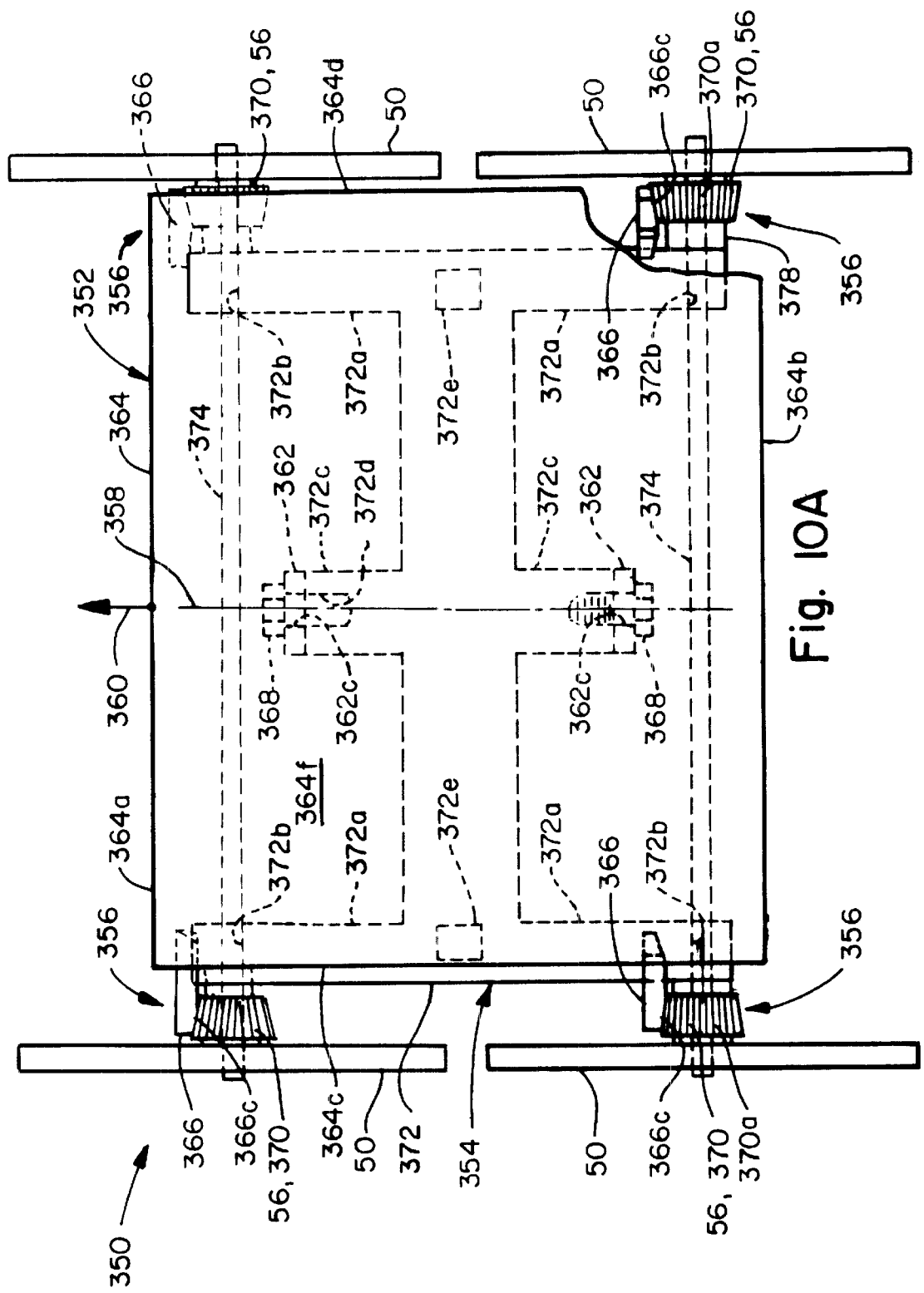
FIG. 10A is a plan view of the fifteenth embodiment of the rolling foot-powered apparatus depicted in FIG. 10, taken substantially along the line 10A—10A in FIG. 10, constructed in accordance with the present invention.

Continuing with reference to a fifteenth embodiment of the rolling foot apparatus, for this purposes reference will now be had to FIGS. 10 and 10A of the drawings. There is depicted therein a rolling foot apparatus, generally designated with the numeral 350, embodying a movable assembly, generally designated with the numeral 252, a stator assembly generally, generally designated with the numeral 354 and four motion-conversion mechanisms, each generally designated by the same numeral 356. The movable assembly 352 is of the oscillatable type, oscillating about the pivoting axis 358 and in a direction perpendicular to the movement of the rolling foot-powered apparatus 350 which is indicated by the arrow 360.

The movable assembly 352 comprises a flat board member 364, which is defined by the sides 364a, 364b, 364c, and 364d, the top 364f and bottom 364g and on which are mounted two board support portions 362 and four bevel teeth gear segments 366. Board support portions 362 have two ends 362a that are used to fixedly mounted by means of suitably mounting means such as welding, on the bottom surface 364f of the board member. End 362b is provided with opening means 362c for oscillatably mounting therewith the movable assembly 352 on the stationary assembly 354 by means of suitable mounting means, such as by means of the shoulder bolts 368. Board support portions 362 are located at a distance equally spaced between the board ends 364a and 364b of the board 364. Each of the bevel teethed gear segments 366 has two ends, i.e., the ends 366a and 366b. The end 366a is used to fixedly mount by means of suitably mounting means, such as by welding, the gear segment 366 to one side of the board 364. While the end 366b is used for fixedly mounting by suitable means for mounting, such as by welding, the gear segment 366 to the other side of the board member 364 with the teeth 366c of the gear segment 366 being constantly engaged with the teeth 370a of the bevel teethed circular gear 370.

Continuing with the description of the rolling foot-powered apparatus 350 and more specifically, with stationary assembly 354. The stationary assembly 354 is comprised of the member 372, which extends horizontally and which has four portions 372a, the latter being provided with openings 372b for receiving therewithin two rotatable shafts 374 as well as two portions 372c that are provided with threaded opening 372d operative for purposes of mounting using bolts 368 the board support members 362 of the oscillatable movable assembly 352. At each end of the rotatable shaft 374 is rotatably mounted a bevel teethed gears 370 by means of the free-wheel 56. At each extreme end of the shaft 374 there is fixedly mounted a roller 50. Spacer means is 378 located between the member frame 372 and the free-wheel 56 in order to thereby reduce the friction between the rotating parts and stationary part of the rolling foot-powered apparatus 350. In addition, two limit portion 372e are located at the top of the member 372 for purposes of establishing the maximum oscillating movement of the movable assembly 352.

The motion-conversion mechanism 356 is comprised of the bevel gear segment 366 that is mounted on the movable assembly 352, and the bevel circular gear 370 that is mounted with the free-wheel 56 on the rotatable shaft 374.

A description will now follow herein of the mode of operation of the rolling foot-powered apparatus 350. When a force or the weight of a human is applied to the end 366b of the movable assembly 352, which is oscillatably mounted on the stationary assembly 354, the end 366b moves with an oscillating motion from the upper position 380a thereof to the lower position 380b thereof in a semicircular path about the pivoting axis 358, as shown in FIG. 10 of the drawing. Since the teeth 366c of the bevel gear segment 366 are continuously engaged with the teeth 370a of the bevel gear 370, the circular gears 370 rotate clockwise. The rotation of the bevel circular gears 370 is transferred through the free-wheel 56 to the rotatable shafts 374 and therefrom to the rollers 50 such that the friction forces, which are developed between the rollers 50 and the ground surface 60, are operative to urge the rolling foot-powered apparatus 350 to move forward in the direction indicated by the arrow 360, which is opposite to that of the oscillating motion of the movable assembly 352. When a force or weight is applied to the opposite side 366a of the movable assembly 352, the process described above is repeated. The end 366b of the movable assembly 362 moves from the lower position 376b thereof to the upper position 376a, while the end 366a of the movable assembly 352 moves in a semicircular path about the pivoting axis 358 from the upper position thereof to the lower position thereof. The teeth 366a of the bevel gear segment 366, which are continuously engaged with the teeth 370a force the right side gears 370 to rotate in a clockwise direction, thereby urging the rolling foot-powered apparatus 350 to move linearly as indicated by the arrow 360. The repetitive to and fro movement of the movable assembly 352 generates a continuous linear movement of the rolling foot-powered apparatus 350.

Figure 11:
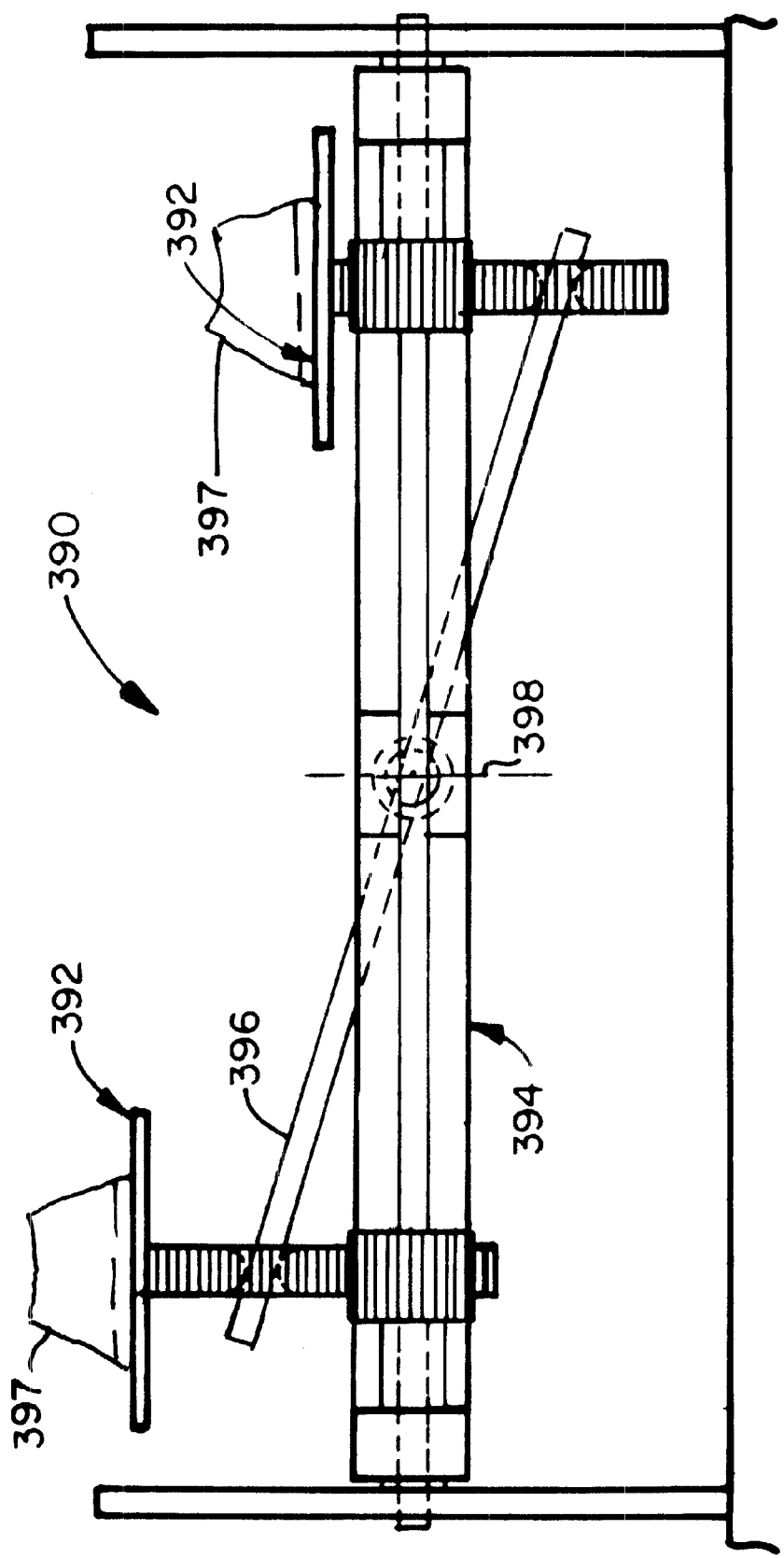
FIG. 11 is a rear elevational view of a sixteenth embodiment of a rolling foot-powered apparatus depicted in a first position, which embodies two movable assemblies supported for linear vertical movement on a stationary assembly, a motion-conversion mechanism and a first embodiment of a retractable mechanism, constructed in accordance with the present invention.
Figure 11A:
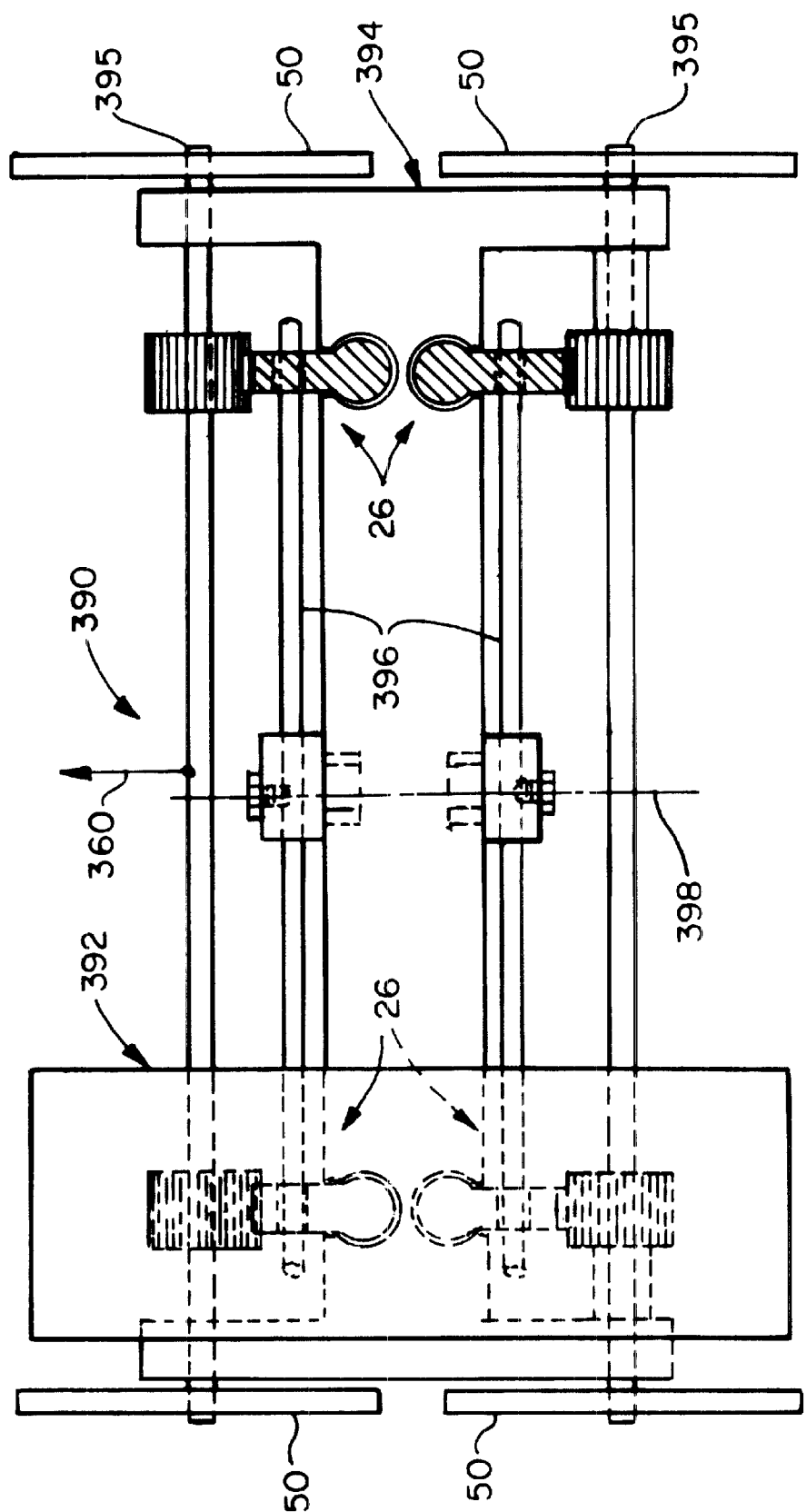
FIG. 11A is a plan-sectional view of the sixteenth embodiment of the rolling foot-powered apparatus depicted in FIG. 11, taken substantially along the line 11A—11A in FIG. 11, constructed in accordance with the present invention.

Reference will now be had to FIGS. 11 and 11A of the drawing, wherein there is depicted a sixteenth embodiment of a rolling foot-powered apparatus 390, which embodies two independent movable assemblies 392, a stationary assembly 394, and four motion-conversion mechanisms 26. The movable assemblies 392 make use of two lever type mechanisms 396 having a pivoting axis 398 for purposes of alternately raise one movable assembly 392 while the other movable assembly 392 recedes. The repetitive to and fro movement of the movable assemblies 392 generates a continuous circular motion of the shafts 395 on which are fixedly mounted the rollers 50, which in turn urges the rolling foot-powered apparatus 390 to move with a continuous linear motion as indicated by the arrow 360. At the top of the movable assemblies 392 are fixedly mounted straps 397, which are used to tighten the feet of a human when required.

Figure 12:
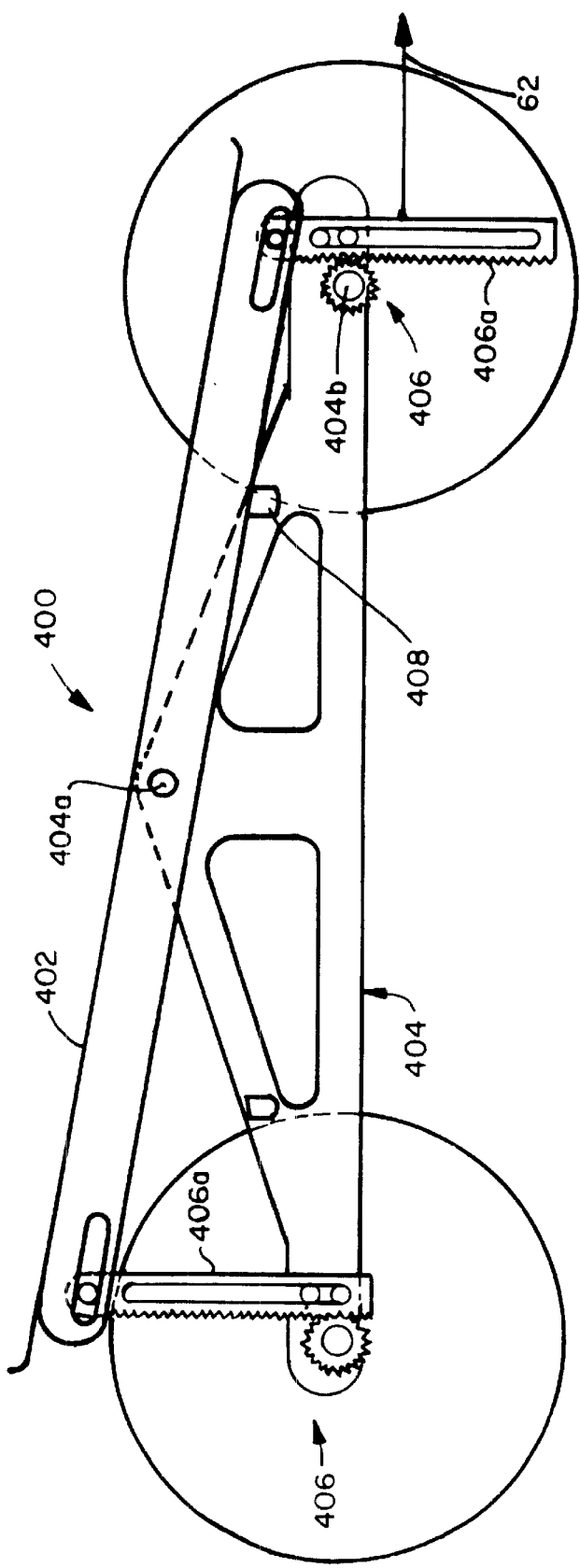
FIG. 12 is a side elevation view of a seventeenth embodiment of a rolling foot-powered apparatus depicted in a first position, which embodies a movable assembly supported for oscillating movement on a stationary assembly and a motion-conversion mechanism, constructed in accordance with the present invention.

Continuing with reference to FIG. 12 of the drawing, there is depicted therein an seventeenth embodiment of a rolling foot-powered apparatus 400, which embodies a movable assembly 402, a stationary assembly 404, and four movable motion-conversion mechanisms 406. The movable assembly 402, which is oscillatably mounted on the stationary assembly 404, oscillates radially about the center 404a, while the teethed portions 406a moves linearly. The linear motion of the teethed portions 406a is converted into a circular continuous motion of the shafts 404b by means of the motion-conversion mechanism 406. The circular motion of the rotatable shafts 404b is operative to urge the rolling foot-powered apparatus 400 to move with a continuous linear motion, as indicated by the arrow 62.

Figure 13A:
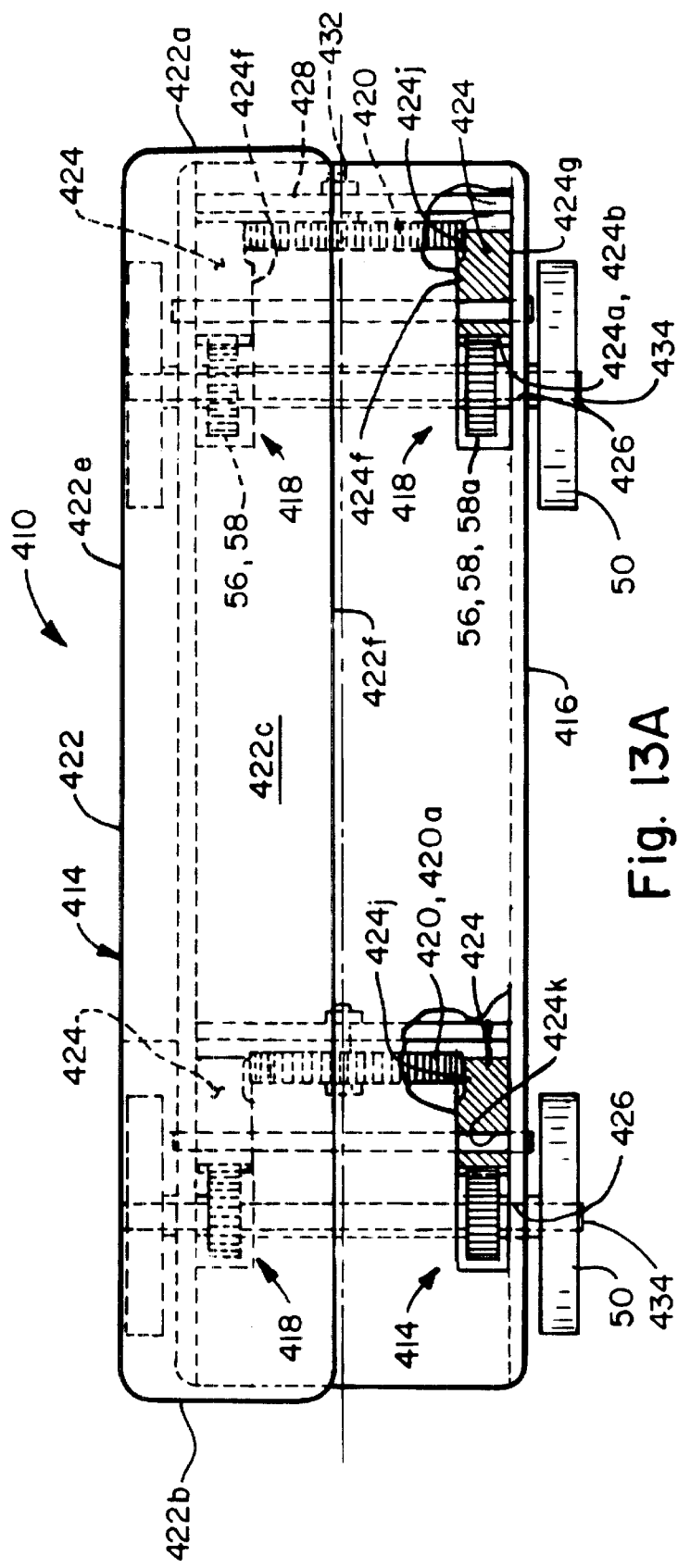
FIG. 13A is a plan-sectional view of the eighteenth embodiment of the rolling foot-powered apparatus depicted in FIG. 13, taken substantially along the line 13A—13A in FIG. 13, constructed in accordance with the present invention.

Reference now will be had to FIGS. 13, 13A and 13B of the drawing wherein there is depicted a eighteenth embodiment of a rolling foot-powered apparatus 410, which embodies two movable assemblies 412 and 414, a stationary assembly 416, and two retractable motion-conversion mechanisms each generally designated by the same numeral 418, constructed in accordance with the present invention. Each of the retractable motion-conversion mechanisms 418 is comprised of a portion of the movable assemblies 412 and 414, a portion of the stationary assembly 416, and a second externally teethed circular gear 420 having teeth 420a formed thereon.

Each of the movable assemblies 412 and 414 is comprised of a board member 422 under which are fixedly mounted the teethed segments 424 of the motion-conversion mechanisms 418. The board member 422 extends between a front end 422a, and a rear end 422b, and has an upper horizontal surface 422c on which there is positioned the conventional footwear 28 as well as a lower horizontal surface 422d on which there is fixedly mounted means of suitable mounting means the teethed rack segments 424 so as to extend vertically as well as perpendicularly thereof, and lastly a far end vertical surface 422e and a near end vertical surface 422f.

Continuing with the description of the movable assemblies 412 and 414 of the rolling foot-powered apparatus 410, and more specifically to the teethed segments, generally designated with the numeral 424, each double teethed segment 424 has a rear end surface 424a on which are formed the first teeth 424b, a front end flat surface, a lower end 424d, an upper end 424e, which is used for fixedly mounted by means of mounting means perpendicularly to the surface 422d of the member 422, a far end partially teethed flat surface 424f embodying a second row of teeth 424j, and a near end flat surface 424g.

Continuing with reference to FIGS. 13, 13A, and 13B of the drawing, as illustrated therein the stationary assembly 416 embodies a variable size tubular rectangular shape configured member 426 that extends horizontally between a front end 426a and a rear end 426b, and including an upper end 426c having a flat horizontal surface having openings 426d formed therein, a lower end 426e having openings 426f formed therein, a near end 426h and a far end 426g. Inside, between the near end 426h and far end 426g and perpendicular to the tubular member 426 there are mounted by means of suitable mounting, such as by welding or by any other suitably conventionally known mounting means, two gear support members 428. The gear support members 428 are suitably located at a distance from the motion-conversion mechanisms 418 such so as to be operable for rotatably supporting on the shaft 432, the second circular gears 420, which includes teeth 420a that are constantly engaged with the teeth 424j of the double teethed segments 294. The rectangle tubular member 426 further includes two openings 426f which are formed therein so as to pass through the near end 426h thereof and the far end 426g thereof in a horizontal direction, and so as to extend parallel to each other and perpendicular to the member 426 in order to be operable for purposes of rotatably mounting the shafts 434 therewithin and the bearing means 436 (not shown). Each shaft end that extends outwardly of the member 426 is employed for purposes of fixedly mounting thereon the rotatable rollers 50, of the rolling foot-powered apparatus 410. Within the tubular rectangular shape member 426 there are mounted two conventional free-wheels 56 with which the circular gears 58 are cooperatively associated. The free-wheels 56 are suitably located at a distance such that the teeth 58a of the circular gears 58 are constantly engaged with the first teeth 424b of the double teethed segments 424. The traveling limits of the double teethed segment 424 is determined by the length of the slotted opening 424k as well as by the location of threaded rods 438, which are mounted on the stationary assembly 416.

Continuing with the description of the motion-conversion mechanism 418 of the rolling foot-powered apparatus 410, each of the motion-conversion mechanisms 418 is comprising of the teeth segments 424, which are mounted on the movable assemblies 412 and 414, respectively, for linear movement relative thereto, two circular gears 58, which are mounted via the free-wheelers 56 on the rotatable shaft 434 and relative to the teethed segment 424, and the circular gear 420 which is rotatably mounted on the shaft 432 of the member 428 of the stationary assembly 416.

By way of illustration, when a force or the weight of a human is applied to the movable assembly 412, the assembly 412 moves linearly downwards from the upper first position 430 thereof to the lower second position 430a thereof. Since the teeth 424b and the teeth 424j of the member 424 are in constant engagement with the teeth 58a of the circular gears 58 and the teeth 420a of the second circular gear 420, respectively, both the first gears 58 and the second gear 420 are caused to rotate clockwise. The rotation of the gears 58, due to influence of the free-wheel 56 is translated into continuous circular motion of the rotatable shafts 434 as well as the rollers 50 supported thereon. The rotation of the second gear 420 is translated into a linear upwards movement of the movable assembly 414 from the second position 430a thereof to the first position 430 thereof. At this point, the force or weight of a human being imported may be shifted from the movable assembly 412 to the movable assembly 414 thereby the process described above repeated in a reversed manner. The downward linear motion of the movable assembly 414 is translated into continuous circular motion of the rotatable shaft 434 and into the upward linear motion of the movable assembly 412 as a consequence of the operation of the second circular gear 420. The repetitive downward linear movement of the movable assemblies 412 and 414 is translated as a consequence of the operation of the motion-conversion mechanism 418 into continuous circular motion of the rotatable rollers 50 that in turn urges the rolling foot-powered apparatus 410 to move with a continuous linear motion.

Reference now will be had to FIGS. 14, and 14A of the drawing therein there is depicted a nineteenth embodiment of a rolling foot-powered apparatus 440, which embodies two movable assemblies 442, a stationary assembly 444, and two motion-conversion mechanisms, each generally designated by the same numeral 446, constructed in accordance with the present invention. Each of the motion-conversion mechanisms numeral 446 is comprising of a portion of the movable assemblies 442 as well as a portion of the stationary assembly 444.

The movable assemblies 442, each embody an oval type configuration, and comprised of an upper horizontal section 448 extending between the front end 448a thereof and the rear end 448b thereof, a lower horizontal section 450 extending between the front end 450a thereof to the rear end 450b thereof, a front cylindrical type interconnecting section 452 operative for connecting the end 448a and the end 450a of the members 448 and 450, respectively, and the rear cylindrical type interconnecting section 454 operative for connecting the rear end 448b and the rear end 450b of the members 448 and 450, respectively. The upper horizontal section 448 has a top outer surface 448c, on which a conventional footwear is suitably mounted such as by means of friction or straps (not shown), and a lower horizontal smooth surface 448d suitably formed for receiving for rolling motion relative thereto the rollers 40. The lower section 450 has an outer lower surface 450c and an inner top horizontal surface 450d, the latter being divided into three segments, two outer surface segments 450e that are smooth and flat for purposes of enabling a smooth rolling of the rollers 40 to be had, and a center surface segment 450f having teeth 450g that may either project outwardly of or inwardly of the surface 450d, and a far end surface 450h and a near end surfaces 450h that define therebetween the width of the section 450. Each movable assembly 442 include two stops 450m, one at the front end 450a thereof and one at the rear end 450b thereof.

Continuing with reference to FIGS. 14 and 14A of the drawing, as illustrated therein the stationary assembly, generally designated by the numeral 444, embodies a double U-shape configured member 456 which is horizontally inverted and variable in depth, that extends horizontally between the front end 456a thereof and the a rear end 456b thereof is comprised of a lower segment 456c that extends between the inner surface 456d and the outer surface 456e, two side segments 456f that extend the outer surface 456g and the inner surface 456h, and the center segment 456j that extend between the two surfaces 456k. The distance between the inner surface 456h of the side segment 456f and the outer surfaces 456k of the center segment 456j is equal to the distance between the surfaces 450h, which extend the width of the section 450 plus a clearance suitable to permit free horizontal movement of the movable assembly 442. The distance between the inner surface 448d and the inner surface 450e is equal to the diameter of the roller 40 plus a clearance suitable to permit free rotating movement of the rollers 40.

Continuing with the description of the stationary assembly and more particularly the member 456, the member 456 further includes two openings 458, which are formed through the side segments 456f so as to be operable for rotatably mounting the shaft 460 and the shaft 460a. On the shaft 460 are mounted four freely rotating rollers 40 that are suitably spaced by means of spacers so as to be operative for rolling on the surface 450h and the surface 448d of the movable assemblies 442 as well as two rollers 50, the latter being fixedly mounted on the extreme ends of the shaft 460. On shaft 460a are mounted four freely rotating rollers 40 suitably spaced by means of spacers so as to be operative for rolling on the surface 450h and the surfaces 448d of the movable assemblies 442 as well as two circular gears 58 cooperatively associated with the freewheels 56 and being spaced by means of spacers such that the teeth 58a of the circular gear 58 are constantly engaged with the teeth 450 g of the movable assemblies 442, and two rollers 50, the letter being fixedly mounted on extreme ends of the shaft 460a.

By way of illustration, the teeth 58a of the gear 58 are continuously engaged with the teeth 450g of the movable assembly 442. As a consequence when the movable assembly 442 moves from the first position 462 thereof to the second position 462a thereof, the gear 58 is caused to rotate clockwise and with it the free-wheel 56, and also the rotatable shaft 460a and the rollers 50. On the other hand, when the movable assembly 442 is moving from the second position 462a thereof to the first position 462 thereof the circular gear 58 rotates freely on the free-wheel 56. The repetitive to and fro linear horizontal movement of the movable assemblies 442 is translated by virtue of the operation of the motion-conversion mechanism 446 into continuous circular motion of the rollers 50. The circular motion of the rollers 50 on the ground surface 60 generates friction therebetween, which is operative to cause the rolling foot-powered apparatus 440 to move forward with a continuous linear motion.

Continuing with reference to FIG. 14B of the drawing, FIG. 14B is a partial view of a retractable mechanism employable in a rolling foot-powered apparatus of the type depicted in FIGS. 14 and 14A of the drawing. There are depicted in FIG. 14B the movable assemblies 442a, the stationary assembly 444a, and the retractable mechanism 441. The retractable mechanism 441 embodies an externally teethed circular gear 420, which is rotatably supported on the shaft 432a of the stationary assembly 444a and which has the teeth 420a thereof constantly engaged with the teeth 450h' of the movable assemblies 442a.

Reference now will be had to FIGS. 15 and 15A thereof wherein there is depicted the twentieth first embodiment of a rolling foot-powered apparatus depicted by the numeral 470, which embodies two oscillating assemblies 472 and 474, a stationary assembly 476, a tower like retractable mechanism 480 and two motion-conversion mechanisms 478, the letter being operative to convert the oscillating motion of the movable assemblies 472 and 474 into continuous circular motion of the power output shaft 482 on which are fixedly the rotatable rollers 50. The continuous rotation of the rollers 50 generates friction between the outer surfaces thereof and the ground surface 60 that is operative to cause the rolling foot-powered apparatus 470 to move in a forward linear direction as indicated by the arrow 62. The tower-like frame assembly 484, on which is rotatably mounted a pulley 486 is mounted by means of suitable mounting means fixedly to the top of the stationary assembly 476. A flexible wire-like member 488 having ends 488a and 488b, which pass around the top of the rotatable pulley 486, is connected by means of the end 488a to the movable assembly 472 and by means of the end 488b to the movable assembly 474 in a manner such that when one of the movable assembly 472 moves with an oscillating motion from the upper position 490a thereof to the lower position 490b thereof the movable assembly 474 by virtue of the operation of the wire-like member 488 moves with an oscillating motion from the lower position 490b thereof to the upper position 490a thereof Likewise when the movable assembly 474 moves with an oscillating motion from the upper position 490a thereof to the lower position 490b thereof the movable assembly 472 moves with an oscillating motion from the lower position 490b thereof to the upper position 490a thereof Each of the movable assemblies 472 and 474 is comprised of a board 494, an internally teethed segment 496 and journal bearing 498, is mounted for oscillating motion by means of the journals 498 on the shafts 492 and at the center 497 of the stationary assembly 496. The stationary assembly 476 which comprises a U-shape member, is provided with means for rotatably supporting the shaft 482 relative thereto, such means including the circular gears 58, the free-wheel 56 and a swiveling wheel assembly 499.

Reference will now be had to FIG. 16 of the drawing wherein is depicted a twenty first embodiment of a rolling foot-powered apparatus denoted by the numeral 500. Rolling foot-powered apparatus 500 is similar to the rolling foot-powered apparatus 470 with the exception that the rolling foot-powered apparatus 500 employs foot straps 502 to assist the movable assemblies 472a end 474a in effecting the oscillating movement thereof from the second position 490b thereof to the first position 490a thereof.

Figure 17:
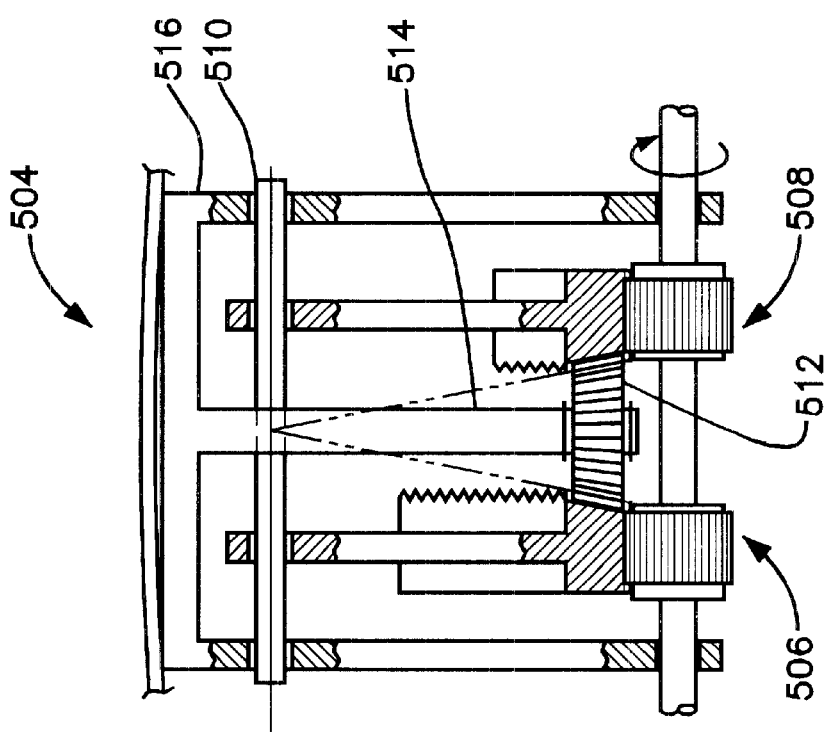
FIG. 17 is a sectional view of a second embodiment of the first oscillatable retractable motion-conversion mechanism, depicted employed with two oscillatable assemblies of the rolling foot-powered apparatus, constructed in accordance with the present invention.

Reference now will be had to the FIG. 17 of the drawing wherein there is depicted a retractable, oscillatable motion-conversion mechanism 504, which embodies two oscillatable movable assemblies 506 and 508 that are supported for oscillation on the shaft 510 of the stationary assembly 516, and a bevel circular gear 512 that is rotatably supported on the shaft 514. The retractable oscillatable motion-conversion mechanism 504 operates in a manner similar to that of the motion-conversion mechanism 418, which is depicted in FIG. 13 of the drawing.

Figure 18:
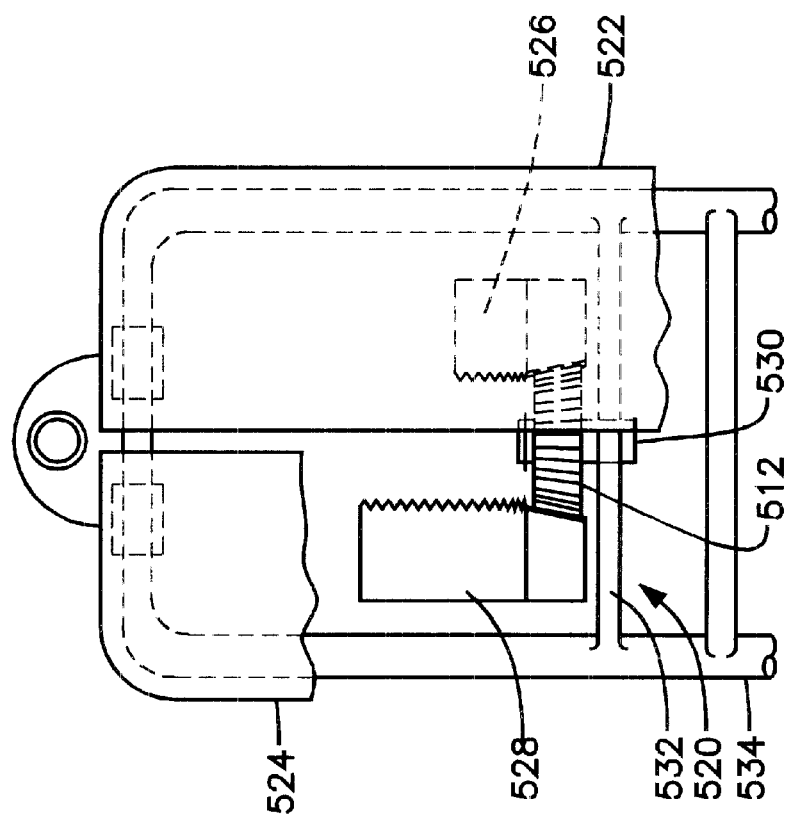
FIG. 18 is a plan-sectional view of a embodiment of oscillating retractable mechanism, depicted employed with oscillatable movable assemblies of the rolling foot-powered apparatus, constructed in accordance with the present invention.

Reference now will be had to FIG. 18 of the drawing wherein there is depicted a retractable, mechanism 520, employable with oscillatable members 522 and 524 and comprised of two bevel teeth segments 526 and 528 and a bevel externally teethed circular gear 512, the letter being rotatably supported on the shaft 530 of a member 532 of a stationary assembly 534.

Figure 19:
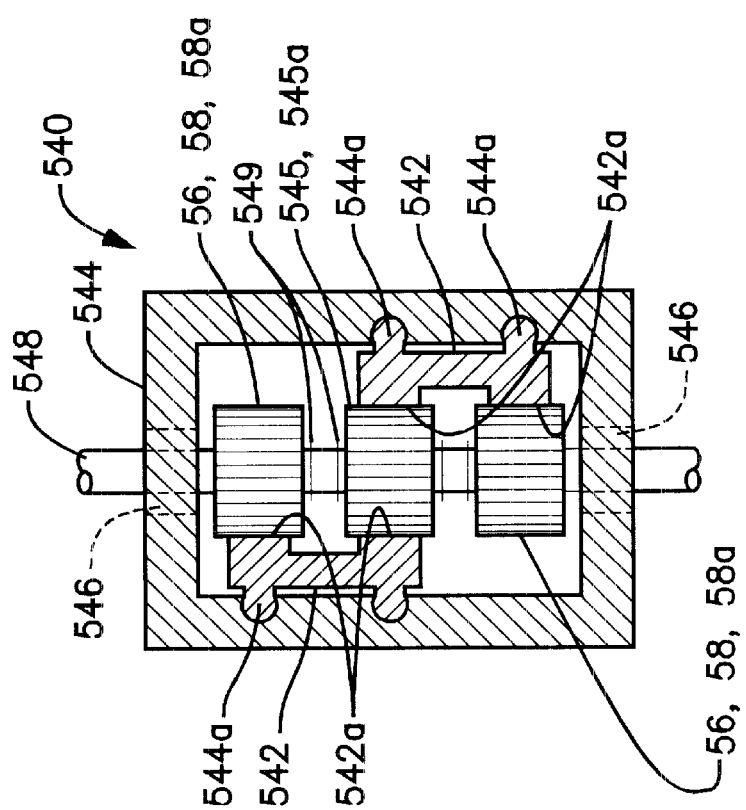
FIG. 19 is a sectional view of a embodiment of the second linearly retractable motion-conversion mechanism, depicted employed with two linearly moving assemblies of the rolling foot-powered apparatus, constructed in accordance with the present invention.

Reference will be now had to the FIG. 19 of the drawing wherein there is depicted a motion-conversion mechanism 540 embodying two linear sliding movable assemblies 542, a stationary assembly 544 and a rotatable shaft 548, which is rotatably supported by means of the bearing means 546, on the stationary assembly 544. On the rotatable shaft 548 are rotatably mounted by means of free-wheels 56, two externally teethed circular gears 58 and a freely rotating externally teethed circular gear 545. Each of the movable assemblies 542, which is slidably movable in the guiding means 544a, embodies two rows of teeth 542a. One row of the teeth 542a engages the teeth 58a of the circular gear 58 and the second row of teeth 542a engages the teeth 545a of the circular gear 545. The gears 58 and 545 are maintained in their relative positions by means of the rings 549.

Figure 20:
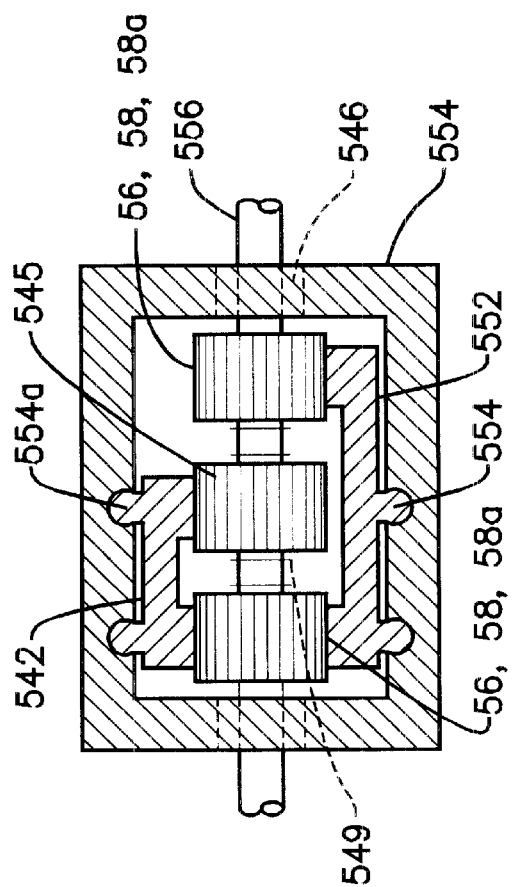
FIG. 20 is a rear view of the third embodiment of a linearly retractable motion-conversion mechanism depicted employed with two linearly moving assemblies of the rolling foot-powered apparatus, constructed in accordance with the present invention.

Reference now will be had to FIG. 20 of the drawing wherein there is depicted a motion-conversion mechanism 550 embodying two linearly sliding movable assemblies 542 and 552, a stationary assembly 554 and a rotatable shaft 556, the latter being rotatably supported by means of the bearing means 546 of the stationary assembly 554. On the rotatable shaft 556 are mounted by means of the free-wheels 56 two externally teethed circular gears 58 and a freely rotating externally teethed circular gear 545. Each of the movable assemblies 542 and 552 is slidably mounted in the guiding means 554a. The motion-conversion mechanism 542 and 552 operates in a manner similar to that of the motion-conversion mechanism 540. The gears 580 and 545 are maintained in their relative positions by means of the rings 549.

Figure 21:
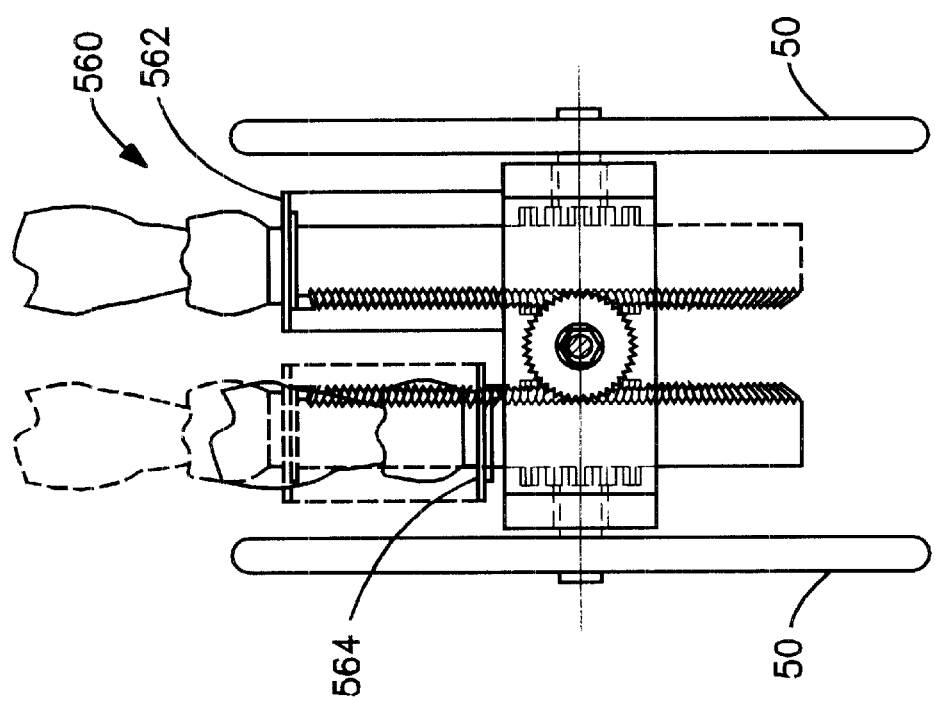
FIG. 21 is a rear view of a second arrangement of the second embodiment of a retractable motion-conversion mechanism, depicted employed with two oscillatable assemblies of the rolling foot-powered apparatus, constructed in accordance with the present invention.

Continuing with reference to FIG. 21 of the drawing wherein there is depicted an oscillatable motion-conversion mechanism 560, which is employable to convert the oscillating movement of the oscillatable assemblies 562 and 564 into continuous circular motion of the rotating roller 50.

Figure 22:
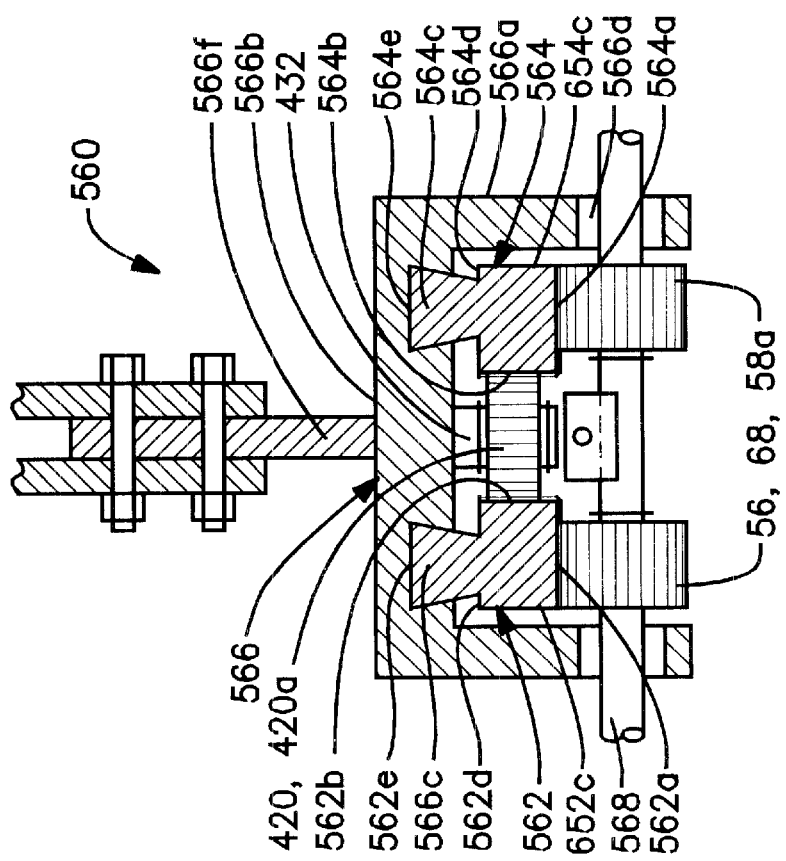
FIG. 22 is a rear view of the embodiment of a linearly retractable motion-conversion mechanism, depicted employed with two linearly moving assemblies of the rolling foot-powered apparatus, constructed in accordance with the present invention.

Reference will now be had to the FIG. 22 of the drawing where there is depicted therein a linearly retractable motion-conversion mechanism 560, embodying two movable assemblies 562 and 564, a stationary assembly 566 constructed in accordance with the present invention. The retractable motion-conversion mechanism comprises a portion of the movable assemblies and a portion of the stationary assembly. The movable assembly 562 is a rectangular type member defined by a length (not shown), a teeth side 562a, a teethed side 562b, a flat side 562c and a side 562d on which are formed guiding means 562e along the full length of the rectangular member 562 (not shown). The movable assembly 564 is a rectangular type member defined by a length (not shown), a teeth side 564a, a teethed side 564b, a flat side 564c and a side 564d on which are guiding means 564e along the full length of the rectangular member 564 (not shown). Guiding means 562e and 564e are employed to slidably mount the movable assemblies 562 and 564 in grooved means 566c provided in portion means 566b of stationary assembly 566 for a reciprocate linear movement therewithin, between a first position and a second position. The grooved means 566c of portion means 566b of stationary assembly 566 are formed at a predefined distance required for keeping the teethed side 562a and 564a of movable assemblies 562 and 564 in a constantly engagement with the teeth 58a of the circular gears 58 which are rotatably mounted on the rotatable shaft 568 with free-wheel means 56 (not shown). The shaft 568 is mounted rotatably with anti-friction means in opening means 566d located in portions means 566a of stationary assembly 566, is forced to rotate when the movable assemblies. The stationary assembly 566 comprises of portions means 566a and portion means 566b that form a C-frame potion means 566f. Portion means 566f has two ends, one end to be fixedly attached on motion means 566b and the other end which is provided with means for mounting means is employed to mount the retractable motion-conversion mechanism on the rolling foot-powered apparatus (not shown). On portion 566b of stationary assembly 566, and at a suitably location is fixedly mounted a shaft 432 on which is mounted a freely rotatable circular externally gear 420 that has the teeth 420a in constantly engaged with the teeth 562b and 564b of movable assemblies 562 and 564 respectively for purposes of assisting the movable assemblies 562 and 564 to retract from the second position in to the first position.

Continuing with the description of the retractable motion-conversion mechanism 560. Each rotatable rear 58 is fixedly mounted on the outer ring means of a free-wheel 56 (not shown), with inner ring means of free-wheel 56 being fixedly mounted with suitable mounting means at a suitable location on the rotatable shaft 568 (not shown). Engaging means located in between the outer ring means and the inner ring means of free-wheel 56 are operable to disengage when the movable assemble 562 and 564 are moving from the second position, that is in the direction outwards of the drawing, and engage the inner ring means of free-wheel 56 when the movable assemblies 562 and 564 are moving from the first position in to the second position that is in the direction inwards of the drawing, thereby causing the inner ring of free-wheel 56 and the rotatably shaft 568 to rotate in a circular motion that is transferred to the rotatable rollers of the rolling foot-powered apparatus (not shown) thus thrust the rolling foot-powered apparatus to move with a forward linear motion.

By way of illustration of FIG. 22, the linear motion of movable assembly 562 in the direction inwards into the paper, translates into a linear motion of movable assembly 564 in the direction outwards of the paper. The opposite is observed when the movable assembly 564 moves inwards into the paper. The continuous to end-fro provides a relative continuous circular motion of the rotatable shaft 568 that is for movement to power a rolling foot apparatus not shown.

Figure 23:
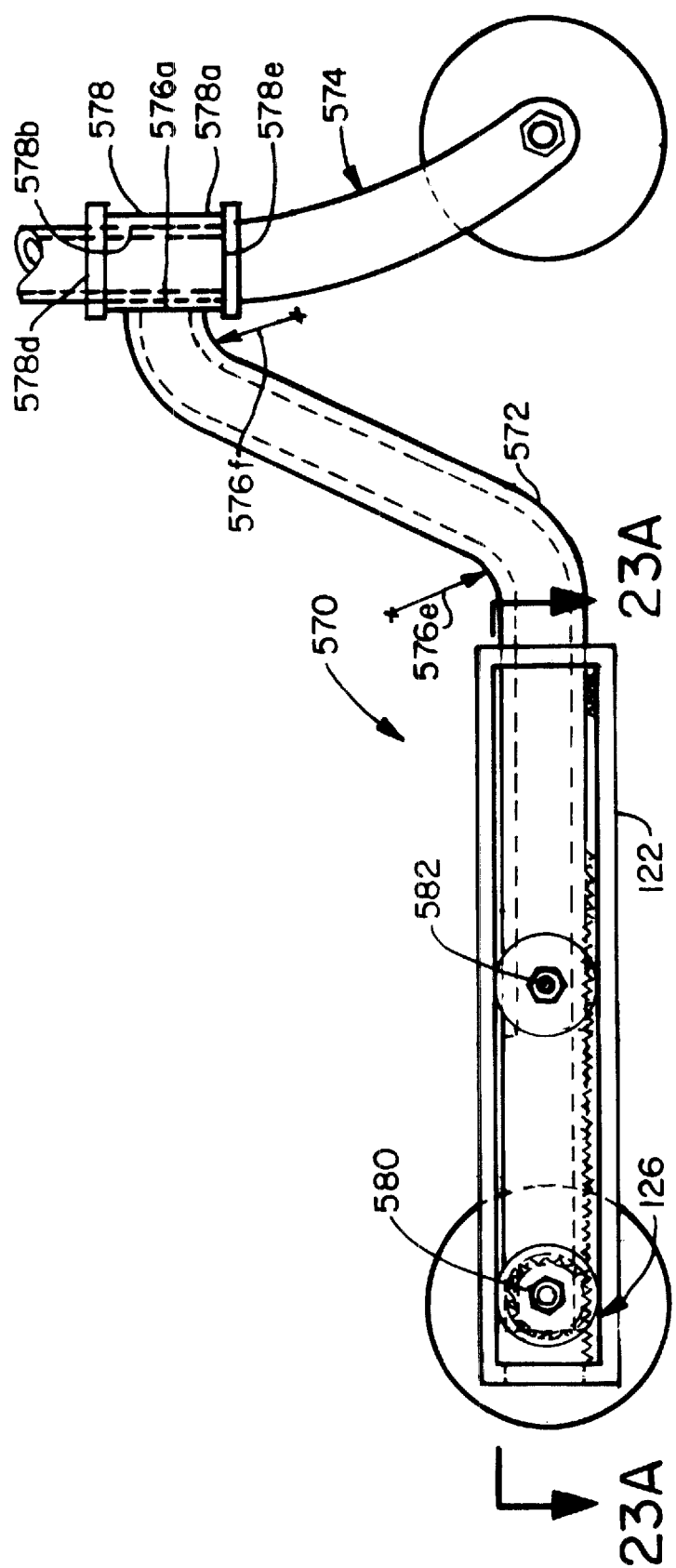
FIG. 23 is a partial elevational view of a twenty-second embodiment of a rolling foot-powered apparatus depicted in a first position, which embodies two movable assemblies supported for linear horizontal movement on a stationary assembly and two motion-conversion mechanisms, constructed in accordance with the present invention.
Figure 23A:
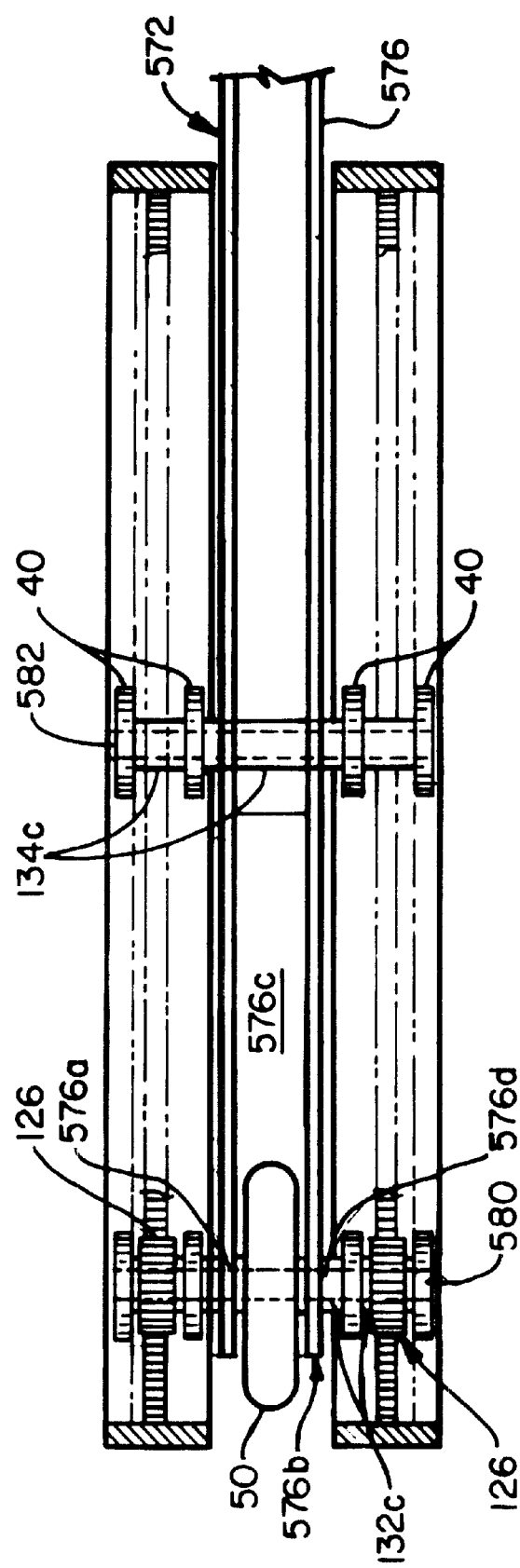
FIG. 23A is a plan-sectional view of the twenty-second embodiment of the rolling foot-powered apparatus depicted in FIG. 23, taken substantially along the line 23A—23A in FIG. 23, constructed in accordance with the present invention.

Reference now will be had to FIGS. 23 and 23A of the drawing, there is depicted therein the twenty second embodiment of the rolling foot apparatus the type of foot-powered scooter, generally designated by the numeral 570, that embodies two movable assemblies generally designated by the numeral 122 the type that is depicted in FIGS. 3 and 3A of the drawing, a stationary assembly generally designated by the numeral 572, two motion-conversion mechanisms generally designated by the numeral 126 which also described in FIGS. 3 and 3A of the drawing and a directional assembly 574, constructed in accordance with the present invention.

The stationary assembly 572 is comprised of the tubular member 576 which extend partially horizontal and partially bent with bent with radius 576e and 576f and a cylindrical member 578 thereof. The tubular member 576 further includes, a front end 576a that is employed to be fixedly attached on the external cylindrical surface 578a of the cylindrical member 578, a rear end 576b where a opening 576c is provided for the purposes of locating the roller means 50 which are fixedly mounted with mounting means on the rotatable shaft 580, and opening means 576d employed to rotatably mount the rotatable shaft 580. The movable assemblies which are mounted slidably along the sides of stationary assembly 572 for a linear movement in the direction typical to the motion of the rolling foot-powered apparatus. The motion-conversion mechanisms 122 are operable for converting the linear and relatively horizontal reciprocate motion of the movable assemblies 122 into a continuous circular motion of the rotatable shaft 580, which in turn the circular motion of shaft 580 is transferred to the rotatable rollers 50, thus thrusting the rolling foot-powered apparatus 570 to move in a forward linear motion in a similar way as the rolling foot-powered apparatus 120 depicted in FIGS. 3 and 3A of the drawing. Roller means 40 along with spacers 132c and 134c which are mounted rotatably on shaft 582 are employed to maintain the movable assemblies 122 in a operable position in the same way as in described in FIGS. 3 and 3A of the drawing.

Continuing with the description of the movable assembly of the rolling foot apparatus 570, and more specifically to the cylindrical member 580. The cylindrical member 108 has an outer cylindrical surface 578a on which is attached fixedly the tubular member 576, an inner smooth cylindrical surface 578b of an opening 578c, an upper and a lower circular surface 578d and 578e. The opening 580c is employed to rotatably mount a pipe 584 of the driving assembly 582. The cylindrical member 578 is employed to rotatably mounting the directional assembly 574, that is typical in structure and operation to that of a conventional type scooter.

Figure 23B:
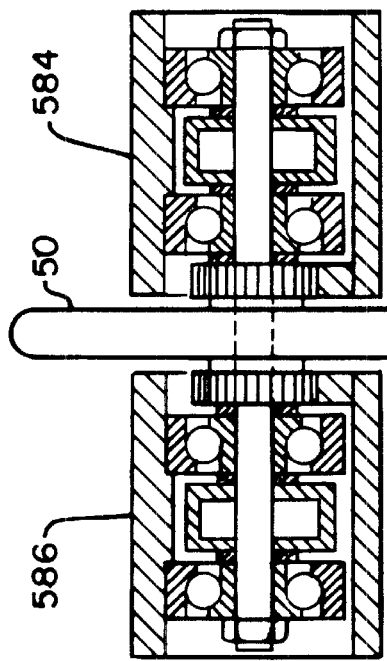
FIG. 23B is an elevational section view of a rolling foot-powered apparatus, which embodies two movable assemblies supported for a linear horizontal movement on a stationary assembly and two motion-conversion mechanisms, constructed in accordance with the present invention.
Figure 23C:
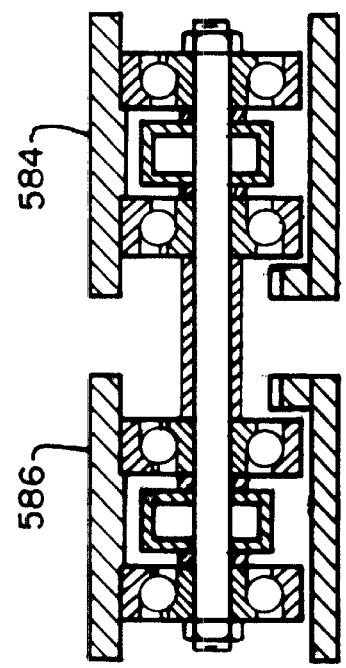
FIG. 23C is an elevational section view of a rolling foot-powered apparatus, which embodies two movable assemblies supported for a linear horizontal movement on a stationary assembly and two motion-conversion mechanisms, constructed in accordance with the present invention.
Figure 23D:
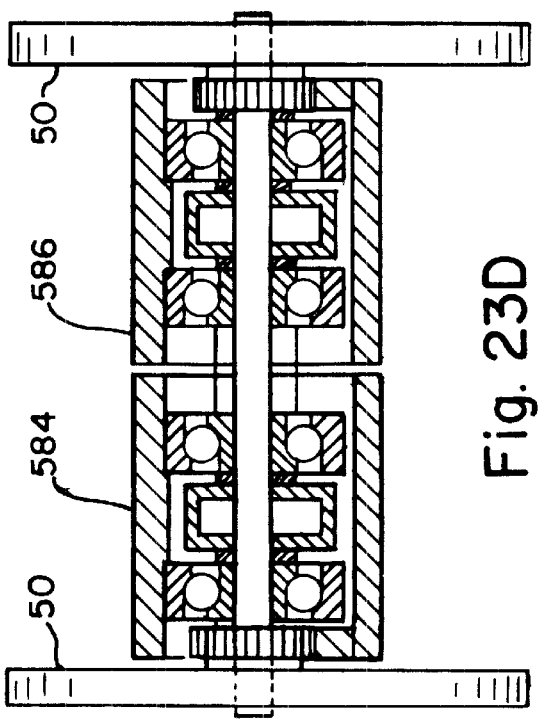
FIG. 23D is an elevational section view of a rolling foot-powered apparatus, which embodies two movable assemblies supported for a linear horizontal movement on a stationary assembly and two motion-conversion mechanisms, constructed in accordance with the present invention.

Reference now will be had to FIGS. 23B, 23C, and 23D of the drawing, there are depicted therein various arrangement of two typical movable assemblies 584 and 586 constructed in accordance with the present invention.

Figure 23E:
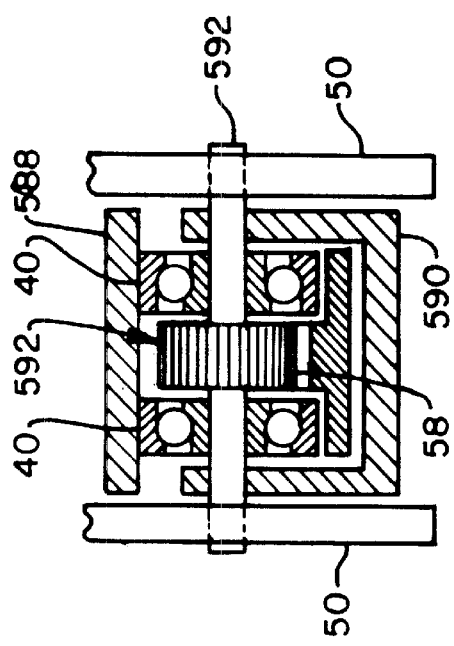
FIG. 23E is an elevational section view of a rolling foot-powered apparatus, which embodies a movable assembly supported for a linear horizontal movement on a stationary assembly and a motion-conversion mechanism, constructed in accordance with the present invention.

Continuing with reference to FIG. 23E of the drawing, there is depicted therein a sectional elevation section view of the rolling foot-powered apparatus embodying a movable assembly 588, mounted slidably on a stationary assembly 590 and a motion-conversion mechanism. The movable assembly 588 is cooperatively associated with the stationary assembly 590 with the assistance of the motion-conversion mechanism 592 in converting the linear reciprocal movement of the movable assembly 588 into a continuous circular motion of the rotatable shaft 592, thereby, transferred the circular motion to the rotatable rollers 50. The continuous reciprocal movement of the movable assembly 588 provides a relative continuous circular motion of the rotatable shaft 592 that is for movement to power a rolling foot apparatus (not shown.

Figure 24:
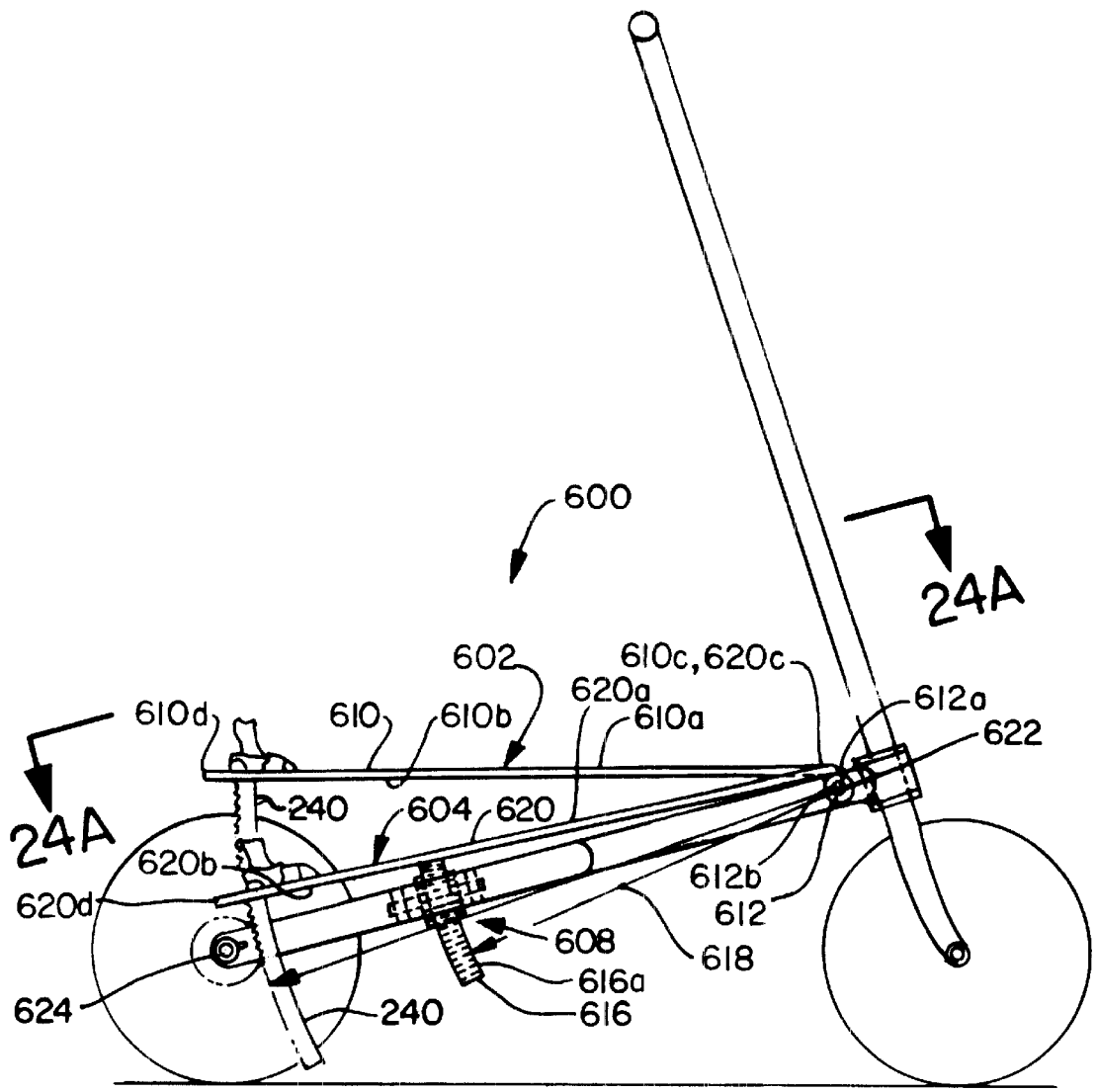
FIG. 24 is a elevational view of a twenty-third embodiment of a rolling foot-powered apparatus depicted in a first position, which embodies two movable assemblies supported for oscillating movement on a stationary assembly and two motion-conversion mechanisms and a retraction mechanism, constructed in accordance with the present invention.
Figure 24A:
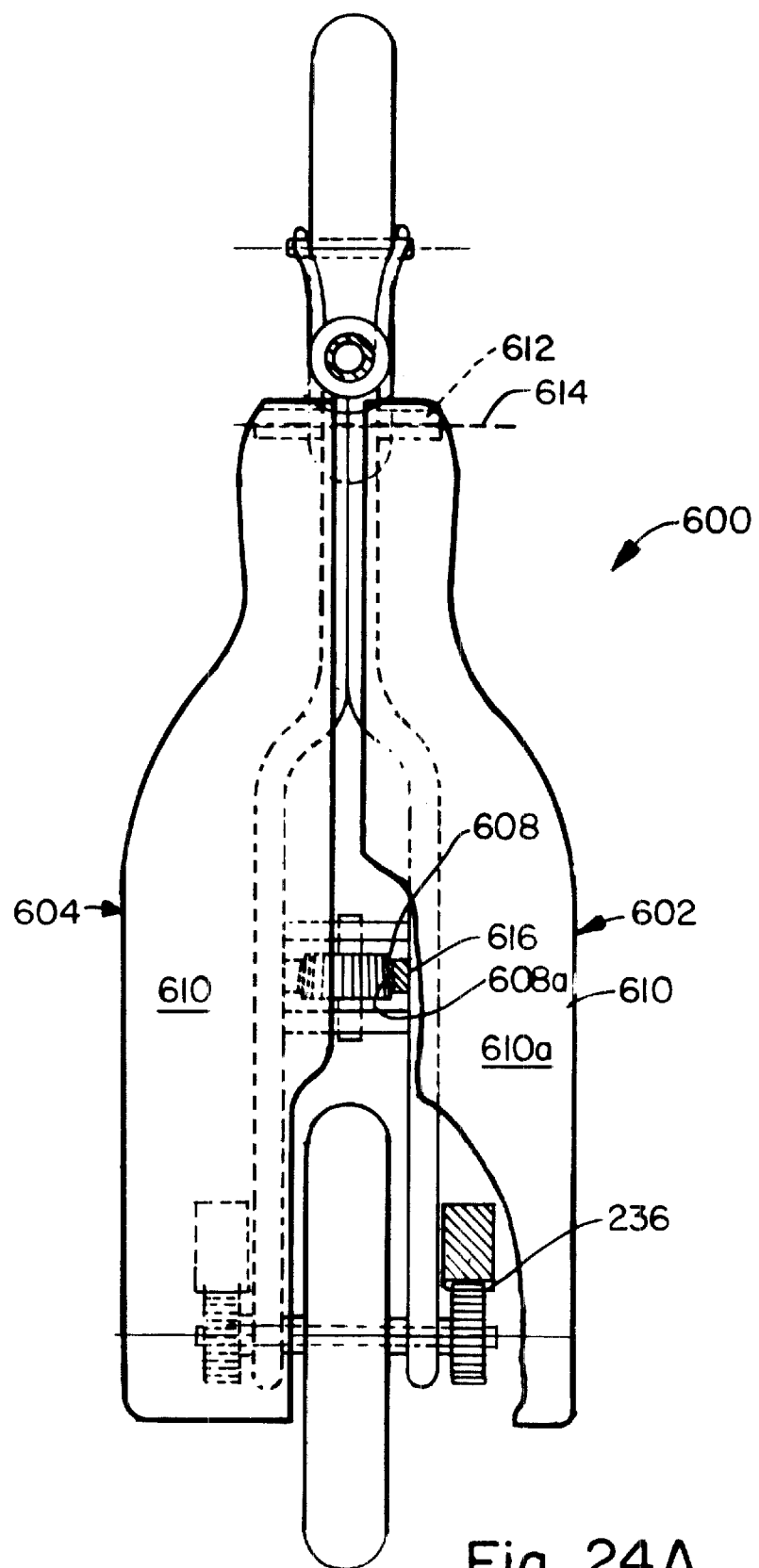
FIG. 24A is a plan-sectional view of the twenty-third embodiment of the rolling foot-powered apparatus depicted in FIG. 24, taken substantially along the line 24A—24A in FIG. 24, constructed in accordance with the present invention.

Reference now will be had to the drawing and more particularly to FIGS. 24, and 24A thereof, there is depicted therein a twenty third embodiment of a rolling foot-powered apparatus, generally designated by the numeral 600, embodying two oscillatable movable assemblies generally designated by the numeral 602 and 604, a stationary assembly generally designated by the numeral 606 two motion-conversion mechanisms generally designated by the numeral 236 that are described in FIG. 5 of the drawing, and a retraction mechanism generally designated by the numeral 608, constructed in accordance with the present invention. Each of the motion-conversion mechanisms 236 comprises a portion of the oscillatable movable assemblies 602 and 604 respectively, and portion of the stationary assembly 606. The movable assemblies 602 and 604 are mounted with cylindrical members 612 on a shaft 622 for an oscillatable movement about the center 614, with teeth of the cylindrical teethed segments 240 of motion-conversion mechanisms 236 which are perpendicularly mounted on the flat boards 610 and 620 being constant engaged with the teeth 68a of the circular gears 68 of motion-conversion mechanisms 236. The circular teethed gear 68 which is rotatably mounted with free-wheel means 56 (not shown) on the rotatable shaft 624 are operable to engage rotatably the rotatable shaft 624 of the rolling foot-powered apparatus 600 when the movable assemblies 602 and 604 move downwards from the upper first position to the lower second position, and disengages when the movable assemblies 602 and 604 move from the lower second position to the upper first position.

The oscillatable movable assembly 602 of the rolling foot-powered apparatus 600 embodying a flat board 610 that is defined by the upper flat surface 610a which is used to position a human foot, the lower flat surface 610b on which are fixedly mounted to the front 610c and at a suitable location a cylindrical member 612 which has an inner cylindrical surface 612a and on outer cylindrical surface 612b and center 614, and to the rear end 610d a cylindrical teethed segment 240 that is the driving members of the motion-conversion mechanism 236 that is described in FIG. 5 of the drawing. In between the front end 610a and rear end 610b of board 610 and at a suitable location is fixedly mounted a bevel teeth cylindrical segment 616 that is a part of the retraction mechanism 608, with teeth 616a of bevel teeth cylindrical segment 616 formed with radius 618 and center 614, the same center of the cylindrical member 612 and the pivoting point of the oscillatable movable assembly 602. The oscillatable movable assembly 604 of the rolling foot-powered apparatus 600 embodying a flat board 620 that is defined by the upper flat surface 620a which is used to position a human foot, the lower flat surface 620b on which are fixedly mounted to the front 620c and at a suitable location a cylindrical member 612 which has an inner cylindrical surface 612a and on outer cylindrical surface 612b and center 614, and to the rear end 620d a cylindrical teethed segment 240 that is the driving members of the motion-conversion mechanism 236 which is described in FIG. 5 of the drawing. In between the front end 620a and rear end 620b of board 620 and at a suitable location is fixedly mounted a bevel teeth cylindrical segment 616 that is a part of the retraction mechanism 608, with teeth 616a of cylindrical gear segment 616 formed with radius 618 and center 614, the same center of the cylindrical member 612 and the pivoting point of the oscillatable movable assembly 604.

Continuing with reference to FIGS. 24 and 24A of the drawing, as illustrated therein the stationary assembly 606 embodying two tubular members 626, a cylindrical member 628 and two bar type members 630. The members 626 is comprised of two tubular members 628 configured into a fork type shape, by fixedly mount parallel to each other by means of mounting means for example such as welding a portion 628a thereto, then bent on the same plan a portion 628b of the tubular members 628 outwards, and there after bent again on the same plan a portion 628c of the tubular members 628 inwards. In the space 632 created by bending the tubular members 628 are fixedly mounted by means of mounting such as welding the two bar members 630. The bar means 630 which are provided with opening 630a for the shaft 634 that is employed to mount rotatably a circular externally bevel teeth gear 636 of the reciprocation mechanism 608 are mounted at a suitable location for engaging bevel teeth cylindrical segments 616 of the oscillatable assemblies 602 and 604, parallel to each other and at a distance for locating said circular bevel teeth gear 636, perpendicular to the direction to the tubular members 628 and on the same with the member 626 of stationary assembly 606. The bevel teeth 636a of bevel teeth circular gear 636 and the teeth 616a of bevel teeth cylindrical segments 616 are in a constant engagement in a way as when one of the movable assemblies 602 or 604 moves downwards the other movable assembly moves upwards.

Continuing with reference to the stationary assembly 606 of rolling foot-powered apparatus 600. The tubular members 628 of member 626 have a front end 628d on which is fixedly mounted a cylindrical member 240 perpendicularly to the direction of the member 626 provided with a opening for mounting rotatably a directional assembly 642 which is typical to a conventional type scooter. The rear ends 628e of tubular members 628 are provided with slotted opening means 628f which are employed for support rotatably the shaft 624 on which are mounted the circular externally teethed gears 58 with the free-wheels 56 (not shown), with teeth 58a being constantly engaged to the teeth 240a of the teethed cylindrical segment 240.

Figure 25A:
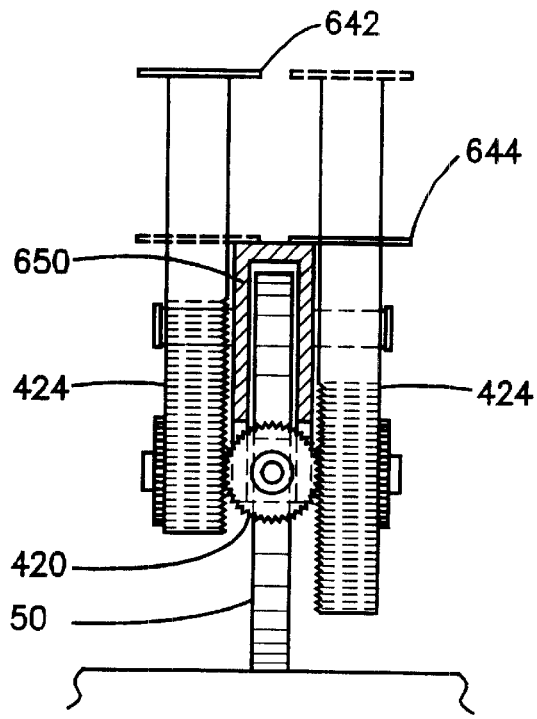
FIG. 25A is a elevational-sectional view of the twenty-fourth embodiment of the rolling foot-powered apparatus depicted in FIG. 25, taken substantially along the line 25A—25A in FIG. 25, constructed in accordance with the present invention.
Figure 25:
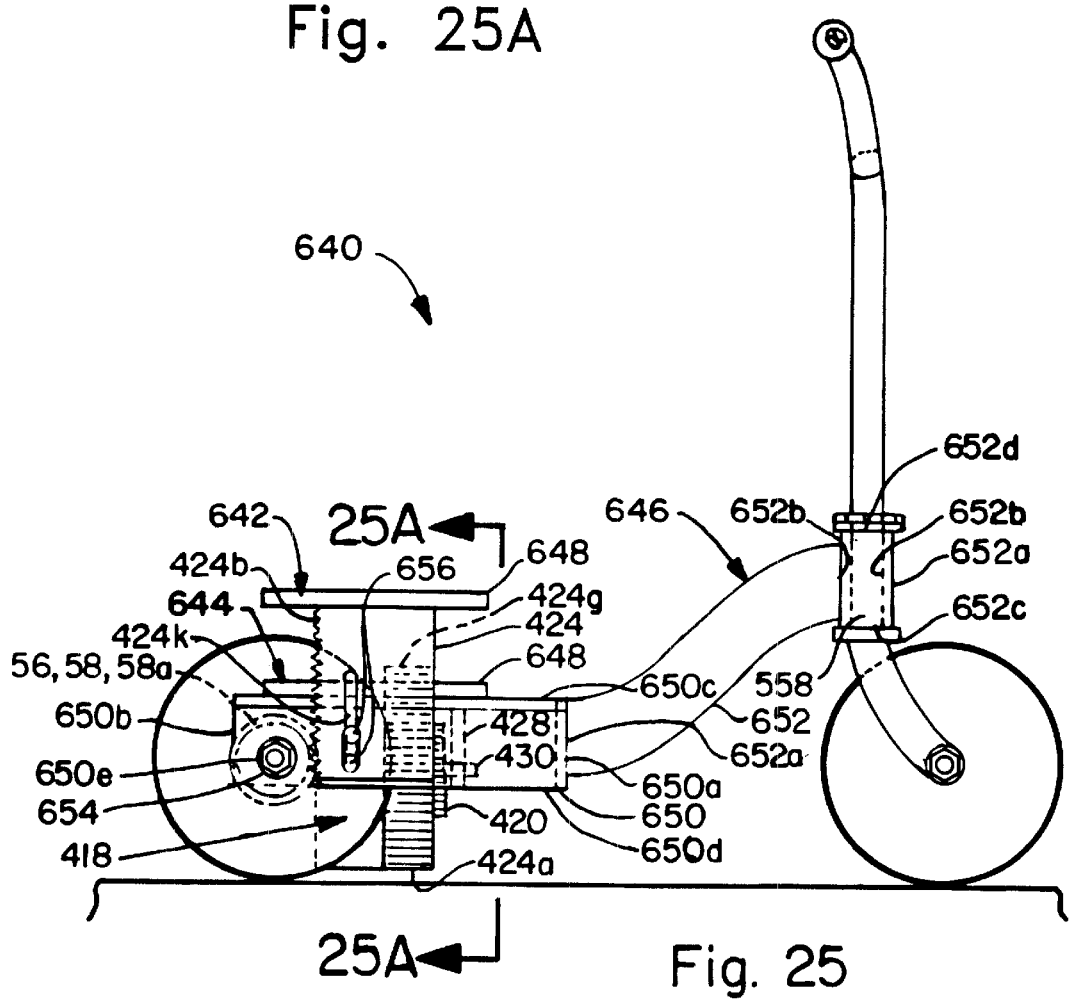
FIG. 25 is a elevational view of a twenty-fourth embodiment of a rolling foot-powered apparatus depicted in a first position, which embodies two movable assemblies supported for a linear vertical movement on a stationary assembly and retractable motion-conversion mechanisms, constructed in accordance with the resent invention.

Referring now to the drawing and more particularly to FIGS. 25 and 25A thereof, there is depicted therein the twenty fourth embodiment a rolling foot-powered apparatus, generally designated by the numeral 640, which embodies two movable assemblies, generally designated by the numerals 642 and 644, a stationary assembly, generally designated by the numeral 646, and a retractable motion-conversion mechanisms generally designated by the numeral 418, constructed in accordance with the present invention. The retractable motion-conversion mechanism 418 is comprised of a portion of the movable assemblies 642 and 644, a portion of the stationary assembly 646, and a second externally teethed circular gear 420 having teeth 420a formed thereon. The retractable motion-conversion mechanism 418 is described in FIGS. 13, 13a and 13B of the drawing.

Each of the movable assemblies 642 and 644 is comprised of a board member 648 under which is fixedly mounted with means of suitable mounted means a double teethed segment 424 of the retractable motion-conversion conversion mechanism 418 so as to extend vertically as well as perpendicularly thereof.

Continuing with reference to FIGS. 25 and 25A of the drawing, as illustrated therein the stationary assembly 646 embodies a inverted U-shape configured member 650 that extends horizontally between a front end 650a and a rear end 650b, and including an upper flat horizontal portion 650c and two side portion 650d having openings 650e formed therein, for mounting rotatably with ant-friction means 654. Within and perpendicular to the U-shape member 650 there is mounted by means of suitable mounting, such as by welding or by any other suitably conventionally known mounting means, a gear support member 428, employed to support rotatably the gear 420 with shaft 432, and the rotatable roller 50 that is fixedly mounted on the rotatable shaft 654. External to sides portion 650d and at a suitable location of the U-shape member 650 are fixedly mounted the guide means 656, employed to engage the slotted openings 424k of double teethed segment 424, for purposes of guiding and restraining the movable assemblies 642 and 644 when moving in a linear vertical reciprocate motion from the first upper position to the second lower position and vise versa. The gear support member 428 is suitably located at a suitable distance from the retractable motion-conversion mechanisms 418 such so as to be operable for rotatably supporting on the shaft 428, the second circular gears 420, which includes teeth 420a that are constantly engaged with the teeth of the double teethed segments 424.

Continuing with the description of the stationary assembly 646 of the rolling foot-powered apparatus 640. The stationary assembly 646 further includes a tubular member 652 which bent to maintain the U-shape member in a relative horizontal position, fixedly mounted with an end 652a, with means of mounting means such as welding thereto on the end 650a of U-shape member 650 and with other end 652b being fixedly mounted with means of suitable means such as welding thereto on the external cylindrical surface 658a of a cylindrical member 658 which is relative perpendicular to the shaft 654. The cylindrical member 658 further includes an inner cylindrical surface 658b an upper end 658c and a lower end 658d, with cylindrical surface formed to accept for mounting the directional assembly 660 of rolling foot-powered apparatus 640, with directional assembly 660 being constructed in a way typical to that of a conventional scooter steering assembly.

Continuing with the description of the retractable motion-conversion mechanism 418 of the rolling foot-powered apparatus 640. The retractable motion-conversion mechanisms 418 is comprising of the teeth segments 424, which are mounted on the movable assemblies 642 and 644, respectively, for linear movement relative thereto, two circular gears 58, which are mounted via the free-wheelers 56 on the rotatable shaft 654 and relative to the teethed segment 424, and the circular gear 420 which is rotatably mounted on the shaft 432 of the member 428 of the stationary assembly 646.

By way of illustration, when a force or the weight of a human is applied to the movable assembly 642, the assembly 642 moves linearly downwards from the upper first position thereof to the lower second position thereof. Since the teeth 424b and the teeth 424j of the member 424 are in constant engagement with the teeth 58a of the circular gears 58 and the teeth 420a of the second circular gear 420, respectively, both the first gears 58 and the second gear 420 are caused to rotate clockwise. The rotation of the gears 58, due to influence of the free-wheel 56 is translated into continuous circular motion of the rotatable shafts 654 as well as the rollers 50 supported thereon. The rotation of the second gear 420 is translated into a linear upwards movement of the movable assembly 644 from the second position thereof to the first position thereof. At this point, the force or weight of a human being imported may be shifted from the movable assembly 642 to the movable assembly 644 thereby the process described above repeated in a reversed manner. The downward linear motion of the movable assembly 644 is translated into continuous circular motion of the rotatable shaft 654 and into the upward linear motion of the movable assembly 642 as a consequence of the operation of the second circular gear 420. The repetitive downward linear movement of the movable assemblies 642 and 644 is translated as a consequence of the operation of the retractable motion-conversion mechanism 418 into continuous circular motion of the rotatable rollers 50 that in turn urges the rolling foot-powered apparatus 640 to move with a continuous linear motion.

Figure 26:
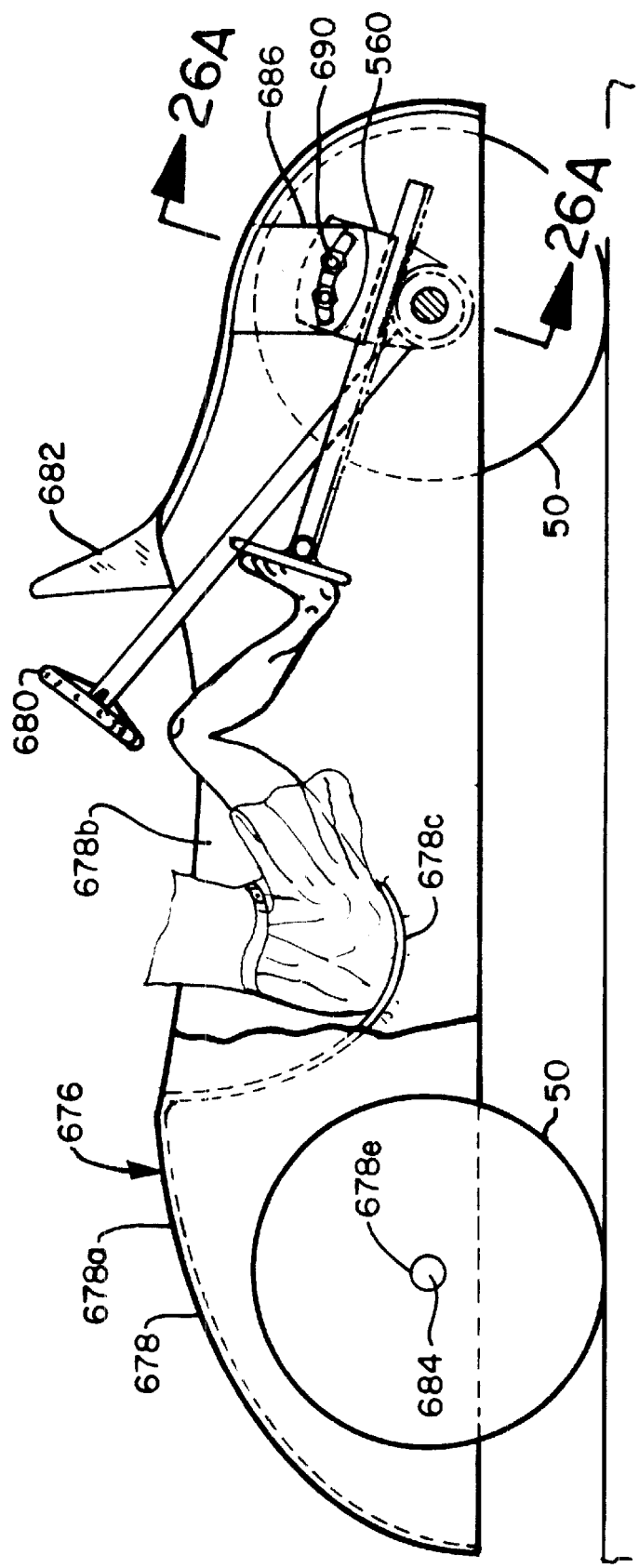
FIG. 26 is a elevational view of a twenty-fifth embodiment of a rolling foot-powered apparatus depicted in a first position, which embodies two movable assemblies supported for a linear incline movement on a stationary assembly and retractable motion-conversion mechanisms, constructed in accordance with the present invention.

Reference now will be had to FIGS. 26 and 26A thereof, there is depicted therein the twenty fifth embodiment a rolling foot-powered apparatus, generally designated by the numeral 670, which embodies two movable assemblies, generally designated by the numerals 672 and 674, a stationary assembly, generally designated by the numeral 676, and a retractable motion conversion mechanisms generally designated by the numeral 560 which is described in the FIG. 22 of the drawing, constructed in accordance with the present invention.

The stationary assembly 676 of rolling foot-powered apparatus 670 comprises a car like configuration member 678, having an curved upper surface 678a provided with an opening 678b design to provide the seating and operational arrangement with seat 678c that is a continuous portion of the member 678, the steering wheel 680 with steering column 682 that leads to the steering mechanism 684, the rear shaft 684 that is rotatably mounted in openings 678e of member 678 with anti-friction means is employed to support rotatable the rollers 50 each one mounted on the extreme ends of the rotatable shaft 684. The stationary assembly 678 further includes, two support member 686 extending vertically downwards and provided therein with openings 686a which are employed to suitably mount with means of mounting means such as bolt assemblies 690 the retractable motion-conversion mechanism 560 on the stationary assembly 678, a windshield type portion 682 and opening means 678d to rotatably mount the rotatable shaft 568 on the stationary assembly 676. The retractable motion-conversion mechanism 560 is operable to convert a linear relative horizontal motion of the movable assemblies into a continuous circular motion of the rotatable rollers 50 that in turn urges the rolling foot-powered apparatus 670 to move with a continuous linear motion.

While several embodiments of the invention have been shown, it will be appreciated that still other modifications thereof, some of which have been alluded hereinabove, may still be readily made thereto by those skilled in the art. I, therefore, intend by the appended claims to cover the modifications alluded to herein as well as all the other modifications which fall within the true spirit an scope of the invention.

What is claimed is:

1. A rolling foot-power assembly comprising:
   a. a stationary assembly supported for movement on at least one roller;
   b. a first movable assembly and a second movable assembly, said first movable assembly and second movable assembly each being supported in mounted relation on said stationary assembly so as to be selectively movable in a power stroke manner and in a retraction manner, said first movable assembly and said second movable assembly each being movable in the power stroke manner between a power stroke start position and a power stroke end position by virtue of a force being imparted to the respective movable assembly, said force being imparted to said first and second movable assemblies being derived from a combination of the gravitational force impartable by a human body and the dynamic thrust impartable by the human foot, and said first movable assembly and said second movable assembly each being movable in the retraction manner to thereby dispose the respective movable assembly again at its power stroke start position in readiness for a repeat movement of the respective movable assembly in the power stroke manner;
   c. a retraction mechanism operatively connected to said first movable assembly and said second movable assembly for alternately moving said first movable assembly in the retraction manner in response to movement of said second movable assembly in the power stroke manner and moving said second movable assembly in the retraction manner in response to movement of said first movable assembly in the power stroke manner; and d. a motion-conversion mechanism operatively connecting both the roller and said first and second movable assemblies for translating movement of the respective movable assembly moving in the power stroke manner into a rotation of the roller, said motion-conversion mechanism translating a predetermined unit of force applied thereto by said first movable assembly and said second movable assembly into a corresponding increment of rotation of the roller, and said first movable assembly and said second movable assembly each being directly connected to said motion-conversion mechanism such that, with respect to the movement in the power stroke manner of said first movable assembly and said second movable assembly, the same corresponding increment of rotation of the rollers is produced for each predetermined unit of force applied by the respective one of said first and second movable assemblies to said motion-conversion mechanism throughout the movement in the power stroke manner of the respective one of said first and second movable assemblies from its power stroke start position to its power stroke end position.

2. The rolling foot-powered assembly as set forth in claim 1 wherein a motion-conversion mechanism operatively connected to each of said first and second movable assemblies to convert a linear vertical motion of each said first and second movable assemblies into a continuous circular motion of the rollers supported on said stationary assembly thereby causing the rolling foot-powered assembly to move with a forward linear motion.

3. The rolling foot-powered assembly as set forth in claim 1 wherein a motion-conversion mechanism operatively connected to each of said first and second movable assemblies to convert a linear horizontal motion of each said first and second movable assemblies into a continuous circular motion of the rollers supported on said stationary assembly thereby causing the rolling foot-powered assembly to move with a forward linear motion.

4. The rolling foot-powered assembly as set forth in claim 1 wherein a motion-conversion mechanism operatively connected to each of said first and second movable assemblies to convert a linear inclined motion of each said first and second movable assemblies into a continuous circular motion of the rollers supported on said stationary assembly thereby causing the rolling foot-powered assembly to move with a forward linear motion.

5. The rolling foot-powered assembly as set forth in claim 1 wherein a motion-conversion mechanism operatively connected to each of said first and second movable assemblies to convert a oscillating motion of each said first and second movable assemblies into a continuous circular motion of the rollers supported on said stationary assembly thereby causing the rolling foot-powered assembly to move with a forward linear motion.

6. A rolling foot-power assembly comprising:

a. a stationary assembly supported for movement on at least one roller, the roller being rotatable about a roller axis;

b. a first movable assembly and a second movable assembly, said first movable assembly and second movable assembly each being supported in mounted relation on said stationary assembly so as to be selectively movable in a power stroke manner and in a retraction manner, said first movable assembly and said second movable assembly each being movable in the power stroke manner between a power stroke start position and a power stroke end position by virtue of a force being imparted to the respective movable assembly, said force being imparted to said first and second movable assemblies being derived from a combination of the gravitational force impartable by a human body and the dynamic thrust impartable by the human foot, and said first movable assembly and said second movable assembly each being movable in the retraction manner to thereby dispose the respective movable assembly again at its power stroke start position in readiness for a repeat movement of the respective movable assembly in the power stroke manner;

c. a retraction element operatively connected to said first movable assembly and said second movable assembly for alternately moving said first movable assembly in the retraction manner in response to movement of said second movable assembly in the power stroke manner and moving said second movable assembly in the retraction manner in response to movement of said first movable assembly in the power stroke manner, said retraction element being movable about a retraction element axis which is not co-incident with the roller axis; and d. a motion-conversion mechanism operatively connecting both the roller and said first and second movable assemblies for translating movement of the respective movable assembly moving in the power stroke manner into a rotation of the roller, said motion-conversion mechanism translating a predetermined unit of force applied thereto by said first movable assembly and said second movable assembly into a corresponding increment of rotation of the roller.

7. The rolling foot-powered assembly as set forth in claim 6 wherein a motion-conversion mechanism operatively connected to each of said first and second movable assemblies to convert a linear vertical motion of each said first and second movable assemblies into a continuous circular motion of the rollers supported on said stationary assembly thereby causing the rolling foot-powered assembly to move with a forward linear motion.

8. The rolling foot-powered assembly as set forth in claim 6 wherein a motion-conversion mechanism operatively connected to each of said first and second movable assemblies to convert a linear horizontal motion of each said first and second movable assemblies into a continuous circular motion of the rollers supported on said stationary assembly thereby causing the rolling foot-powered assembly to move with a forward linear motion.

9. The rolling foot-powered assembly as set forth in claim 6 wherein a motion-conversion mechanism operatively connected to each of said first and second movable assemblies to convert a linear inclined motion of each said first and second movable assemblies into a continuous circular motion of the rollers supported on said stationary assembly thereby causing the rolling foot-powered assembly to move with a forward linear motion.

10. The rolling foot-powered assembly as set forth in claim 6 wherein a motion-conversion mechanism operatively connected to each of said first and second movable assemblies to convert a oscillating motion of each said first and second movable assemblies into a continuous circular motion of the rollers supported on said stationary assembly thereby causing the rolling foot-powered assembly to move with a forward linear motion.

* * * * *